(12) United States Patent
Yuan et al.

(10) Patent No.: US 9,876,580 B2
(45) Date of Patent: Jan. 23, 2018

(54) OPTICAL DEVICE

(71) Applicant: KABUSHIKI KAISHA TOSHIBA, Tokyo (JP)

(72) Inventors: Zhiliang Yuan, Cambridgeshire (GB); Bernd Matthias Frohlich, Cambridgeshire (GB); Andrew James Shields, Cambridgeshire (GB); Marco Lucamarini, Cambridgeshire (GB); Joanna Krystyna Skiba-Szymanska, Cambridgeshire (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

(21) Appl. No.: 14/693,442

(22) Filed: Apr. 22, 2015

(65) Prior Publication Data

US 2015/0304051 A1    Oct. 22, 2015

(30) Foreign Application Priority Data

Apr. 22, 2014 (GB) .................................. 1407100.5
Apr. 21, 2015 (GB) .................................. 1506759.8

(51) Int. Cl.
*H04B 10/00* (2013.01)
*H04B 10/548* (2013.01)
(Continued)

(52) U.S. Cl.
CPC ........... *H04B 10/548* (2013.01); *H04B 10/70* (2013.01); *H04L 27/2096* (2013.01)

(58) Field of Classification Search
CPC .... H04B 10/50; H04B 10/501; H04B 10/503; H04B 10/505; H04B 10/516; H04B 10/524
See application file for complete search history.

(56) References Cited

U.S. PATENT DOCUMENTS 5,175,643 A * 12/1992 Andrews ............... H01S 5/0265
359/339
5,307,410 A    4/1994 Bennett
(Continued)

FOREIGN PATENT DOCUMENTS

EP    2 403 081 A2    1/2012
GB    2 404 103 A     1/2005
(Continued)

OTHER PUBLICATIONS

Combined Search and Examination Report issued by the United Kingdom Intellectual Property Office dated Oct. 30, 2015, for UK Patent Application No. GB 1506759.8.
(Continued)

*Primary Examiner* — Daniel Dobson
(74) *Attorney, Agent, or Firm* — Finnegan, Henderson, Farabow, Garrett & Dunner, L.L.P.

(57) ABSTRACT

An optical device, comprising an optical component, configured to produce optical amplification; a component configured to intermittently supply coherent light to said optical component; and a controller, configured to apply a time varying signal to said optical component such that a plurality of light pulses are emitted during each period of time that said coherent light is received, wherein the plurality of light pulses emitted during each period have a fixed phase relation.

15 Claims, 43 Drawing Sheets

(51) Int. Cl.
*H04B 10/70* (2013.01)
*H04J 14/00* (2006.01)
*H04L 27/20* (2006.01)

(56) References Cited

U.S. PATENT DOCUMENTS

| | | | |
|---|---|---|---|
| 7,680,169 B2 | 3/2010 | Park et al. | |
| 2009/0022322 A1* | 1/2009 | Trifonov | H04B 10/70 380/278 |
| 2009/0074425 A1 | 3/2009 | Tanaka et al. | |

FOREIGN PATENT DOCUMENTS

| | | |
|---|---|---|
| GB | 2 430 123 A | 3/2007 |
| GB | 2 510 130 A | 7/2014 |
| JP | 2007-324922 | 12/2007 |
| JP | 2008-294934 | 12/2008 |
| JP | 2009-225019 | 10/2009 |
| JP | 2010-233123 | 10/2010 |
| WO | WO 96/22562 | 7/1996 |

OTHER PUBLICATIONS

Search Report issued by the United Kingdom Intellectual Property Office dated Jan. 12, 2015, for UK Patent Application No. GB 1407100.5.
Combined Search and Examination Report issued by the United Kingdom Intellectual Property Office dated Oct. 1, 2014, for UK Patent Application No. GB 1407100.5.
Nowell et al., "Chirp Reduction Using Push-Pull Modulation of Three-Contact Lasers," IEEE (1993), pp. 1368-1371.
Argyris et al., "Photonic Integrated Device for Chaos Applications in Communications," The American Physical Society (May 16, 2008), pp. 194101-1-194101-4.
Kjebon et al., "Two-Section InGaAsP DBR-lasers at 1.55 μm wavelength with 31 GHz Direct Modulation Bandwidth," IEEE (1997), pp. 665-668.
Möhrle et al., "Detuned grating multi-section-RW-DRF-lasers for high speed optical signal processing," IEEE (2001), pp. 217-223.
Bauer et al., "Nonlinear dynamics of semiconductor lasers with active optical feedback," The American Physical Society (2004), pp. 016206-1-016206-10.
Pataca et al., "Gain-Switched DFB Lasers," Journal of Microwaves and Optoelectronics (May 1997), pp. 46-63.

* cited by examiner

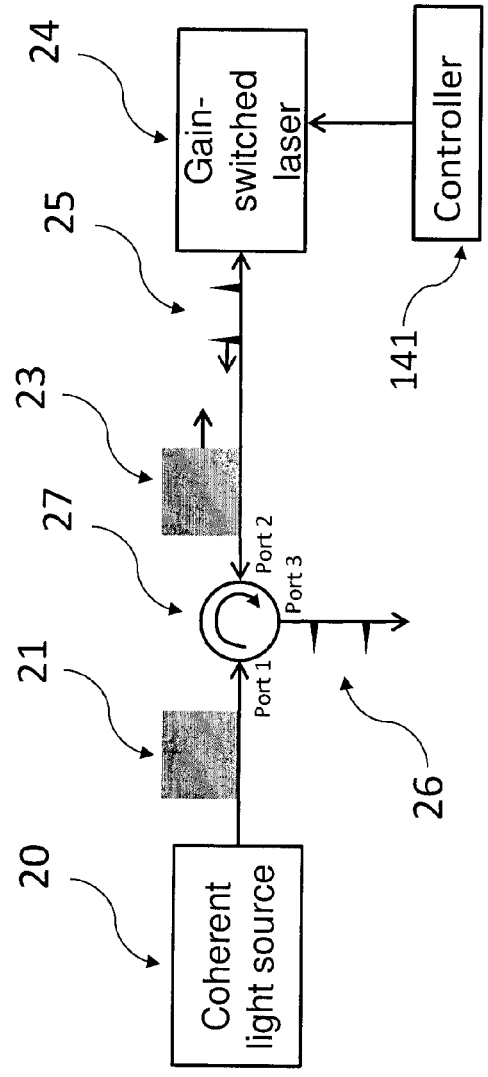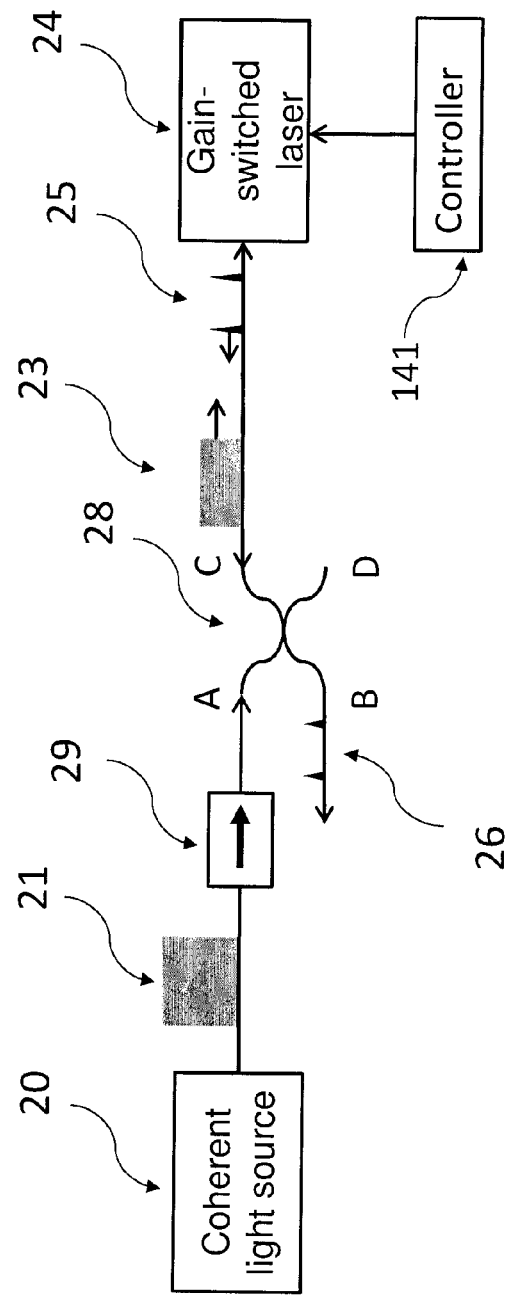
Figure 4(a)
Figure 4(b)

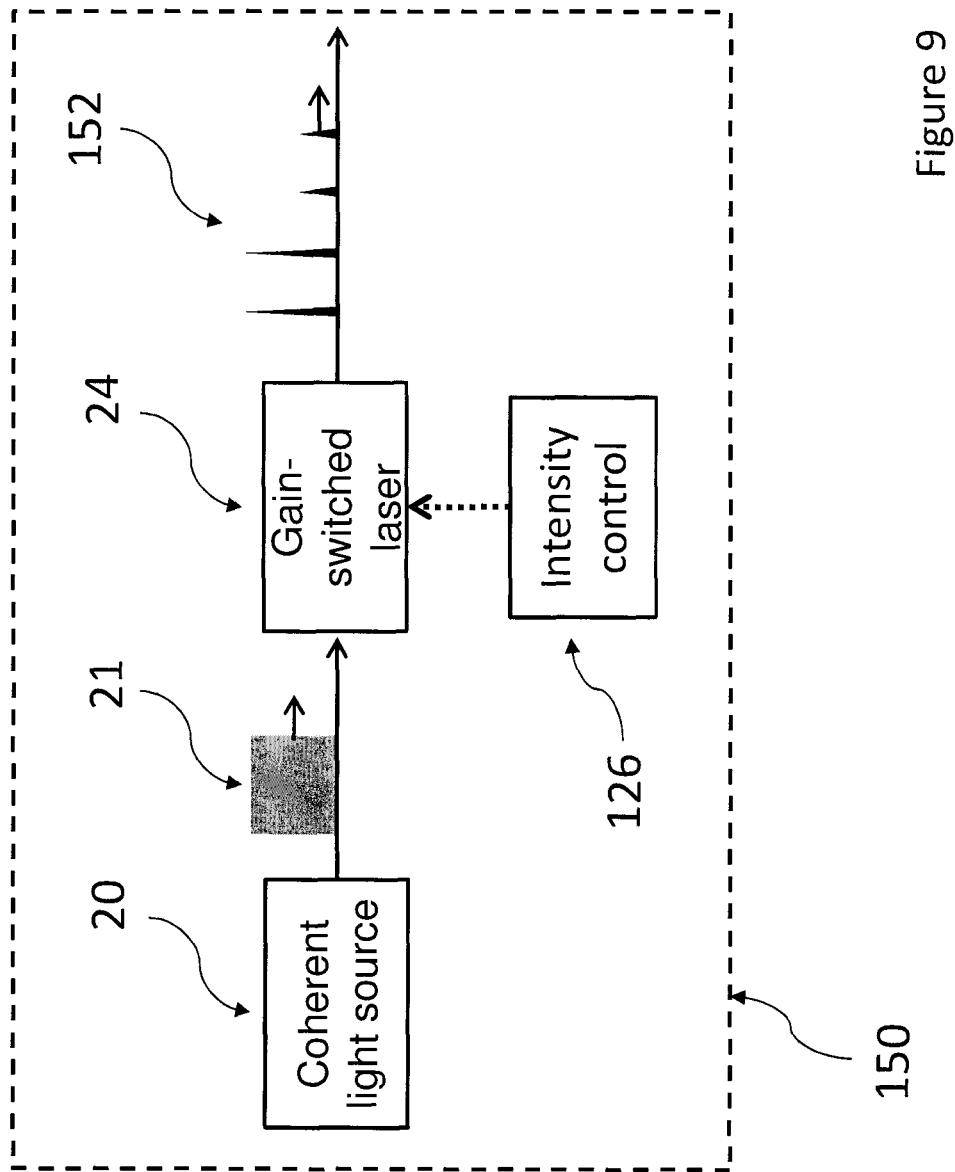

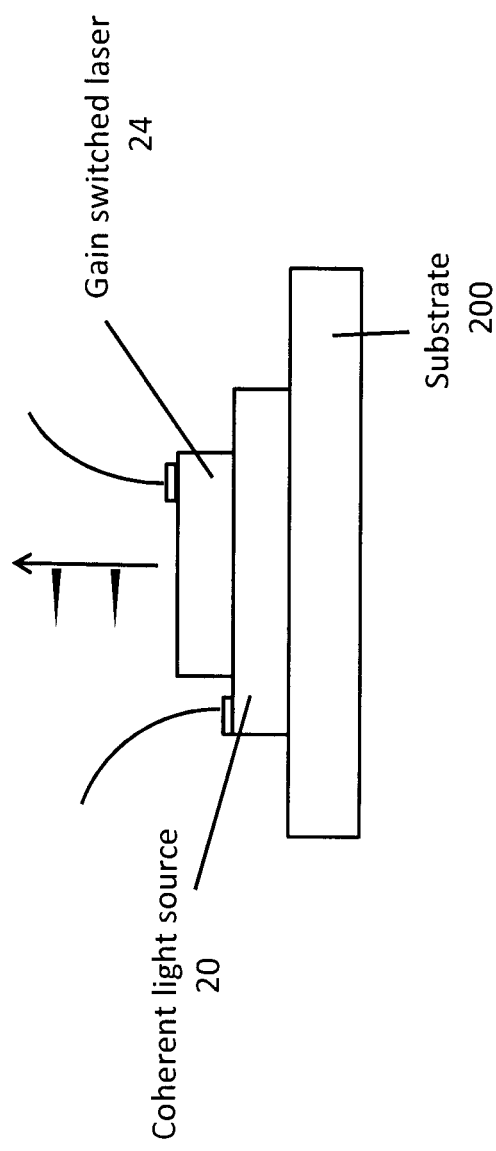

OPTICAL DEVICE

FIELD

Embodiments described herein relate generally to optical devices.

BACKGROUND

Sources of phase coherent short pulses of light have a wide range of applications, for example in sensing or metrology apparatus such as strain, pressure or temperature sensors, spectroscopy apparatus or distance measurement apparatus. Sources of short light pulses are also used in optical communications applications, for example applications using phase shift encoding with a modulation technique such as quadrature phase shift keying.

One of the applications of sources of phase coherent short pulses of light is in quantum communications systems. In a quantum communication system, information is sent between a transmitter and a receiver by encoded single quanta, such as single photons. Each photon carries one bit of information encoded upon a property of the photon, such as its polarization, phase or energy/time. The photon may even carry more than one bit of information, for example, by using properties such as angular momentum.

Quantum key distribution (QKD) is a technique which results in the sharing of cryptographic keys between two parties; a transmitter, often referred to as "Alice", and a receiver, often referred to as "Bob". The attraction of this technique is that it provides a test of whether any part of the key can be known to an unauthorised eavesdropper, often referred to as "Eve". In many forms of quantum key distribution, Alice and Bob use two or more nonorthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

QKD systems which use phase-encoding can employ an asymmetric Mach-Zehnder interferometer (MZI) at the transmitter to encode the phase information. The MZI contains a beam splitter, which divides light pulses into two fibres. The fibres then recombine on a second beam splitter. The separate fibres are labelled the short arm and the long arm. A phase modulator can be installed on either the long arm or the short arm in order to encode the phase information in the pulses. The optical path length difference between the short arm and the long arm should match that of a second MZI which is used to decode the information at the receiver.

BRIEF DESCRIPTION OF THE FIGURES

Embodiments will now be described with reference to the following figures:

FIG. 4(a) is a schematic illustration of an optical device in accordance with an embodiment, comprising a gain-switched laser and an optical circulator;

FIG. 4(b) is a schematic illustration of an optical device in accordance with an embodiment, comprising a gain-switched laser and a beam splitter;

FIG. 9 is a schematic illustration of an optical device in accordance with an embodiment, comprising an intensity control element;

FIG. 30 shows a schematic illustration of an optical device in accordance with an embodiment, in which a coherent light source and a gain switched laser are integrated on a substrate in a vertical combination;

DETAILED DESCRIPTION

Figure 1A:
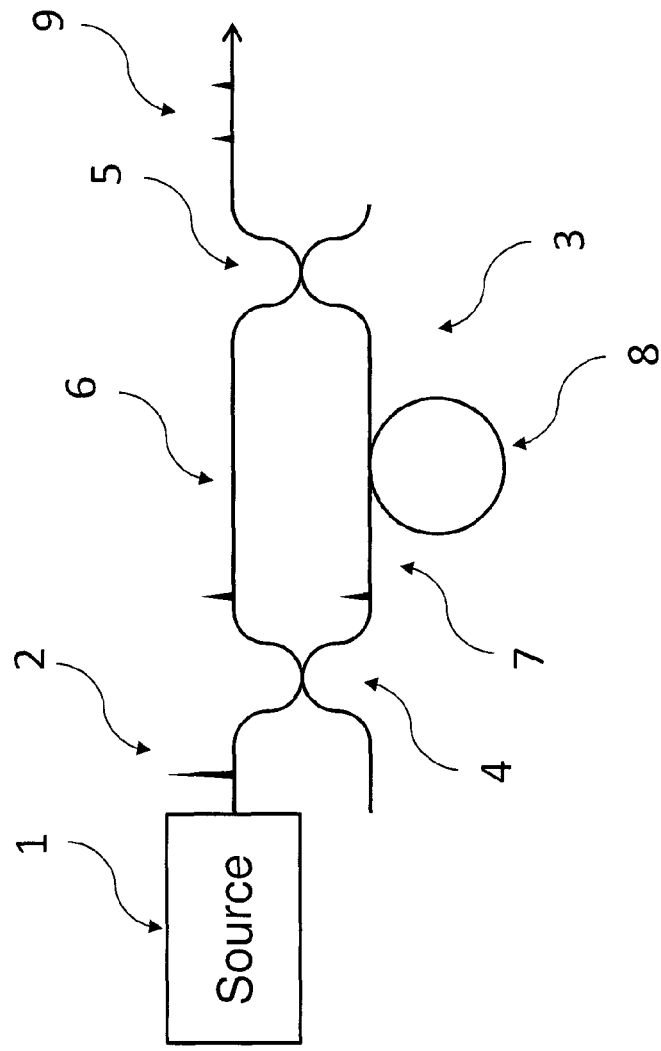
FIG. 1(a) is a schematic illustration of an arrangement used to generate coherent double light pulses with an asymmetric MZI.

According to one embodiment, there is provided an optical device, comprising an optical component, configured to produce optical amplification; a component configured to intermittently supply coherent light to said optical component; and a controller, configured to apply a time varying signal to said optical component such that a plurality of light pulses are emitted during each period of time that said coherent light is received, wherein the plurality of light pulses emitted during each period have a fixed phase relation.

In one embodiment, said component configured to intermittently supply coherent light is a unit configured to intermittently supply coherent light. In one embodiment, said component configured to intermittently supply coherent light is a coherent light source. In an alternative embodiment, said optical component is further configured to intermittently generate said coherent light and said component configured to intermittently supply coherent light is a mirror, wherein said mirror is configured to reflect said generated coherent light back into said optical component.

The phase difference between a pair of consecutive light pulses emitted during a period of time during which coherent light is received by the optical component is the same as the phase difference between another pair of consecutive light pulses emitted during the same period of time, where the difference in emission time between the pair of consecutive light pulses is substantially the same for both pairs. Pulses which are emitted during a period of time during which the same long light pulse is received are referred to as intra-period.

The phase difference between a first pair of consecutive light pulses (pulse 1 and pulse 2) emitted during a first period of time during which coherent light is received by the optical component is the same as the phase difference between a second pair of consecutive light pulses (pulse 3 and pulse 4) emitted during a second period of time during which coherent light is received by the optical component (the phase difference between pulse 1 and pulse 2 is the same as the phase difference between pulse 3 and pulse 4) where the difference in emission time between the pair of consecutive light pulses is substantially the same for both pairs. In other words, the phase difference between any two consecutive intra-period pulses with the same difference in emission times is the same for all periods. The pulses emitted during each period have a fixed phase relation, in other words the relative phase of any two consecutive pulses emitted during a single period with the same difference in emission times is the same for all periods. The plurality of light pulses emitted during each period have a fixed phase relation, in other words, the relative phase of the intra-period pulses is fixed for all periods.

Figure 13:
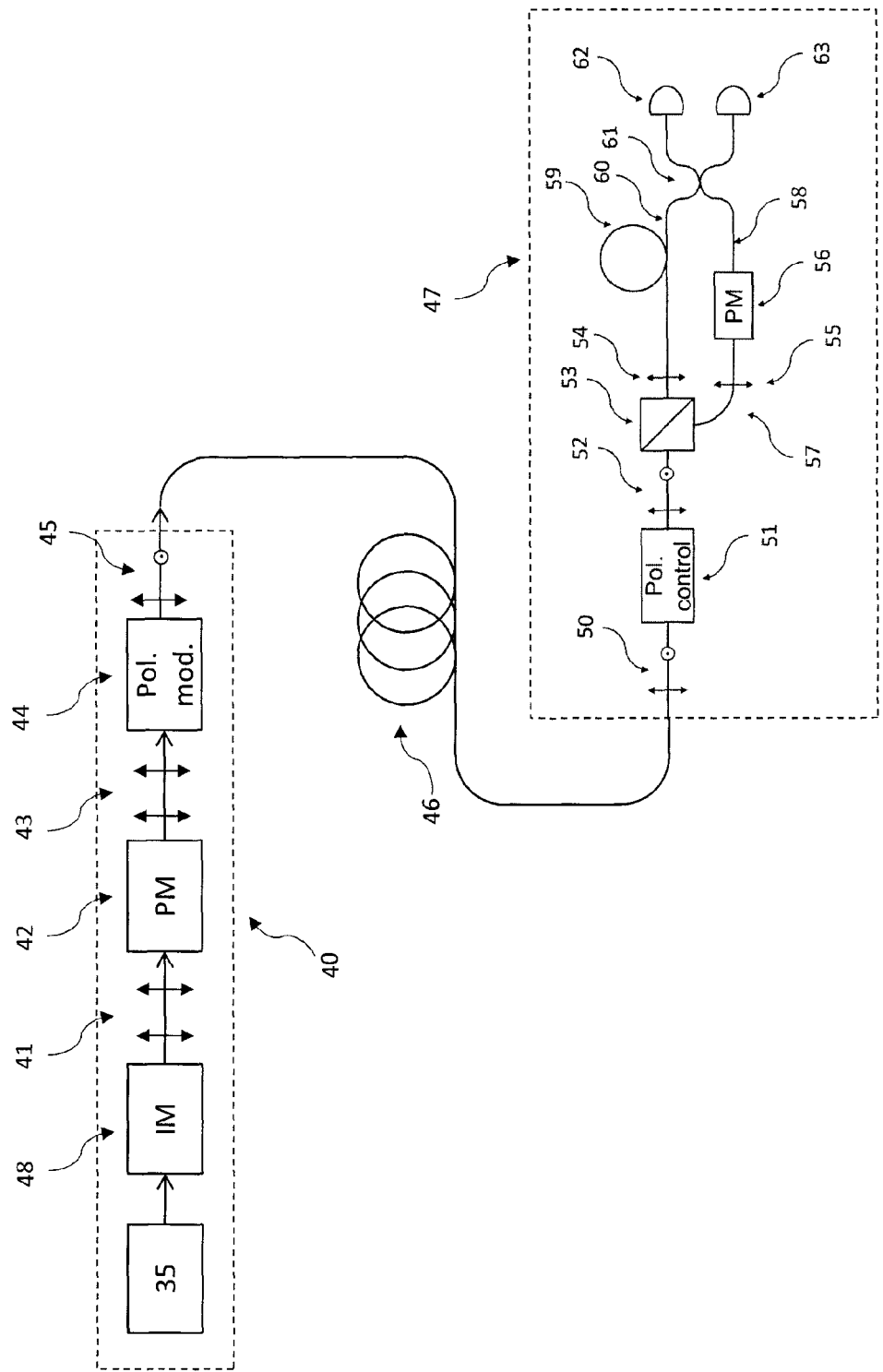
FIG. 13 is a schematic illustration of a quantum communication system in accordance with an embodiment, where the Quantum Transmitter comprises an optical device such as that shown in FIGS. 2(a) to 2(d)

Although the phase difference between any two consecutive intra-period light pulses is described as being the same, in practice, there may be small differences in the phase difference for different pairs of light pulses. By describing the phase difference as being the same, it is meant that the phase difference is the same to within 45 degrees. In one embodiment, the phase difference between any two consecutive intra-period light pulses is the same to within 20 degrees. In one embodiment, the phase difference between any two consecutive intra-period light pulses is the same to within 5 degrees. In one embodiment, the phase difference between any two consecutive intra-period light pulses is the same to within a tolerance such that when the light pulses travel through an interferometer such as shown in FIG. 13, the resulting interference between the two consecutive intra-period light pulses gives the same detection result for each pair Pulses generated during periods when different long light pulses are incident are referred to as inter-period. The phase of a light pulse emitted in the first period of time during which coherent light is received by the optical component has a random relationship to the phase of a light pulse emitted in the second period of time during which coherent light is received by the optical component (the phase difference between pulse 2 and pulse 3 is random for example). Light pulses emitted during different periods do not have a fixed phase relation, i.e. the relative phase of inter-period pulses is not fixed. In other words, the phase difference between inter-period pulses is random.

Although the phase difference between inter-period pulses is described as being random, in practice there might be a finite amount of correlations between the phase of two inter-period pulses emitted in quick succession. By describing the phase difference as random, it is meant that these correlations are small and decay rapidly. In one embodiment, there are no measurable correlations for two inter-period pulses which are emitted 10 ns apart. In one embodiment, there are no measurable correlations for pulses emitted 100 ns apart.

In one embodiment, the optical device comprises a second controller, configured to supply a second time varying signal to said coherent light source that controls the generation of said coherent light, wherein said time varying signal and said second time varying signal are synchronised. In an alternative embodiment, the controller is further configured to supply to the coherent light source a second time varying signal that controls the generation of said coherent light, wherein said time varying signal and said second time varying signal are synchronised.

In one embodiment, the components of the optical device are connected using waveguides, such as optical fibres. In another embodiment, the light pulses travel between the components through free space.

In one embodiment, the optical device further comprises an encoder, configured to encode information in the emission time of said light pulses or in the phase difference between said light pulses.

In one embodiment, the encoder is a phase modulator. The optical device may further comprise a controller configured to control the phase shift applied by said phase modulator. The phase modulator can be positioned such that light emitted from said coherent light source passes through said phase modulator, and the phase modulator is configured to apply a phase shift to part of said coherent light. The phase modulator can alternatively be positioned such that light pulses emitted from said optical component pass through said phase modulator. The phase modulator is configured to control the phase shift between a first light pulse emitted from said optical component and a second light pulse emitted from said optical component. For example, the phase modulator can be controlled to identify one of the light pulses based on the time it exits the optical component and apply a phase shift to that pulse. In one embodiment, the encoder is a phase control element, configured to apply a perturbation to a time varying signal applied to said coherent light source, such that a phase shift is applied to part of the generated coherent light.

In one embodiment, the encoder is an intensity modulator configured to allow light pulses emitted from said optical component to pass for selected emission times only. In one embodiment, the encoder is an intensity modulator configured to allow only part of the light from the coherent light source to enter the optical component. In one embodiment, the encoder is configured to modify said time varying signal applied to said optical component, preventing the emission of selected light pulses. In one embodiment, the encoder is configured to modify a time varying signal applied to the coherent light source, such that only part of the coherent light enters the optical component, thus preventing emission of corresponding light pulses from said optical component.

In one embodiment, the coherent light source comprises an intensity modulator, configured to reduce the intensity of part or all of the coherent light thus reducing the intensity of some or all of the light pulses. In one embodiment, the optical device further comprises an intensity modulator, configured to reduce the intensity of some or all of the light pulses emitted from the optical component. In one embodiment, the optical device further comprises an intensity control element, configured to modulate the amplitude of the time varying signal, such that the intensity of said plurality of light pulses is varied. In one embodiment, the intensity control element modulates the amplitude of a time varying signal applied to the coherent light source, such that the intensity of the coherent light is varied, thus varying the intensity of the light pulses emitted from the optical component. The intensity control element is configured to control the intensity of said emitted light pulses.

In one embodiment, the coherent light source is a laser. In one embodiment, the coherent light source comprises a combination of several lasers. In one embodiment, the coherent light source is a gain-switched laser. In one embodiment, the coherent light source is a semiconductor gain-switched laser. In one embodiment, the coherent light source is configured to emit a plurality of long coherent light pulses.

In one embodiment, the time varying signal is an AC current combined with a DC bias current. In one embodiment, the time varying signal is a series of current pulses.

In one embodiment, the controller is configured to apply a time varying signal such that two light pulses are emitted during each period of time that coherent light is received by said optical component.

In one embodiment, the optical component is a gain-switched laser. The coherent light is injected into said gain-switched laser. In one embodiment, the optical component is a semiconductor gain-switched laser. In an alternative embodiment, the optical component is a gain-switched optical amplifier. In one embodiment, the optical component is a semiconductor gain-switched optical amplifier.

In one embodiment, the coherent light is supplied via a first aperture of the optical component, and said optical component is configured such that said plurality of light pulses are emitted from a second aperture of said optical component.

In one embodiment, the optical device further comprises a light distribution device, wherein coherent light is supplied to an aperture of said optical component via said light distribution device, wherein said optical component is configured to emit said plurality of light pulses from the same aperture. In one embodiment, the light distribution device is an optical circulator. In one embodiment, the light distribution device is an optical beam splitter.

In one embodiment, the optical device further, comprises an optical isolator, configured to prevent said plurality of light pulses entering said coherent light source.

In one embodiment, a phase control element is configured to apply a perturbation such that a phase shift is applied to the second half of a coherent light pulse generated by said coherent light source. The phase control element is configured to control the phase between said emitted light pulses.

In one embodiment, light pulses emitted from said optical device comprise 10 or fewer photons. In some embodiments, the average number of photons per pulse is less than 1.

In one embodiment, the optical device is an optical device for use in a QKD system. In one embodiment, the optical device is an optical device for use in a QKD system based on the BB84 protocol. In one embodiment, the optical device is an optical device for use in a QKD system based on the COW protocol. In one embodiment, the optical device is an optical device for use in a QKD system based on the DPS protocol.

According to one embodiment, there is provided an optical device, comprising an optical component, configured to produce optical amplification; a component configured to supply coherent light to said optical component; a controller, configured to apply a time varying signal to said optical component such that a plurality of light pulses are emitted during each period of time that said coherent light is received, wherein the plurality of light pulses emitted during each period have a fixed phase relation; and an encoder, configured to encode information in the emission time of said light pulses or in the phase difference between said light pulses.

In one embodiment, said component configured to supply coherent light is a coherent light source. In one embodiment, the coherent light source is configured to supply continuous wave light. In one embodiment, the coherent light source is configured to supply pulses of coherent light. In an alternative embodiment, said optical component is further configured to intermittently generate said coherent light and said component configured to intermittently supply coherent light is a mirror, wherein said mirror is configured to reflect said generated coherent light back into said optical component.

In one embodiment, the optical device comprises a second controller, configured to supply a second time varying signal to said coherent light source that controls the generation of said coherent light, wherein said time varying signal and said second time varying signal are synchronised. In one embodiment, the controller is further configured to supply to the coherent light source a second time varying signal that controls the generation of said coherent light, wherein said time varying signal and said second time varying signal are synchronised.

In one embodiment, the components of the optical device are connected using waveguides, such as optical fibres. In another embodiment, the light pulses travel between the components through free space.

In one embodiment, the encoder is a phase modulator. The optical device can further comprise a controller configured to control the phase shift applied by said phase modulator. The phase modulator can be positioned such that light emitted from said coherent light source passes through said phase modulator, and the phase modulator is configured to apply a phase shift to part of said light. The phase modulator can alternatively be positioned such that light pulses emitted from said optical component passes through said phase modulator. The phase modulator is configured to apply a phase difference between a first light pulse emitted from said optical component and a second light pulse emitted from said optical component. The phase modulator can be controlled to identify one of the light pulses based on the time it exits the optical component and apply a phase shift to that pulse. In one embodiment, the encoder is a phase control element, configured to apply a perturbation to a time varying signal applied to said coherent light source, such that a phase shift is applied to part of the generated coherent light.

In one embodiment, the encoder is an intensity modulator configured to allow light pulses emitted from said optical component to pass for selected emission times only. In one embodiment, the encoder is an intensity modulator configured to allow only part of the light from the coherent light source to enter the optical device. In one embodiment, the encoder is configured to modify said time varying signal applied to said optical component, preventing the emission of selected light pulses. In one embodiment, the encoder is configured to modify a time varying signal applied to the coherent light source, such that only part of the coherent light enters the optical component, thus preventing emission of some of the light pulses from said optical component.

In one embodiment, the coherent light source comprises an intensity modulator, configured to reduce the intensity of part or all of the coherent light thus reducing the intensity of some or all of the light pulses. In one embodiment, the optical device further comprises an intensity modulator, configured to reduce the intensity of some or all of the light pulses emitted from the optical component. In one embodiment, the optical device further comprises an intensity control element, configured to modulate the amplitude of the time varying signal, such that the intensity of said plurality of light pulses is varied. In one embodiment, the intensity control element modulates the amplitude of a time varying signal applied to the coherent light source, such that the intensity of the coherent light is varied, thus varying the intensity of the light pulses emitted from the optical component. The intensity control element is configured to control the intensity of said emitted light pulses.

In one embodiment, the coherent light source is a laser. In one embodiment, the coherent light source comprises a combination of several lasers. In one embodiment, the coherent light source is a gain-switched laser. In one embodiment, the coherent light source is a semiconductor gain-switched laser. In one embodiment, the coherent light source is configured to emit a plurality of long coherent light pulses.

In one embodiment, the time varying signal is an AC current combined with a DC bias current. In one embodiment, the time varying signal is a series of current pulses.

In one embodiment, the controller is configured to apply a time varying signal such that two light pulses are emitted during each period of time that coherent light is received by said optical component.

In one embodiment, the optical component is a gain-switched laser. In one embodiment, the optical component is a semiconductor gain-switched laser. In an alternative embodiment, the optical component is a gain-switched optical amplifier. In one embodiment, the optical component is a semiconductor gain-switched optical amplifier.

In one embodiment, the coherent light is supplied via a first aperture of the optical component, and said optical component is configured such that said plurality of light pulses are emitted from a second aperture of said optical component.

In one embodiment, the optical device further comprises a light distribution device, wherein coherent light is supplied to an aperture of said optical component via said light distribution device, wherein said optical component is configured to emit said plurality of light pulses from the same aperture. In one embodiment, the light distribution device is an optical circulator. In one embodiment, the light distribution device is an optical beam splitter.

In one embodiment, the optical device further comprises an optical isolator, configured to prevent said plurality of light pulses entering said coherent light source.

In one embodiment, light pulses emitted from said optical device comprise 10 or fewer photons. In some embodiments, the average number of photons per pulse is less than 1.

In one embodiment, the optical device is an optical device for use in a QKD system. In one embodiment, the optical device is an optical device for use in a QKD system based on the BB84 protocol. In one embodiment, the optical device is an optical device for use in a QKD system based on the COW protocol. In one embodiment, the optical device is an optical device for use in a QKD system based on the DPS protocol.

According to one embodiment, there is provided an optical device comprising; a coherent light source; a controller, configured to apply a signal to said coherent light source such that said coherent light source generates coherent light for a period of time; a phase control element, configured to apply a perturbation to said signal during said period of time, such that a phase shift is applied to part of the generated light; an optical component, configured to produce optical intensity modulation, wherein said coherent light source is configured to supply said generated light to said optical component and a second controller, configured to apply a time varying signal to said optical component such that a first light pulse is emitted during a period of time that said first part of the generated light is received, and a second light pulse is emitted during a period of time that said second part of the generated light is received.

In one embodiment, the controller and the second controller are synchronised.

In one embodiment, the coherent light source is configured to supply continuous wave light. In one embodiment, the coherent light source is configured to supply pulses of coherent light.

In one embodiment, the phase control element is further configured to apply a plurality of perturbations to said signal during said period of time, such that phase shifts are applied to a plurality of parts of the generated light.

In one embodiment, the coherent light source is a semiconductor laser, said signal is an electric current, and said perturbation is a short electric current pulse.

In one embodiment, the components of the optical device are connected using waveguides, such as optical fibres. In another embodiment, the light pulses travel between the components through free space.

In one embodiment, the coherent light source comprises an intensity modulator, configured to reduce the intensity of part or all of the coherent light thus reducing the intensity of some or all of the light pulses. In one embodiment, the optical device further comprises an intensity control element, configured to modulate the amplitude of the time varying signal, such that the intensity of said plurality of light pulses is varied. In one embodiment, the intensity control element modulates the amplitude of a time varying signal applied to the coherent light source, such that the intensity of the coherent light is varied, thus varying the intensity of the light pulses emitted from the optical component. The intensity control element is configured to control the intensity of said emitted light pulses.

In one embodiment, the coherent light source is a laser. In one embodiment, the coherent light source comprises a combination of several lasers. In one embodiment, the coherent light source is a gain-switched laser. In one embodiment, the coherent light source is a semiconductor gain-switched laser. In one embodiment, the coherent light source is configured to emit a plurality of long coherent light pulses.

In one embodiment, the time varying signal is an AC current combined with a DC bias current. In one embodiment, the time varying signal is a series of current pulses.

Optical components configured to produce optical intensity modulation include, for example, optical components configured to produce optical amplification, for example lasers and optical amplifiers, as well as components configured to reduce the intensity of the supplied light, for example intensity modulators. In one embodiment, the optical component is a gain-switched laser. In one embodiment, the optical component is a semiconductor gain-switched laser. In an alternative embodiment, the optical component is a gain-switched optical amplifier. In one embodiment, the optical component is a semiconductor gain-switched optical amplifier. In one embodiment, the optical component is an intensity modulator.

In one embodiment, the coherent light is supplied via a first aperture of the optical component, and said optical component is configured such that said plurality of light pulses are emitted from a second aperture of said optical component.

In one embodiment, the optical device further comprises a light distribution device, wherein coherent light is supplied to an aperture of said optical component via said light distribution device, wherein said optical component is configured to emit said plurality of light pulses from the same aperture. In one embodiment, the light distribution device is an optical circulator. In one embodiment, the light distribution device is an optical beam splitter.

In one embodiment, the optical device further comprises an optical isolator, configured to prevent said plurality of light pulses entering said coherent light source.

In one embodiment, light pulses emitted from said optical device comprise 10 or fewer photons. In some embodiments, the average number of photons per pulse is less than 1.

In one embodiment, the optical device is an optical device for use in a QKD system. In one embodiment, the optical device is an optical device for use in a QKD system based on the BB84 protocol. In one embodiment, the optical device is an optical device for use in a QKD system based on the COW protocol. In one embodiment, the optical device is an optical device for use in a QKD system based on the DPS protocol.

According to one embodiment, there is provided a sending unit for a quantum communication system, comprising an optical device, comprising an optical component, configured to produce optical amplification; a component configured to intermittently supply coherent light to said optical component; and a controller, configured to apply a time varying signal to said optical component such that a plurality of light pulses are emitted during each period of time that said coherent light is received, wherein the plurality of light pulses emitted during each period have a fixed phase relation.

According to one embodiment, there is provided a quantum communication system, comprising a sending unit comprising:
  an optical device comprising an optical component, configured to produce optical amplification; a component configured to intermittently supply coherent light to said optical component; and a controller, configured to apply a time varying signal to said optical component such that a plurality of light pulses are emitted during each period of time that said coherent light is received, wherein the plurality of light pulses emitted during each period have a fixed phase relation; and further comprising:
  a receiving unit, the receiving unit comprising an interferometer, wherein the interferometer comprises first and second optical paths with a difference in length between the first and second optical paths;
  wherein said controller is configured to apply a time varying signal such that the delay between a pair of consecutive light pulses emitted from said optical component matches the delay caused by the difference in length between said first and second optical paths in the interferometer, such that light pulses combine when exiting the interferometer.

According to one embodiment, there is provided a sending unit for a quantum communication system, comprising an optical device, comprising an optical component, configured to produce optical amplification; a component configured to supply coherent light to said optical component; a controller, configured to apply a time varying signal to said optical component such that a plurality of light pulses are emitted during each period of time that said coherent light is received, wherein the plurality of light pulses emitted during each period have a fixed phase relation; and an encoder, configured to encode information in the emission time of said light pulses or in the phase difference between said light pulses.

According to one embodiment, there is provided a quantum communication system, comprising a sending unit comprising:
  an optical device, comprising an optical component, configured to produce optical amplification; a component configured to supply coherent light to said optical component; a controller, configured to apply a time varying signal to said optical component such that a plurality of light pulses are emitted during each period of time that said coherent light is received, wherein the plurality of light pulses emitted during each period have a fixed phase relation; and an encoder, configured to encode information in the emission time of said light pulses or in the phase difference between said light pulses;
  a receiving unit, the receiving unit comprising an interferometer, wherein the interferometer comprises first and second optical paths with a difference in length between the first and second optical paths;
  wherein said controller is configured to apply a time varying signal such that the delay between a pair of consecutive light pulses emitted from said optical component matches the delay caused by the difference in length between said first and second optical paths in the interferometer, such that light pulses combine when exiting the interferometer.

According to one embodiment, there is provided a sending unit for a quantum communication system, comprising an optical device comprising:
  a coherent light source;
  a controller, configured to apply a signal to said coherent light source such that said coherent light source generates coherent light for a period of time;
  a phase control element, configured to apply a perturbation to said signal during said period of time, such that a phase shift is applied to part of the generated light;
  an optical component, configured to produce optical intensity modulation, wherein said coherent light source is configured to supply said generated light to said optical component;
  a second controller, configured to apply a time varying signal to said optical component such that a first light pulse is emitted during a period of time that said first part of the generated light is supplied, and a second light pulse is emitted during a period of time that said second part of the generated light is supplied.

According to one embodiment, there is provided a quantum communication system, comprising a sending unit comprising an optical device comprising:
  a coherent light source;
  a controller, configured to apply a signal to said coherent light source such that said coherent light source generates coherent light for a period of time;
  a phase control element, configured to apply a perturbation to said signal during said period of time, such that a phase shift is applied to part of the generated light
  an optical component, configured to produce optical intensity modulation, wherein said coherent light source is configured to supply said generated light to said optical component;
  a second controller, configured to apply a time varying signal to said optical component such that a first light pulse is emitted during a period of time that said first part of the generated light is supplied, and a second light pulse is emitted during a period of time that said second part of the generated light is supplied;

and further comprising a receiving unit, the receiving unit comprising an interferometer, wherein the interferometer comprises first and second optical paths with a difference in length between the first and second optical paths;

wherein said second controller is configured to apply a time varying signal such that the delay between the emission times of said first and second light pulses matches the delay caused by the difference in length between said first and second optical paths in the interferometer, such that said light pulses combine when exiting the interferometer.

According to one embodiment, there is provided a quantum communication method, comprising:

supplying coherent light to an optical component configured to produce optical amplification in a sending unit;

applying a time varying signal to said optical component such that a plurality of light pulses are emitted during each period of time that said coherent light is received, wherein the plurality of light pulses emitted during each period have a fixed phase relation;

encoding information in said light pulses;

sending encoded light pulses from the sending unit to a receiving unit comprising an interferometer, wherein the interferometer comprises first and second optical paths with a difference in length between the first and second optical paths; wherein the time varying signal is such that the delay between the emission times of said plurality of light pulses matches the delay caused by the difference in length between said first and second optical paths in the interferometer, such that said light pulses combine when exiting the interferometer.

In one embodiment, the quantum communication method is performed using a BB84 based protocol. In one embodiment, the quantum communication method is performed using a COW protocol. In one embodiment, the quantum communication method is performed using a DPS protocol.

In one embodiment, the method generates phase coherence between two or more short laser pulses for use in quantum communication systems.

According to an embodiment, there is provided an optical device, comprising;
a semiconductor substrate;
an optical component, configured to produce optical amplification;
a component configured to supply coherent light to the optical component, wherein the optical component configured to produce optical amplification and the component configured to supply coherent light are integrated on the semiconductor substrate; and
a first controller, configured to apply a time varying signal to said optical component such that a plurality of light pulses are emitted during each period of time that said coherent light is received.

In one embodiment, the component configured to supply coherent light is a semiconductor laser diode. The semiconductor laser diode may comprise a multiple quantum well layer. In one embodiment, the semiconductor laser diode comprises a quantum light emitter. The semiconductor laser diode may further comprise cladding layers. The semiconductor laser diode may further comprise layers configured to laterally confine generated light.

The semiconductor laser diode may be a distributed feedback laser. The semiconductor laser diode may comprise a diffraction grating. Alternatively, the semiconductor laser diode may be a ridge laser. In one embodiment, the optical component configured to produce optical amplification and the component configured to supply coherent light are arranged in a first plane which is substantially parallel to a surface of the substrate on which the optical component configured to produce optical amplification and the component configured to supply coherent light are integrated.

In one embodiment, the semiconductor laser diode is a distributed Bragg reflector laser.

Alternatively, the semiconductor laser diode is a vertical cavity surface emitting laser. In one embodiment, the component configured to supply coherent light is between the optical component configured to produce optical amplification and the substrate.

In one embodiment, the semi-conductor laser diode is electrically tunable.

In one embodiment, the optical component is a gain-switched laser. The coherent light is injected into said gain-switched laser. In one embodiment, the optical component is a semiconductor laser diode. The semiconductor laser diode may comprise a multiple quantum well layer. The semiconductor laser diode may be a distributed feedback laser. The semiconductor laser diode may comprise a diffraction grating. Alternatively, the semiconductor laser diode may be a ridge laser. Alternatively, the semiconductor laser diode is a vertical cavity surface emitting laser.

In one embodiment, the semi-conductor laser diode is electrically tunable.

In an alternative embodiment, the optical component is a gain-switched optical amplifier. In one embodiment, the optical component is a semiconductor optical amplifier.

In one embodiment, the optical component and the component configured to supply coherent light are edge emission lasers. In an alternative embodiment, they are vertical cavity lasers.

In one embodiment, the optical device further comprises a p-type electrode and an n-type electrode configured to form a p-n junction in a direction substantially perpendicular to a surface of the substrate on which the optical component configured to produce optical amplification and the component configured to supply coherent light are integrated.

In one embodiment, the substrate is a first conductivity type and the component configured to supply coherent light and the optical component each comprise a layer of a second conductivity type.

In one embodiment, the optical device further comprises a p-type electrode and an n-type electrode configured to form a p-n junction in a direction substantially parallel to a surface of the substrate on which the optical component configured to produce optical amplification and the component configured to supply coherent light are integrated.

In one embodiment, there is a region of a first conductivity type adjacent to a first edge of the component configured to supply coherent light and the optical component and a region of a second conductivity type adjacent to a second edge of the component configured to supply coherent light and the optical component.

In one embodiment, the optical device further comprises a waveguide region between the optical component configured to produce optical amplification and the component configured to supply coherent light to the optical component.

In one embodiment, the controller is integrated onto the substrate.

In one embodiment, the optical device comprises an integrated heat sink.

In an embodiment, the plurality of light pulses emitted during each period have a fixed phase relation.

In one embodiment, the component is configured to intermittently supply coherent light to the optical component. In one embodiment, the component is configured to supply continuous wave light to the optical component.

In one embodiment, the substrate is InP.

In one embodiment, said component configured to supply coherent light is a unit configured to supply coherent light. In one embodiment, said component configured to supply coherent light is a coherent light source. In an alternative embodiment, said optical component is further configured to intermittently generate said coherent light and said component configured to supply coherent light is a mirror, wherein said mirror is configured to reflect said generated coherent light back into said optical component.

The phase difference between a pair of consecutive light pulses emitted during a period of time during which coherent light is received by the optical component is the same as the phase difference between another pair of consecutive light pulses emitted during the same period of time, where the difference in emission time between the pair of consecutive light pulses is substantially the same for both pairs. Pulses which are emitted during a period of time during which the same long light pulse is received are referred to as intra-period.

The phase difference between a first pair of consecutive light pulses (pulse 1 and pulse 2) emitted during a first period of time during which coherent light is received by the optical component is the same as the phase difference between a second pair of consecutive light pulses (pulse 3 and pulse 4) emitted during a second period of time during which coherent light is received by the optical component (the phase difference between pulse 1 and pulse 2 is the same as the phase difference between pulse 3 and pulse 4) where the difference in emission time between the pair of consecutive light pulses is substantially the same for both pairs. In other words, the phase difference between any two consecutive intra-period pulses with the same difference in emission times is the same for all periods. The pulses emitted during each period have a fixed phase relation, in other words the relative phase of any two consecutive pulses emitted during a single period with the same difference in emission times is the same for all periods. The plurality of light pulses emitted during each period have a fixed phase relation, in other words, the relative phase of the intra-period pulses is fixed for all periods.

Although the phase difference between any two consecutive intra-period light pulses is described as being the same, in practice, there may be small differences in the phase difference for different pairs of light pulses. By describing the phase difference as being the same, it is meant that the phase difference is the same to within 45 degrees. In one embodiment, the phase difference between any two consecutive intra-period light pulses is the same to within 20 degrees. In one embodiment, the phase difference between any two consecutive intra-period light pulses is the same to within 5 degrees. In one embodiment, the phase difference between any two consecutive intra-period light pulses is the same to within a tolerance such that when the light pulses travel through an interferometer such as shown in FIG. 13, the resulting interference between the two consecutive intra-period light pulses gives the same detection result for each pair.

Pulses generated during periods when different long light pulses are incident are referred to as inter-period. The phase of a light pulse emitted in the first period of time during which coherent light is received by the optical component has a random relationship to the phase of a light pulse emitted in the second period of time during which coherent light is received by the optical component (the phase difference between pulse 2 and pulse 3 is random for example). Light pulses emitted during different periods do not have a fixed phase relation, i.e. the relative phase of inter-period pulses is not fixed. In other words, the phase difference between inter-period pulses is random.

Although the phase difference between inter-period pulses is described as being random, in practice there might be a finite amount of correlations between the phase of two inter-period pulses emitted in quick succession. By describing the phase difference as random, it is meant that these correlations are small and decay rapidly. In one embodiment, there are no measurable correlations for two inter-period pulses which are emitted 10 ns apart. In one embodiment, there are no measurable correlations for pulses emitted 100 ns apart.

In one embodiment, the optical device comprises a second controller, configured to supply a second time varying signal to said coherent light source that controls the generation of said coherent light, wherein said time varying signal and said second time varying signal are synchronised. In an alternative embodiment, the controller is further configured to supply to the coherent light source a second time varying signal that controls the generation of said coherent light, wherein said time varying signal and said second time varying signal are synchronised. In one embodiment, the second controller is integrated onto the substrate.

In one example, the components of the optical device are connected using waveguides, such as optical fibres. In another embodiment, the light pulses travel between the components through free space.

In one embodiment, the optical device comprises a tuning element. In one embodiment, the tuning element is integrated onto the substrate.

In one embodiment, the tuning element is a phase modulator.

The phase modulator can be positioned such that the optical component is between the phase modulator and the component configured to supply coherent light.

Alternatively, the phase modulator is positioned such that it is between the component configured to supply coherent light and the optical component. The phase modulator applies a phase shift to the coherent light before it is supplied to optical component. In this case, the relative phase of any two consecutive pulses emitted during a period when a single coherent light pulse is received with the same difference in emission times can therefore be different in different periods, depending on the phase modulation applied at the phase modulator. However, the relative phase of two pulses emitted during a period when a coherent light pulse is incident is not random, but is fixed. The relative phase will depend on the phase applied at the phase modulator. For example, the phase difference between two light pulses emitted when a first coherent light pulse is received and the phase difference between two light pulses emitted when a second coherent light pulse is received has a fixed relationship, which will depend on the phase applied at the phase modulator. The relative phase of any two pulses emitted during periods when different long light pulses were incident is not fixed, and is random. For example, the phase difference between a light pulse emitted when a first coherent light pulse is received and a light pulse emitted when a second coherent light pulse is received has a random relationship to the phase difference between a light pulse emitted when the second coherent light pulse is received and a light pulse emitted when a third coherent light pulse is received. In one embodiment, the phase modulator can apply a phase modulation a plurality of times during a period when one long light pulse is present or when CW light is present.

In one embodiment, the tuning element is an intensity modulator.

In one embodiment, the optical device further comprises an encoder, configured to encode information in the emission time of said light pulses or in the phase difference between said light pulses. In one embodiment, the encoder is integrated onto the substrate.

In one embodiment, the encoder is a phase modulator. The optical device may further comprise a controller configured to control the phase shift applied by said phase modulator. The phase modulator can be positioned such that light emitted from said coherent light source passes through said phase modulator, and the phase modulator is configured to apply a phase shift to part of said coherent light. The phase modulator can alternatively be positioned such that light pulses emitted from said optical component pass through said phase modulator. The phase modulator is configured to control the phase shift between a first light pulse emitted from said optical component and a second light pulse emitted from said optical component. For example, the phase modulator can be controlled to identify one of the light pulses based on the time it exits the optical component and apply a phase shift to that pulse. In one embodiment, the encoder is a phase control element, configured to apply a perturbation to a time varying signal applied to said coherent light source, such that a phase shift is applied to part of the generated coherent light.

In one embodiment, the encoder is an intensity modulator configured to allow light pulses emitted from said optical component to pass for selected emission times only. In one embodiment, the encoder is an intensity modulator configured to allow only part of the light from the coherent light source to enter the optical component. In one embodiment, the encoder is configured to modify said time varying signal applied to said optical component, preventing the emission of selected light pulses. In one embodiment, the encoder is configured to modify a time varying signal applied to the coherent light source, such that only part of the coherent light enters the optical component, thus preventing emission of corresponding light pulses from said optical component.

In one embodiment, the coherent light source comprises an intensity modulator, configured to reduce the intensity of part or all of the coherent light thus reducing the intensity of some or all of the light pulses. The intensity modulator may be integrated onto the substrate. In one embodiment, the optical device further comprises an intensity modulator, configured to reduce the intensity of some or all of the light pulses emitted from the optical component. In one embodiment, the optical device further comprises an intensity control element, configured to modulate the amplitude of the time varying signal, such that the intensity of said plurality of light pulses is varied. In one embodiment, the intensity control element modulates the amplitude of a time varying signal applied to the coherent light source, such that the intensity of the coherent light is varied, thus varying the intensity of the light pulses emitted from the optical component. The intensity control element is configured to control the intensity of said emitted light pulses. The intensity control element may be integrated onto the substrate.

In one embodiment, the coherent light source is a laser. In one embodiment, the coherent light source comprises a combination of several lasers. In one embodiment, the coherent light source is a gain-switched laser. In one embodiment, the coherent light source is a semiconductor gain-switched laser. In one embodiment, the coherent light source is configured to emit a plurality of long coherent light pulses.

In one embodiment, the time varying signal is an AC current combined with a DC bias current. In one embodiment, the time varying signal is a series of current pulses.

In one embodiment, the controller is configured to apply a time varying signal such that two light pulses are emitted during each period of time that coherent light is received by said optical component.

In one embodiment, the optical component is a gain-switched laser. The coherent light is injected into said gain-switched laser. In one embodiment, the optical component is a semiconductor gain-switched laser. In an alternative embodiment, the optical component is a gain-switched optical amplifier. In one embodiment, the optical component is a semiconductor gain-switched optical amplifier.

In one embodiment, the coherent light is supplied via a first aperture of the optical component, and said optical component is configured such that said plurality of light pulses are emitted from a second aperture of said optical component.

In one embodiment, the optical device further comprises a light distribution device, wherein coherent light is supplied to an aperture of said optical component via said light distribution device, wherein said optical component is configured to emit said plurality of light pulses from the same aperture. In one embodiment, the light distribution device is an optical circulator. In one embodiment, the light distribution device is an optical beam splitter. In one embodiment, the light distribution device is integrated onto the substrate.

In one embodiment, the optical device further comprises an optical isolator, configured to prevent said plurality of light pulses entering said coherent light source. In one embodiment, the optical isolator is integrated onto the substrate.

In one embodiment, light pulses emitted from said optical device comprise 10 or fewer photons. In some embodiments, the average number of photons per pulse is less than 1.

In one embodiment, the optical device is an optical device for use in a QKD system. In one embodiment, the optical device is an optical device for use in a QKD system based on the BB84 protocol. In one embodiment, the optical device is an optical device for use in a QKD system based on the COW protocol. In one embodiment, the optical device is an optical device for use in a QKD system based on the DPS protocol.

In one embodiment, the optical device further comprises a phase control element. In one embodiment, the phase control element is integrated onto the substrate.

In one embodiment, a phase control element is configured to apply a perturbation such that a phase shift is applied to the second half of a coherent light pulse generated by said coherent light source. Alternatively, the phase control element can apply phase modulation a plurality of times during a period when one coherent light pulse is generated. Alternatively, the coherent light source generates continuous wave (CW) coherent light. In this case, periods are defined, and the phase of the CW light emitted during each period can be modulated with respect to the phase of the CW light emitted during the previous period.

The phase control element is configured to control the phase between said emitted light pulses. The relative phase of any two consecutive pulses emitted during a period when a single coherent light pulse is received with the same difference in emission times can therefore be different in different periods, depending on the perturbation applied at the phase control element. However, the relative phase of two pulses emitted during a period when a coherent light pulse is incident is not random, but is fixed. The relative phase will depend on the perturbation applied at the phase control element. For example, the phase difference between two light pulses emitted when a first coherent long light pulse is received and the phase difference between two light pulses emitted when a second coherent light pulse is received has a fixed relationship, which will depend on the perturbation applied at the phase control element. The relative phase of any two pulses emitted during periods when different long light pulses were incident is not fixed, and is random. For example, the phase difference between a light pulse emitted when a first coherent light pulse is received and a light pulse emitted when a second coherent light pulse is received has a random relationship to the phase difference between a light pulse emitted when the second coherent light pulse is received and a light pulse emitted when a third coherent light pulse is received.

In one embodiment, the phase control element is configured to apply a perturbation to said signal during said period of time, such that a phase shift is applied to a first part of the generated light; and the optical device further comprises;
    a second controller, configured to apply a signal to said component configured to supply coherent light such that it generates coherent light for a period of time;
    wherein the first controller is configured to apply the time varying signal to said optical component such that a first light pulse is emitted during a period of time that said first part of the generated light is received, and a second light pulse is emitted during a period of time that a second part of the generated light is received.

In one embodiment, the controller and the second controller are synchronised. In one embodiment, the second controller is integrated onto the substrate.

In one embodiment, the coherent light source is configured to supply continuous wave light. In one embodiment, the coherent light source is configured to supply pulses of coherent light.

In one embodiment, the phase control element is further configured to apply a plurality of perturbations to said signal during said period of time, such that phase shifts are applied to a plurality of parts of the generated light.

In one embodiment, the coherent light source is a semiconductor laser, said signal is an electric current, and said perturbation is a short electric current pulse.

In one example, the components of the optical device are connected using waveguides, such as optical fibres. In another embodiment, the light pulses travel between the components through free space.

According to one example, there is provided an optical device compromising;
    a semiconductor substrate;
    a coherent light source;
    a controller, configured to apply a signal to said coherent light source such that said coherent light source generates coherent light for a period of time;
    a phase control element, configured to apply a perturbation to said signal during said period of time, such that a phase shift is applied to a first part of the generated light;
    an optical component, configured to produce optical intensity modulation, wherein said coherent light source is configured to supply said generated light to said optical component, wherein the coherent light source and the optical component configured to produce optical intensity modulation are integrated on the semiconductor substrate;
    a second controller; configured to apply a time varying signal to said optical component such that a first light pulse is emitted during a period of time that said first part of the generated light is received, and a second light pulse is emitted during a period of time that said a second part of the generated light is received.

Optical components configured to produce optical intensity modulation include, for example, optical components configured to produce optical amplification; for example lasers and optical amplifiers, as well as components configured to reduce the intensity of the supplied light, for example intensity modulators. In one embodiment, the optical component is a gain-switched laser. In one embodiment, the optical component is a semiconductor gain-switched laser. In an alternative embodiment, the optical component is a gain-switched optical amplifier. In one embodiment, the optical component is a semiconductor gain-switched optical amplifier. In one embodiment, the optical component is an intensity modulator.

According to one embodiment, there is provided a sending unit for a quantum communication system, comprising an optical device, comprising;
    a semiconductor substrate;
    an optical component, configured to produce optical amplification;
    a component configured to supply coherent light to the optical component, wherein the optical component configured to produce optical amplification and the component configured to supply coherent light are integrated on the semiconductor substrate; and
    a first controller, configured to apply a time varying signal to said optical component such that a plurality of light pulses are emitted during each period of time that said coherent light is received According to one embodiment, there is provided a quantum communication system, comprising a sending unit comprising:
    an optical device; comprising;
        a semiconductor substrate;
        an optical component, configured to produce optical amplification;
        a component configured to supply coherent light to the optical component, wherein the optical component configured to produce optical amplification and the component configured to supply coherent light are integrated on the semiconductor substrate; and
        a first controller, configured to apply a time varying signal to said optical component such that a plurality of light pulses are emitted during each period of time that said coherent light is received; and further comprising:
    a receiving unit, the receiving unit comprising an interferometer, wherein the interferometer comprises first and second optical paths with a difference in length between the first and second optical paths;
    wherein said controller is configured to apply a time varying signal such that the delay between a pair of consecutive light pulses emitted from said optical component matches the delay caused by the difference in length between said first and second optical paths in the interferometer, such that light pulses combine when exiting the interferometer.

In one embodiment, the optical device generates phase coherence between two or more short laser pulses for use in quantum communication systems.

The term vertical is used in this description to refer to the "out-of-plane" direction, i.e. the stacking direction of layers grown on the substrate.

The term lateral is used in this description to refer to the "in-plane" direction, i.e. parallel to the surface of the substrate on which layers are grown.

According to one embodiment, there is provided a method of fabricating an optical device, comprising the steps of:
i) forming an optical component configured to produce optical amplification and a component configured to supply coherent light to the optical component on a semiconductor substrate;
ii) electrically contacting a first electrode and a second electrode to the component configured to produce optical amplification, wherein the first electrode and the second electrode are connected to a controller, the controller being configured to apply a time varying electrical signal to the optical component such that a plurality of light pulses are emitted during each period of time that coherent light is received.

In one embodiment, step i) is performed by metal organic vapour phase epitaxy (MOVPE). Step i) may use a monolithically integrated approach or flip-chip bonding on a foreign carrier.

In one embodiment, the controller is configured to apply a time varying electrical signal to the optical component such that a plurality of light pulses are emitted during each period of time that coherent light is received such that the plurality of light pulses emitted during each period have a fixed phase relation.

In one embodiment, the step i) comprises the steps of:
forming a first active region;
forming at least one diffraction grating in the active region.

In one embodiment, the step i) comprises the steps of:
forming a first active region;
etching at least one gap in the active region.

In one embodiment, the step i) comprises the steps of:
forming the optical component configured to produce optical amplification;
forming the component configured to supply coherent light to the optical component;
flip-chip mounting the optical component configured to produce optical amplification and the component configured to supply coherent light to said optical component on the semiconductor substrate.

In one embodiment, the substrate is a first conductivity type, step i) comprises the step of forming a layer having a second conductivity type for each of the optical component configured to produce optical amplification and component configured to supply coherent light and step ii) comprises the steps of electrically contacting the first electrode to the substrate and electrically contacting the second electrode to the layer having the second conductivity type.

In one embodiment, step i) comprises the step of forming a first region of a first conductivity type adjacent to a first edge of the component configured to supply coherent light and the optical component and a second region of a second conductivity type adjacent to a second edge of the component configured to supply coherent light and the optical component and step ii) comprises the steps of electrically contacting the first electrode to the first region and electrically contacting the second electrode to the second region.

In one embodiment, the step i) comprises the steps of:
forming a buffer layer on the semiconductor substrate;
forming a first distributed Bragg reflector of a first conductivity type;
forming a first active region;
forming a distributed Bragg reflector of a second conductivity type;
forming a second active region;
forming a second distributed Bragg reflector of the first conductivity type;
etching the device to expose a part of the distributed Bragg reflector of the second conductivity type;
electrically contacting a third electrode to the substrate;
wherein step ii) comprises electrically contacting the first electrode to the second distributed Bragg reflector of the first conductivity type and electrically contacting the second electrode to the distributed Bragg reflector of the second conductivity type.

FIG. 1(a) is a schematic illustration of an arrangement used to generate coherent double light pulses with an asymmetric MZI. The asymmetric MZI can be used to generate two phase coherent pulses with a separation given by the length difference of the two arms of the interferometer. A light source 1 generates short light pulses 2 which enter asymmetric MZI 3. The interferometer consists of an input beam splitter 4 and an output beam splitter 5 connected by both a short optical path length 6 and a longer optical path length 7 which has an optical delay Δt 8.

At the input beam splitter the short light pulses are separated into two parts. The first part is sent along the short optical path length 6 inside the interferometer and the second part is sent along the long optical path length 7. At the output beam splitter 5 of the interferometer, the first part and the second part are combined onto a single fibre.

Pulses traveling along the long arm are delayed with respect to pulses traveling along the short arm, therefore the second part is delayed with respect to the first part by the optical delay Δt 8. As both pulses were generated by the same light source, they are coherent. The output therefore consists of two light pulses which have a fixed phase relation and are separated in time by a delay Δt 9.

A phase modulator (not shown) can be located on the short arm of the interferometer or the long arm of the interferometer. The phase modulator can introduce a phase shift between a pulse travelling along the long arm and a pulse travelling along the short arm and thus encode information in the phase difference between the two pulses. For QKD applications, the optical delay 8 should match the optical delay of an MZI at the receiver which is used to decode the information.

FIG. 1 (b) is a schematic illustration of an arrangement used to generate coherent double light pulses with an intensity modulator. The coherent light source 10 generates a long light pulse 11 which enters intensity modulator 12. The intensity modulator modulates the intensity of the incoming light pulses. The intensity modulator is switched between an "on" state and an "off" state in order to generate two short light pulses 13. In an "off" state, the intensity modulator reduces the intensity of the light to a low level. In an "on" state, the intensity modulator allows a larger fraction of the incoming light to exit. The intensity modulator is switched into the "on" state for brief periods when the long light pulse 11 is present, generating short light pulses. The extinction ratio between the "on" and "off" state of the intensity modulator determines the ratio between the maximum intensity of the modulated light and the minimum intensity of the modulated light.

Figure 1B:
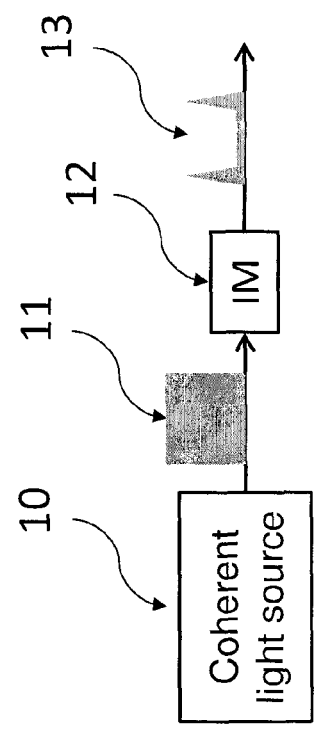
FIG. 1(b) is a schematic illustration of an arrangement used to generate coherent double light pulses with an intensity modulator.

In FIG. 1(a) and FIG. 1(b), a sequence of short coherent laser pulses that can be used for applications such as QKD are generated either by employing an optical interferometer or by modulating a laser with an intensity modulator. Both of the systems shown in FIGS. 1(a) and (b) serve to output short coherent light pulses. The light pulses are emitted in pairs, with a time delay between the pulses in the pairs. The phase difference between the two pulses in a pair is the same for each pair of pulses outputted from the system.

Figure 2A:
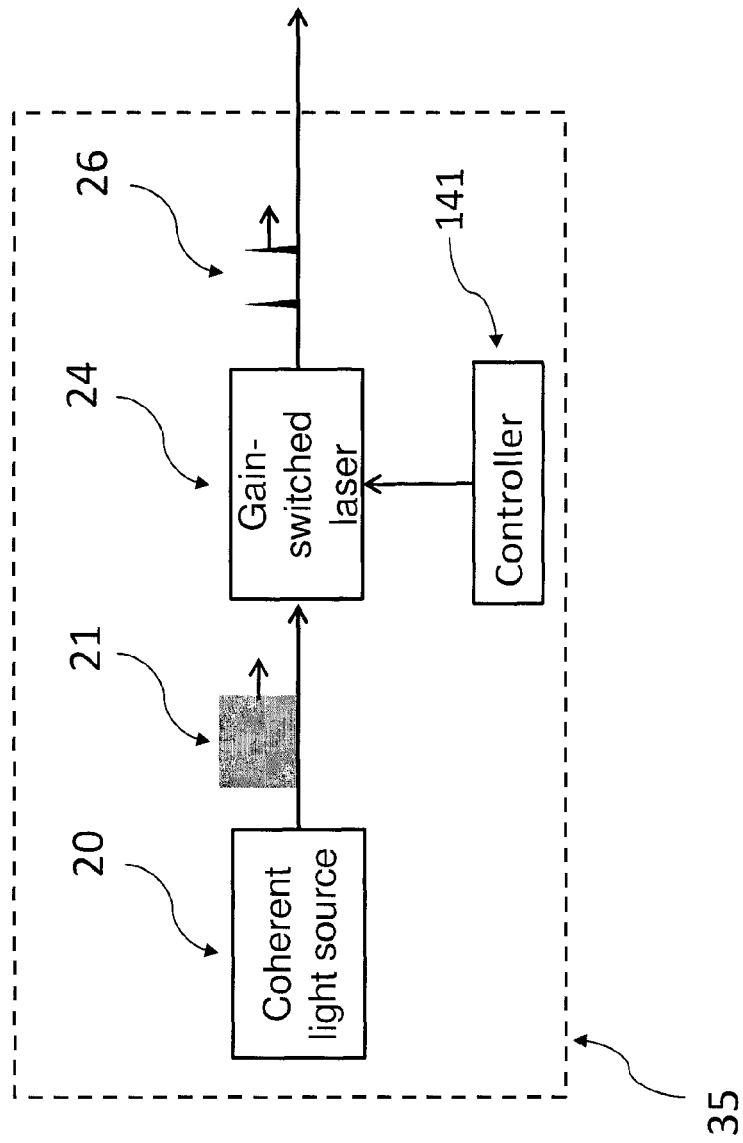
FIG. 2(a) is a schematic illustration of an optical device in accordance with an embodiment; comprising a gain-switched laser.

FIG. 2(a) is a schematic illustration of an optical device 35 in accordance with an embodiment. In an embodiment, the gain switched laser 24 and the coherent light source 20 are integrated on a substrate, as described in relation to FIGS. 18 to 33. In this device, the gain switched laser 24 controlled by the controller 141 substitutes the MZI of FIG. 1(a) or the intensity modulator of FIG. 1(b). The optical device 35 serves to output short light pulses. The controller 141 controls the emission time of the short light pulses such that they are emitted in pairs, and there is a time delay between the light pulses in each pair. Each pair of short light pulses is known as a double light pulse. The coherent light source 20 supplies a long pulse of coherent light to the gain switched laser 24 during the period that each double pulse is generated, such that the device outputs coherent double light pulses. The coherent double light pulses consist of an early pulse and a late pulse, whereby the phase difference between the early pulse and the late pulse is the same for each double pulse emitted from the optical device 35.

The phase difference between pulses which each belong to a different double pulse is random, because each double pulse is generated when a different long coherent light pulse is supplied. In other words, the phase difference between consecutive double pulses is random. This means that, for example in a QKD application, an unauthorised eavesdropper, Eve, cannot lock her measuring apparatus to this phase and thus perform a better measurement of Alice's pulses, which would limit the achievable distance over which secure transmission of a secret key can be guaranteed.

A coherent light source 20 is connected to a first aperture of a gain-switched laser 24 by a waveguide, for example an optical fibre. Alternatively, the light pulses may travel between the components of the optical device 35 through free space (meaning that no waveguides are required to connect the components such as the coherent light source 20 and the gain-switched laser 24).

A coherent light source is a light source that generates coherent light, in other words a light source that generates light with a constant relative phase. In one embodiment, the coherent light source 20 is a semiconductor laser diode. In one embodiment, the coherent light source 20 is a gain-switched semiconductor laser diode. Further examples of a coherent light source include fibre lasers and solid state lasers. It is to be understood that in practice, light generated by a laser is not perfectly coherent.

However, a laser is considered to be a coherent light source because the generated light has a high level of coherence.

Figure 3B:
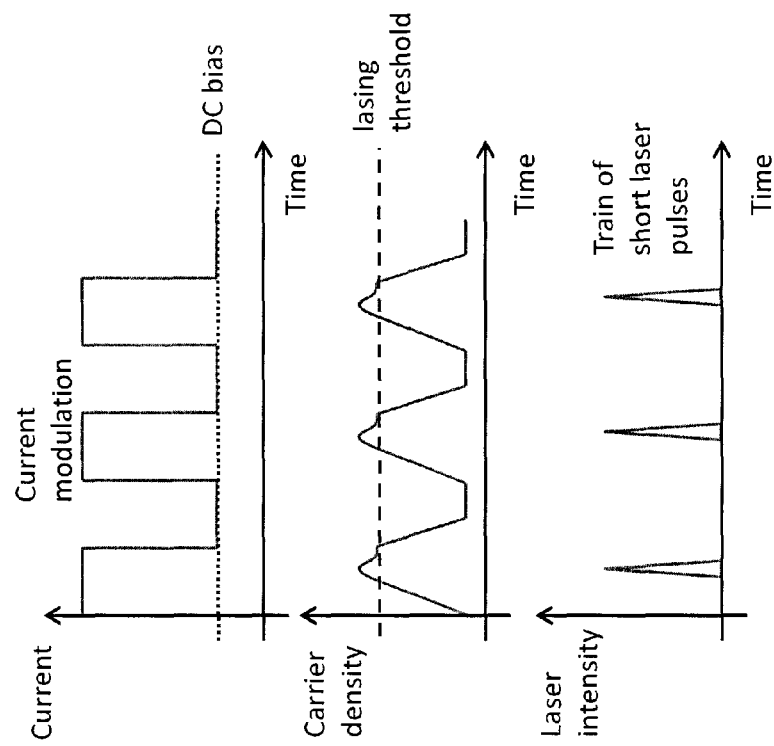
FIG. 3(b) shows three graphs illustrating a gain modulation of a gain-switched laser.
Figure 3A:
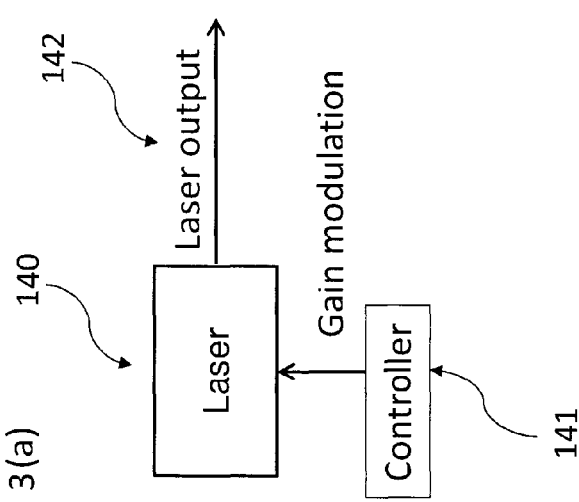
FIG. 3(a) is a schematic illustration of a gain-switched semiconductor laser.
Figure 3C:
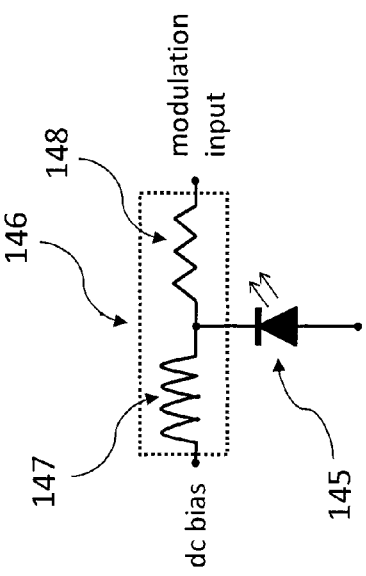
FIG. 3(c) is a schematic illustration of an electrical driving circuit for a semiconductor gain-switched laser.

The operation of the gain-switched laser is described later in relation to FIGS. 3(a) to (c). In one embodiment, the gain-switched laser 24 is a semiconductor laser. In an alternative embodiment, the gain-switched laser 24 is a fibre laser.

A semiconductor laser can be periodically switched above and below the lasing threshold by application of a time varying current. A controller 141 is connected to gain-switched laser 24, and modulates the gain of the laser, by applying a current through an electrical connection for the case of a semiconductor gain-switched laser 24. A second waveguide, for example an optical fibre is connected to a second aperture of the gain-switched laser 24.

Coherent light source 20 generates long light pulses 21. Where the coherent light source is a semiconductor gain-switched laser, a driving circuit applies a time varying current such that the coherent light source 20 is switched periodically above the lasing threshold, generating long light pulses. The current applied to the coherent light source 20 has the form of a series of current modulation pulses. The current may not be reduced to zero in between the current modulation pulses, but only to a bias value. The coherent light source 20 outputs light when the carrier density is above the lasing threshold. To generate longer pulses, the gain bias is chosen to be closer to the lasing threshold. This means that the carrier density crosses the lasing threshold earlier, which gives the light pulse more time to evolve. Initially the light intensity will overshoot and quickly reduce the carrier density. This in turn causes the photon density to decrease and the carrier density to increase, in turn increasing the light intensity. This competing process causes oscillations of the light intensity at the beginning of the pulse which are strongly damped, leading quickly to a steady-state where the intensity is constant. The oscillations are called relaxation oscillations. The laser pulse ends when the current pulse ends and switches the current to the bias value again.

In one embodiment, the duration of each of the long light pulses is greater than or equal to 200 ps. In one embodiment, the period between the long light pulses is greater than or equal to 100 ps.

Long light pulse 21 is emitted from coherent light source 20 into the waveguide, and enters gain-switched laser 24 through the first aperture. Controller 141 applies a time varying current to gain-switched laser 24 such that gain-switched laser 24 is switched above the lasing threshold twice during the time that long light pulse 21 is incident on the gain-switched laser 24, generating two short light pulses. The switching of the gain-switched laser 24 can be synchronised with the arrival of the long light pulses. For example, a time varying signal applied to the coherent light source 20 in order to generate long light pulses and the time varying signal applied to the gain-switched laser 24 in order to generate short light pulses can be synchronised to a master clock.

In order to switch the gain-switched laser above the lasing threshold, the controller 141 may supply the time varying current to an AC input of a bias-T connected to the gain-switched laser 24. A DC bias current may be supplied to a DC input. In one embodiment, the time varying current has a square type wave form, with a frequency of 2 GHz. In an alternative embodiment, the time varying current is an electrical sine wave generated by a frequency synthesizer. The time varying current can comprise signals with arbitrary pulse shape.

The gain-switched laser 24 has a good extinction ratio between the state when pulses are emitted and the "off" state. It can be used to generate very short pulses. In one embodiment, the duration of each of the short light pulses is less than 200 ps. In one embodiment, the duration of each of the short light pulses is less than 50 ps. In one embodiment, the duration of each of the short light pulses is of the order of a few picoseconds. In one embodiment, where the time varying current is a square wave current with a frequency of 2 GHz, the short light pulses are 500 ps apart.

A fraction of the coherent light from coherent light source 20 enters the optical cavity of the gain-switched laser 24 and causes coherence seeding of the gain-switched laser 24. The term coherence seeding can refer to laser seeding, or seeding by a coherent light source other than a laser.

During operation of the gain-switched laser 24 without injection of light from coherent light source 20 (i.e. without coherence seeding), when the gain-switched laser 24 is switched above the lasing threshold a light pulse is initiated by spontaneous emission, and the phase difference between the generated light pulses is random. When the light from coherent light source 20 is injected into the gain-switched laser 24 and the gain-switched laser 24 is switched above the lasing threshold, a pulse is initiated by stimulated emission caused by the injected coherent light. This is called coherence seeding. In order for coherence seeding to occur, the frequency of the injected light must match the frequency of the gain-switched laser 24 to within a certain range. In one embodiment, the difference in the frequency of the light supplied by the coherent light source 20 and the frequency of the gain-switched laser 24 is less than 30 GHz. In some embodiments, where the gain-switched laser 24 is a distributed feedback (DFB) laser diode the frequency difference is less than 100 GHz. In other embodiments, where the seeded laser is a Fabry-Perot laser diode, the frequency difference is less than 3 Terahertz.

When coherence seeding occurs, each time the gain-switched laser 24 is switched above the lasing threshold, the generated light pulse has a fixed phase relation to the injected coherent light. In one embodiment, the gain-switched laser 24 is switched above the lasing threshold twice during the time that each long light pulse is incident, therefore two coherent short light pulses 26 with the same difference between the emission time of each pulse are generated each time a long light pulse 21 is incident. The two short light pulses 26 can be collectively referred to as a coherent double pulse. For example, a first pair of light pulses (pulse 1 and pulse 2) is generated during a period when a first long light pulse is incident. Pulses generated during a period when one long light pulse is incident are referred to as intra-period. A second pair of light pulses (pulse 3 and pulse 4) is generated when a second long light pulse is incident and a third pair of pulses (pulse 5 and pulse 6) is generated when a third long light pulse is incident. Pulse 1 and pulse 2 are intra-period. Pulse 3 and pulse 4 are intra-period. Pulse 5 and pulse 6 are intra-period. The first pair of pulses, second pair of pulses and third pair of pulses have a fixed phase relation, in other words the relative phase of the pairs is the same for each pair. The phase difference between pulse 1 and pulse 2 is the same as the phase difference between pulse 3 and pulse 4 and the phase difference between pulse 5 and pulse 6. In other words, the phase difference between any two consecutive intra-period pulses is the same for all periods.

Pulses generated during periods when different long light pulses were incident are referred to as inter-period. For example, pulse 1 and pulse 3 are inter-period, pulse 2 and pulse 3 are inter-period, pulse 4 and pulse 5 are inter-period, pulse 1 and pulse 6 are inter-period. The phase difference between two inter-period pulses (pulse 2 and pulse 3 for example) is not fixed, and is random. For example, the phase difference between pulse 2 and pulse 3 has a random relationship to the phase difference between pulse 4 and pulse 5. This means that an unauthorised eavesdropper, Eve, cannot lock her measuring apparatus to this phase and thus perform a better measurement of Alice's pulses.

The phase difference between two consecutive inter-period pulses is only truly random if there is no phase coherence between consecutive long light pulses generated by the coherent light source 20. For a coherent light source 20 such as a semiconductor gain-switched laser, the laser emission is started by spontaneous emission. This is a random process, which means that the phase of the generated long light pulse will be random. In order that the random process of spontaneous emission is responsible for starting the laser emission for all long light pulses, the laser cavity needs to be completely empty before each long light pulse is generated. The number of photons in the cavity decays exponentially as soon as the carrier density falls below the lasing threshold. It may take around 100 ps until most of the photons have left the cavity, ensuring that no phase coherence exists with the subsequently generated long light pulse.

For a coherent light source such as a semiconductor gain-switched laser, the long light pulses generated exhibit a frequency chirp at the front of the pulse due to the change of the index of refraction inside the laser cavity related to the changing carrier density. For coherence seeding therefore the middle part of the long pulses may be used, where the laser is emitting in steady-state. Short light pulses are therefore generated from the gain-switched laser 24 when the middle part of the long light pulse is supplied, and are not generated when the start of the pulse is supplied.

The gain-switched laser 24 may be switched above the lasing threshold more than twice during the time a single long coherent light pulse is incident on the gain-switched laser 24. Pulses which are intra-period have a fixed phase relation. Pulses that are inter-period have a random phase relation. In other words, all of the short light pulses generated during a period when the same long light pulse is incident have a fixed phase relation. For example, where three light pulses (pulse 1, pulse 2 and pulse 3) are generated during a period when a first long light pulse is incident, with the time between the emission of pulse 1 and pulse 2 the same as the time between the emission of pulse 2 and pulse 3, the phase difference between pulse 1 and pulse 2 is the same as the phase difference between pulse 2 and pulse 3. Where a further three light pulses are generated during a period when a second long light pulse is incident (pulse 4, pulse 5 and pulse 6, again with the same time period between pulse emission times), the phase difference between pulse 4 and pulse 5 is the same as the phase difference between pulse 5 and pulse 6, and the phase difference between pulse 1 and pulse 2, and the phase difference between pulse 2 and pulse 3. However, the phase difference between pulse 1 and pulse 4 for example is random, as these pulses are inter-period.

It is possible to tailor the phase coherence of the pulse sequence produced, for example producing a pair of pulses which have a fixed phase relation (by seeding with the same long coherent light pulse) followed by a second pair of pulses which have a random phase compared to the first pair but have the same fixed phase relation with each other (by seeding with a second long coherent light pulse). Any number of coherent pulses can be followed by a second different number of coherent pulses, building up a tailored sequence of light pulses.

The generated short light pulses 26 are emitted from a second aperture in the gain-switched laser 24. The gain-switched laser apertures can be mirrors. The gain-switched laser resonator can comprise one very highly reflecting mirror and one mirror with lower reflectivity. This means that almost all of the photons inside the resonator will leave through the lower reflecting mirror. In order to cause coherence seeding, coherent light is therefore supplied to the gain-switched laser 24 through the highly reflecting mirror. The intensity of the light incident on the highly reflecting mirror must be large enough that enough light enters the laser cavity for the coherence seeding to take place. The short pulses generated in the gain-switched laser 24 then exit through the mirror with lower reflectivity. The mirror with higher reflectivity is therefore the first aperture (through which coherent light is supplied) and the mirror with lower reflectivity is the second aperture (through which the short light pulses are emitted). Both the first and second aperture need to be accessible. This can require modifications to a laser design. The reflectivity of the mirror on which the coherent light is incident may be reduced in order to allow enough light to enter the cavity to cause laser-seeding.

For successful coherence seeding the fraction of the coherent light 23 that enters the optical cavity of the laser has to be within certain limits which depend on the type of gain-switched laser that is used. In one embodiment, the optical power of the injected coherent light is at least 1000 times lower than the optical output power of the gain-switched laser 24. In one embodiment, the optical power of the injected coherent light is at least 100 times lower than the optical output power of the gain-switched laser 24. The coherent light source 20 can comprise a fixed optical attenuator that reduces the intensity of the long light pulses emitted. Alternatively, the coherent light source 20 can comprise an adjustable optical attenuator that is adjusted only slowly. The intensity of the generated short pulses depends on the intensity of the coherent light. With the correct driving conditions, no short pulses are generated at all if no coherent light is injected. The coherent light source can therefore comprise an intensity modulator that varies the intensity of the generated long light pulses before they are supplied to the gain-switched laser 24, in order to vary the intensity of the generated short light pulses. The optical device 35 can comprise a second optical attenuator that reduces the intensity of the short light pulses generated by the gain-switched laser 24, or an intensity modulator that varies the intensity of the short light pulses generated by the gain-switched laser 24.

In this device, a coherent pulse sequence is generated using coherence seeding. A first laser (coherent light source 20) is used as a source of coherent light in pulsed operation. The light from this first laser is injected into a second laser (gain-switched laser 24) which is operated in gain-switched mode, i.e. it is switched constantly above and below the lasing threshold. By injecting coherent light, instead of a completely random phase difference between subsequent light pulses, the coherence of the pulse sequence can be tailored. In some cases, the phase difference may drift over time due to ambient temperature changes or changes of the driving conditions of the coherent light source 20 for example. These drifts are much slower than the pulse repetition rate of the coherent light source 20 and can be compensated for by a phase control element which is described later in relation to FIG. 16.

The optical device is simple and low cost to manufacture, as precision matching of components is not required. The optical device allows a simple and compact transmitter to be manufactured. Short pulses can be generated (less than 50 ps), and a gain-switched laser has a good extinction ratio between the "on" and "off state".

Figure 2B:
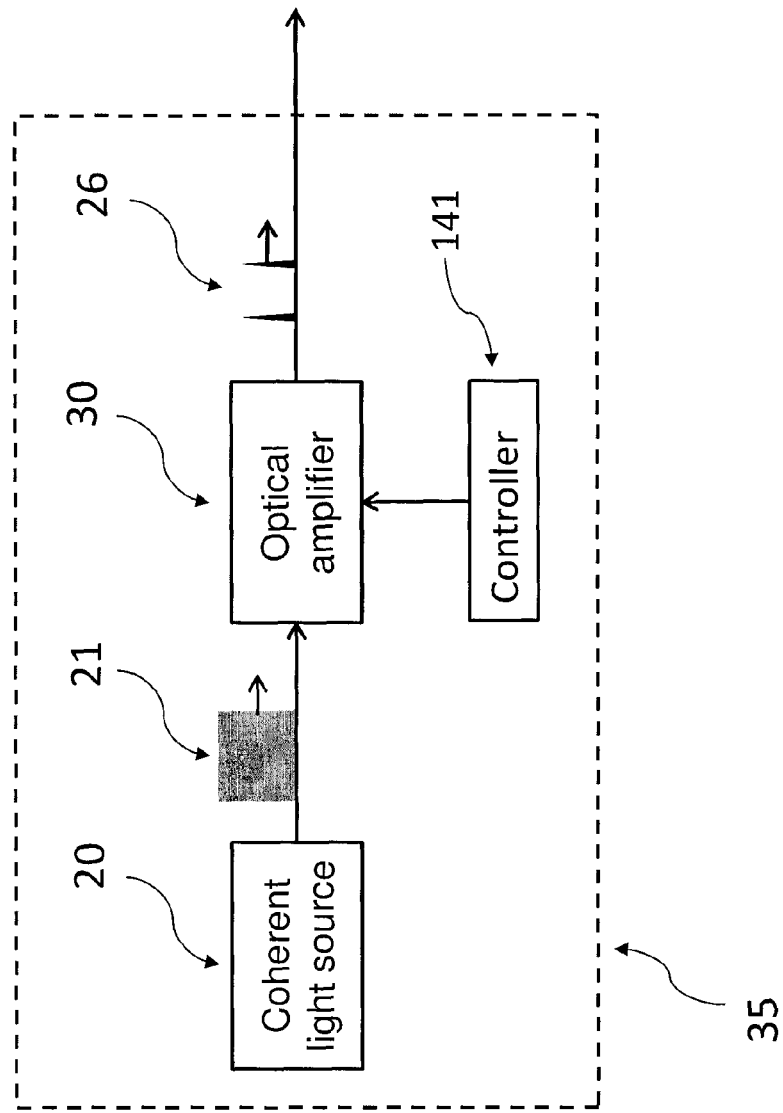
FIG. 2(b) is a schematic illustration of an optical device in accordance with an embodiment, comprising an optical amplifier.

FIG. 2(b) is a schematic illustration of an optical device 35 in accordance with an embodiment, comprising an optical amplifier 30. In an embodiment, the optical amplifier 30 and the coherent light source 20 are integrated on a substrate, as described in relation to FIGS. 18 to 33. In one embodiment, optical amplifier 30 is a semiconductor optical amplifier (SOA). In this device, the optical amplifier 30 controlled by the controller 141 substitutes the MZI of FIG. 1(a) or the intensity modulator of FIG. 1(b). The optical device 35 serves to output light pulses. The controller 141 controls the emission time of the light pulses such that the light pulses are emitted in pairs, and there is a time delay between the light pulses in each pair. Each pair of short light pulses is known as a double light pulse. The coherent light source 20 supplies coherent light to the optical amplifier 30. During a period when the coherent light is supplied, the controller 141 switches the optical amplifier 30 into an "on" state for two short periods, such that the optical device 35 can output coherent double light pulses. The coherent double light pulses consist of an early pulse and a late pulse, whereby the phase difference between the early pulse and the late pulse is the same for each double pulse emitted from the optical device 35.

A coherent light source 20 is connected to a first aperture of an optical amplifier 30 by a waveguide, for example an optical fibre. A controller 141 is connected to optical amplifier 30 and switches the optical amplifier 30 between an "on" state and an "off" state by applying a time-varying signal. The optical amplifier 30 is therefore gain-switched.

In order to modulate the gain of a SOA 30, the controller 141 applies a time varying signal, for example a time varying current which may have the form of a series of current modulation pulses. When a current modulation pulse is applied to the SOA, the injected carriers increase the carrier density and light inputted into the SOA is amplified sufficiently by stimulated emission to generate an output. At this point the current modulation pulse is timed to switch back down to the DC bias level, and the output dies off quickly. The output therefore consists of a train of short light pulses.

When the SOA 30 is switched into an "on" state, the incident coherent light is amplified and emitted from the SOA 30. When the SOA 30 is switched into an "off" state, incoming light is absorbed. A second waveguide, for example an optical fibre is connected to a second aperture of the optical amplifier 30.

Coherent light source 20 generates a long light pulse 21 which is emitted into an optical waveguide, such as an optical fibre. The optical waveguide is connected to the input of SOA 30. Long light pulse 21 enters SOA 30. The controller 141 applies the time varying current to SOA 30 such that SOA 30 is switched into an "on" state for a short period of time and switched into an "off" state for the periods between the "on" periods. The duration of the periods of time for which the SOA 30 is in an "off" state may be longer than the duration of the periods of time for which the SOA 30 is in an "on" state. In one embodiment, the duration of each of the short light pulses is less than 200 ps. In one embodiment, the duration of each of the short light pulses is less than 50 ps. In one embodiment, where the time varying current is a square wave current with a frequency of 2 GHz, the short light pulses are 500 ps apart.

In one embodiment, the SOA 30 is switched into the "on" state twice during the duration of time for which the incoming coherent long light pulse 21 is incident on SOA 30. A short laser pulse is emitted when the SOA 30 is switched into the "on" state during a period when coherent light is incident, therefore two coherent short laser pulses 26 are emitted each time a long light pulse 21 is incident. The two short light pulses 26 can be collectively referred to as a coherent double pulse. A first pair of pulses emitted from SOA 30 when a first long light pulse is incident and a second pair of pulses emitted from SOA 30 when a second long light pulse is incident have a fixed phase relation. The phase difference between the first pair of pulses is the same as the phase difference between the second pair of pulses. However, the phase difference between two pulses emitted during periods when different long light pulses were incident is random.

The SOA 30 may be switched into the "on" state multiple times during the period when coherent light is incident, generating a pulse sequence of coherent short laser pulses. All of the short pulses emitted during a period when the same long light pulse is incident have a fixed phase relation.

Figure 2C:
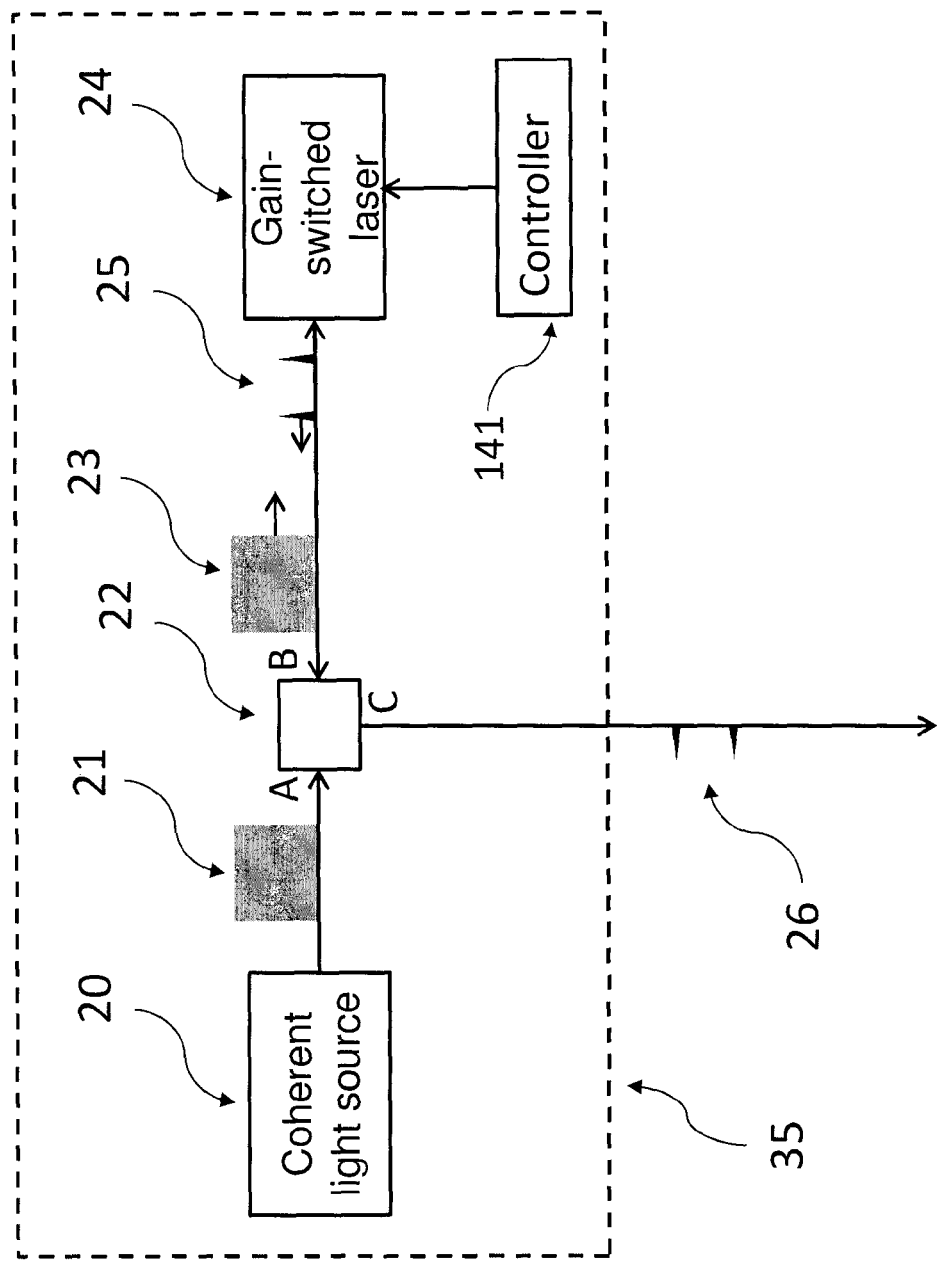
FIG. 2(c) is a schematic illustration of an optical device in accordance with an embodiment, comprising a gain-switched laser and a light distribution device.

FIG. 2(c) is a schematic illustration of an optical device 35 in accordance with an embodiment. In an embodiment, the gain switched laser 24 and the coherent light source 20 are integrated on a substrate, as described in relation to FIGS. 18 to 33. In this device, light is injected into and emitted from the same aperture of the gain switched laser 24. A light distribution device 22 is used to separate the generated short light pulses from the coherent light pulses.

In this device, the gain switched laser 24 controlled by the controller 141 substitutes the MZI of FIG. 1(a) or the intensity modulator of FIG. 1(b). The optical device 35 serves to output short light pulses. The controller 141 controls the emission time of the short light pulses such that they are emitted from gain-switched laser 24 in pairs, and there is a time delay between the short light pulses in each pair. Each pair of short light pulses is known as a double light pulse. The coherent light source 20 supplies coherent light to the gain switched laser 24 through light distribution device 22 during the period that each double pulse is generated, such that the device can output coherent double light pulses. The coherent double light pulses consist of an early pulse and a late pulse, whereby the phase difference between the early pulse and the late pulse is the same for each double pulse emitted from the optical device 35.

The coherent light source 20 is connected to port A of a light distribution device 22 by a waveguide, for example an optical fibre. Light distribution device 22 comprises at least three ports, but may comprise more than three ports. Light can enter or exit light distribution device 22 via the ports. Light distribution device 22 is configured such that light entering port A partly or mainly exits the light distribution device through port B. Port B of the light distribution device 22 is connected to an aperture of the gain switched laser 24 by an optical waveguide, such as an optical fibre. A controller 141 is also connected to gain-switched laser 24, such that it is able to modulate the gain of the laser, for example by applying a current through an electrical connection. Light distribution device 22 is configured such that light entering port B partly or mainly exits the light distribution device through port C. An optical waveguide, such as an optical fibre, is connected to port C of the light distribution device.

Long light pulse 21 is emitted from coherent light source 20 into the waveguide, and enters light distribution device 22 via port A. The long light pulse 23 exits port B of the light distribution device 22, and is injected into gain-switched laser 24. The controller 141 applies a time varying signal to the gain-switched laser 24 such that gain-switched laser 24 generates short light pulses 25 during the periods when the long light pulse is incident. Coherence seeding occurs as described previously.

The generated short light pulses 25 are emitted from the gain switched laser through the same aperture through which the long light pulse 23 was injected. The short light pulses 25 generated by the gain-switched laser 24 enter port B of the light distribution device 22. In one embodiment, the gain-switched laser 24 is switched above the lasing threshold twice during the period when the long light pulse 23 is incident therefore a coherent double light pulse 26 is output from port C.

Figure 2D:
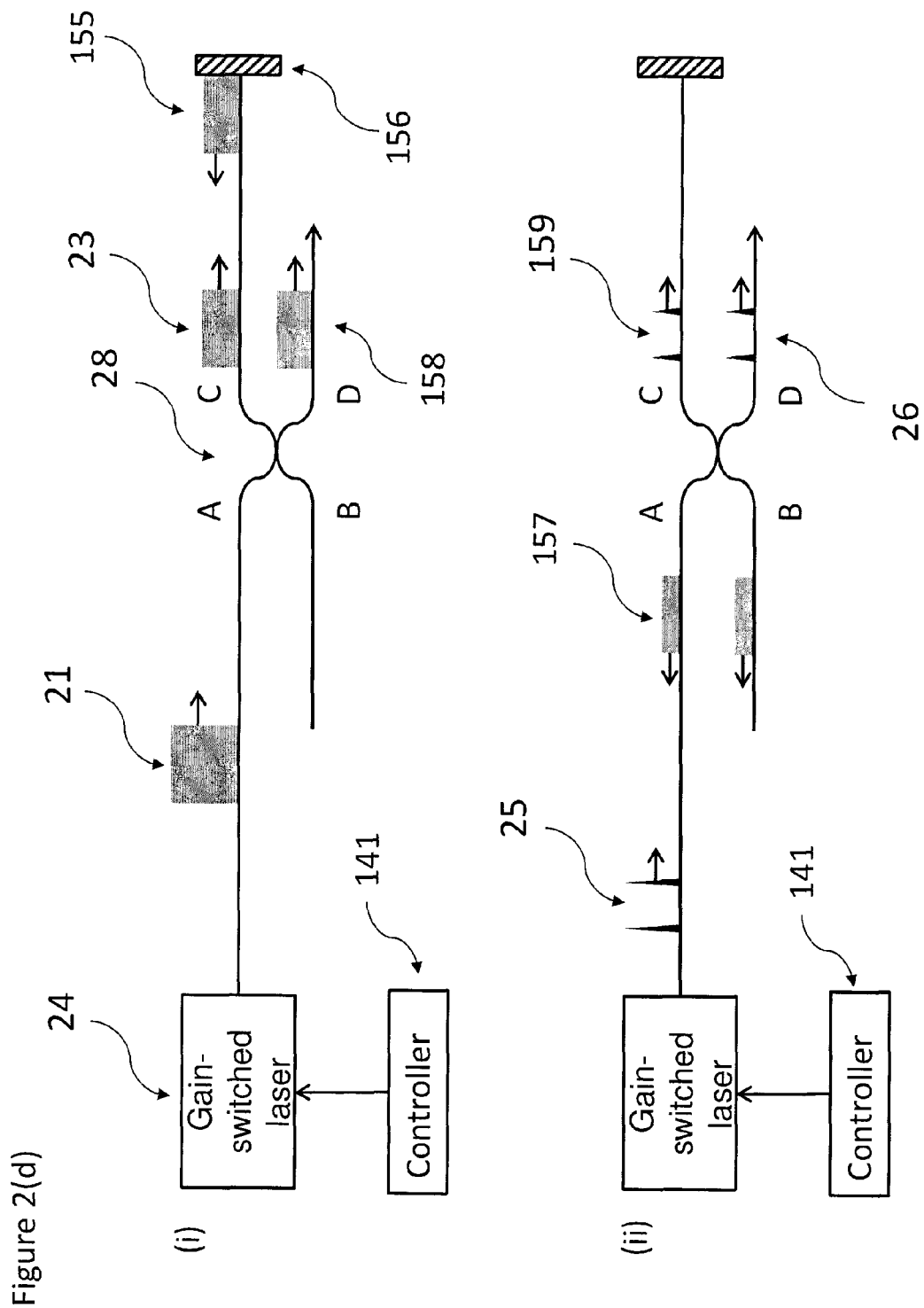
FIG. 2(d) is a schematic illustration of an optical device in accordance with an embodiment, comprising a gain-switched laser and a mirror.

FIG. 2(d) is a schematic illustration of an optical device in accordance with an embodiment, wherein the coherent light is generated by the same gain-switched laser 24 that generates the plurality of short light pulses. In an embodiment, the gain switched laser 24 and the mirror 156 are integrated on a substrate, as described in relation to FIGS. 18 to 33. There is no additional coherent light source. FIG. 2(d)(i) shows the optical device driven in a first mode. FIG. 2(d)(ii) shows the optical device driven in a second mode.

Gain-switched laser 24 is connected to port A of beam splitter 28 by an optical waveguide, such as an optical fibre. An optical waveguide such as an optical fibre connects port C of the beam splitter 28 to a mirror 156. Beam splitter 28 has four ports, A, B, C and D. A controller 141 is connected to gain-switched laser 24. Where gain-switched laser 24 is a semiconductor gain-switched laser, controller 141 is configured to apply a time varying current to the laser in order to generate light pulses. Controller 141 is configured to drive the gain-switched laser 24 in two different modes. FIG. 2(d)(i) shows the gain-switched laser 24 driven in a first mode.

In the first mode, long coherent light pulses are generated by switching the gain-switched laser 24 above the lasing threshold for a long first time period and then switching it below the lasing threshold for a second time period. The controller 141 applies a time varying current that switches the gain of the laser above and below the lasing threshold periodically. The laser outputs light when the carrier density is above the lasing threshold. To generate longer pulses, the gain bias is chosen to be closer to the lasing threshold. Alternatively, the AC modulation signal amplitude is increased. When a current pulse is applied, it takes a certain amount of time until the carrier density increases enough for lasing to start. There is therefore a delay between the start of the current pulse and the emission of the short pulse. If the gain bias is higher, this point will be reached earlier and emission will start earlier. As the current pulse is then still on for a longer time, the lasing does not die off but recovers from the initial overshoot. There will be an initial oscillation leading into a steady state. The amount of time that the current is still on after the emission starts can be changed by changing either the DC bias or the AC signal. For short pulse generation, it is exploited that the intensity initially overshoots and then reduces strongly, by stopping the current injection exactly at this point. If this is not done, the emission will continue in an oscillatory manner until it settles to a steady-state, and a longer light pulse can be generated.

Gain-switched laser 24 emits a long light pulse 21. A first fraction of the long light pulse entering beam splitter 28 through port A exits through port C of the beam splitter. A second fraction entering the beam splitter 28 through port A exits through port D of the beam splitter. The first fraction of light 23 that exits port C travels along the optical waveguide and is reflected at mirror 156. The reflected long light pulse 155 travels back along the waveguide in the opposite direction towards beam splitter 28.

After a long coherent light pulse is generated, controller 141 changes to a second driving mode. FIG. 2(d)(ii) shows the gain-switched laser 24 driven in the second mode. In the second mode, short light pulses 25 are generated by gain-switched laser 24. The controller 141 applies a different time varying current to the gain-switched laser 24 such that shorter light pulses are generated. For example, in the second driving mode, the controller 141 may apply a time varying current that has a decreased gain bias and shorter current pulses than in the first driving mode.

The reflected long light pulse 155 enters the beam splitter through port C. A first fraction of light exits the beam splitter through port A, and a second fraction exits the beam splitter through port B. The first fraction of light 157 is injected into gain-switched laser 24. In one embodiment, the time varying current applied to the gain-switched laser 24 in the second driving mode switches the gain-switched laser 24 above the lasing threshold twice during the period that the first fraction of light 157 is present, generating two short light pulses. In other words, during the time period that the short light pulses are generated, the gain-switched laser 24 is self-seeded by a fraction of the reflected long coherent light pulse 157. The fraction of the long coherent light pulse 157 is injected into gain-switched laser 24 causing the phase relation between the pair of short light pulses 25 to be fixed for each pair.

The two short light pulses are emitted from the gain-switched laser 24 and enter the beam splitter 28 through port A. A first fraction of the two short light pulses exit the beam splitter through port C, and a second fraction exit the beam splitter through port D. The output second fraction 26 is equivalent to the output of the optical devices of FIGS. 2(*a*) to 2(*c*). However, the total output of the optical device shown in FIG. 2(*d*) comprises a long coherent light pulse 158 followed some time later by two coherent short light pulses with fixed phase relation 26. The optical device may comprise an optical switch at port D, configured to block all light during times when long coherent light pulses are expected to be present at port D, and to let all light pass during times when short light pulses are expected to be present at port D. The optical switch can be synchronised with the controller 141.

FIG. 3(*a*) shows a schematic illustration of a gain-switched semiconductor laser. A gain-switched laser generates light when the laser is switched above the lasing threshold and generates almost no light when the laser is switched below the lasing threshold. Laser 140 has a controller 141 which allows modulation of the gain of the laser by modification of the pump power. The gain can be modulated in a time varying manner. Driving the laser in this manner can generate short laser pulses (of the order of picoseconds in duration) at the laser output 142.

If laser 140 is a semiconductor laser then it can be pumped electrically, by applying a current. In order to modulate the gain of a semiconductor laser, the controller 141 modulates the current applied to the laser.

If laser 140 is a fiber laser or solid state laser, it can be pumped optically. In order to modulate the gain of a fiber laser or solid state laser the controller 141 modulates the optical input applied to the laser.

FIG. 3(*b*) shows three graphs illustrating a gain modulation of a semiconductor gain-switched laser. The upper graph shows the current applied to the laser on the vertical axis, with time on the horizontal axis. The DC bias is indicated by a horizontal dotted line. The current applied to the laser has the form of a series of current modulation pulses. The wave is a square-type waveform. In this case, the current is not reduced to zero in between the current modulation pulses, but only reduced to a bias value (which is indicated by the dotted line).

The current modulation signal is applied to the laser and switches the gain of the laser above and below the lasing threshold periodically. The second graph shows the carrier density of the laser on the vertical axis, against time on the horizontal axis. The lasing threshold is indicated by a dashed horizontal line. When a current modulation pulse is applied to the laser, the injected carriers increase the carrier density and the photon density increases.

The laser output generated by the modulation signal is shown in the lower graph. The vertical axis shows the laser intensity, with time on the horizontal axis. The laser outputs light when the carrier density is above the lasing threshold. Photons generated by spontaneous emission inside the laser cavity are amplified sufficiently by stimulated emission to generate an output signal. The length of the delay between the application of the current modulation pulse and the generation of the output light depends on several parameters, such as the laser type, cavity length and pumping power.

The rapid increase of the photon density causes a decrease in the carrier density. This in turn decreases the photon density, which increases the carrier density. At this point the current modulation pulse is timed to switch back down to the DC bias level, and the laser emission dies off quickly. The laser output therefore consists of a train of short laser pulses as shown in the lower graph.

FIG. 3(*c*) shows a schematic illustration of an electrical driving circuit for a semiconductor gain-switched laser. The semiconductor gain-switched laser is laser diode 145. The cathode of laser diode 145 is connected to bias-T 146 comprising inductor 147 and resistor or capacitor 148. Via inductor 147 a DC bias current is sent through the laser diode. This provides the gain bias (the minimum level of the current indicated by the dotted line in FIG. 3(*b*)). Via resistor or capacitor 148 an AC modulation current is sent through the laser diode, providing the gain modulation needed for gain-switching the laser above and below the lasing threshold. In this case, the modulation input to the bias-T 146 is provided by controller 141.

FIG. 4(*a*) is a schematic illustration of an optical device in accordance with an embodiment, in which light distribution device 22 shown in FIG. 2(*c*) is an optical circulator 27. In an embodiment, the gain switched laser 24 and the coherent light source 20 are integrated on a substrate, as described in relation to FIGS. 18 to 33. Coherent light source 20 is connected to port 1 of optical circulator 27 by an optical waveguide, for example an optical fibre. Port 2 of said circulator is connected to gain-switched laser 24 by an optical waveguide. Optical circulator 27 is configured such that light entering port 1 of the optical circulator 27 exits through port 2, and light entering the optical circulator 27 through port 2 exits through port 3.

Coherent light source 20 generates a long light pulse 21, which travels along the optical waveguide and enters port 1 of optical circulator 27. Light from the long light pulse 21 mainly exits through port 2 of the circulator, although a small fraction of the light may be absorbed or exit through port 3. Light from long light pulse 21 exits the circulator as light pulse 23, which exits port 2 of optical circulator 27 and travels along the optical waveguide which is connected to gain-switched laser 24. Long light pulse 23 is injected into gain-switched laser 24. The gain-switched laser is seeded by the coherent light and generates short laser pulses which are phase coherent.

Controller 141 applies a time varying signal to gain-switched laser 24 such that gain-switched laser 24 is switched above the lasing threshold twice during the time that light pulse 23 is incident on the gain-switched laser 24. Gain-switched laser 24 therefore emits a coherent double pulse 25 which is emitted into the optical waveguide connected to the gain switched laser 24, and travels along the waveguide in the opposite direction to the long light pulse 23. Coherent double pulse 25 enters port 2 of the optical circulator 27. Coherent double pulse 26 exits port 3 of the optical circulator 27 into an optical waveguide, for example an optical fibre.

FIG. 4(b) is a schematic illustration of an optical device in accordance with an embodiment, in which the light distribution device 22 shown in FIG. 2(c) is an optical beam splitter 28. In an embodiment, the gain switched laser 24 and the coherent light source 20 are integrated on a substrate, as described in relation to FIGS. 18 to 33. Coherent light source 20 is connected to a port of an optical isolator 29 by an optical waveguide, such as an optical fibre. A second port of optical isolator 29 is connected to port A of beam splitter 28 by a second optical waveguide, such as an optical fibre.

Optical isolator is configured to allow light to pass which enters via the first port, but to prevent light from passing which enters via the second port. In an alternative embodiment that does not comprise an optical isolator, the output of the coherent light source is directly connected to port A of beam splitter 28 by a single optical waveguide such as an optical fibre. An optical waveguide such as an optical fibre connects port C of the beam splitter 28 to gain-switched laser 24.

Coherent light source 20 emits a long light pulse 21. A first fraction of the light entering beam splitter 28 through port A exits through port C of the beam splitter. A second fraction entering the beam splitter 28 through port A exits through port D of the beam splitter. The first fraction of light 23 that exits port C travels along the optical waveguide and is injected into the gain-switched laser 24. A controller 141 applies a time varying current to the gain-switched laser 24, and coherence seeding occurs as described previously. The coherent short light pulses 25 generated by gain-switched laser 24 are emitted back into the optical waveguide, and travel along the waveguide in an opposite direction to the long light pulse 23. The coherent short light pulses 25 enter beam splitter 28 through port C. A first fraction of the coherent short light pulses exits the beam splitter 28 through port A and a second fraction exits through port B. The output from port B is equivalent to the output 26 of the device described in FIG. 2(a), (b) or (c).

The first fraction of the coherent short light pulses exiting said beam splitter through port A is stopped at optical isolator 29. Optical isolator 29 therefore prevents light emitted from gain-switched laser 24 from entering coherent light source 20 and causing a disturbance in said light source. The output at port D of beam splitter 28 can be used for monitoring purposes.

Figure 5A:
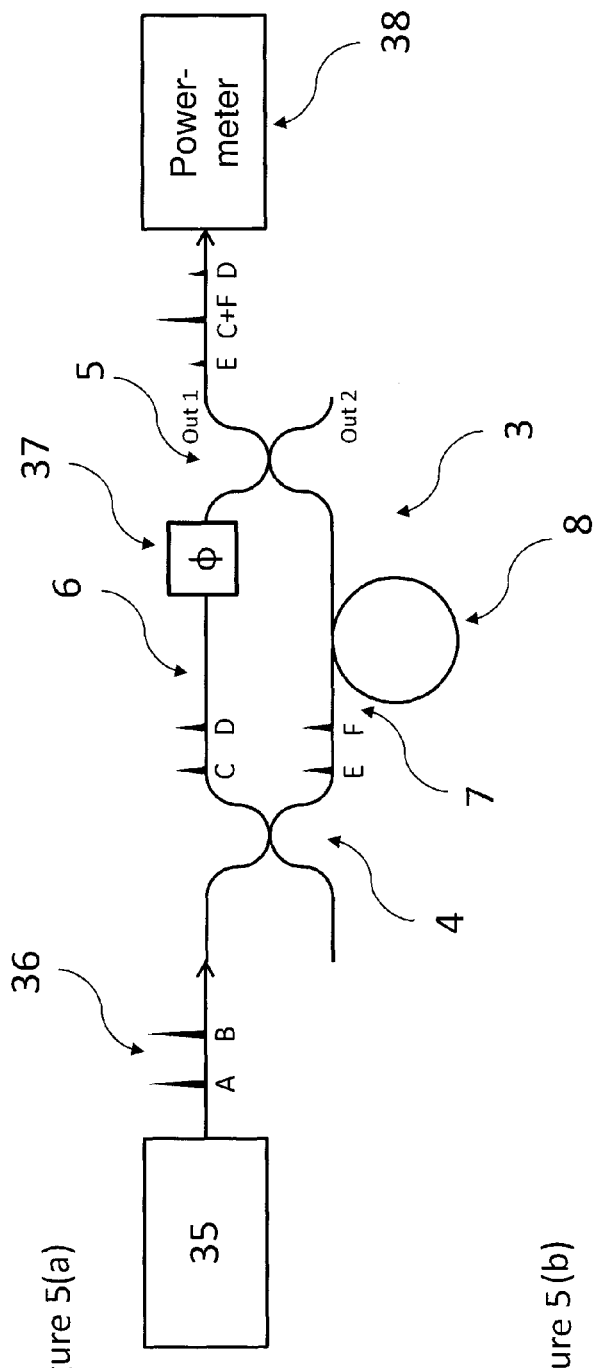
FIG. 5(a) is a schematic illustration of an experimental arrangement used to demonstrate phase coherence.

FIG. 5(a) is a schematic illustration of an experimental arrangement used to demonstrate phase coherence. Optical device 35 is a component such as is shown in FIGS. 2(a) to 2(d), and is connected to an asymmetric MZI 3 with an optical delay $\Delta t$ 8. The gain-switched laser 24 of the optical device 35 is switched above the lasing threshold twice during the period in which a long light pulse is incident. The time delay between the first pulse generated, pulse B, and the second pulse generated, pulse A, is $\Delta t$. The optical device 35 therefore generates a coherent double pulse 36 with a time delay between pulse A and pulse B that is equal to the optical delay $\Delta t$ 8 of the interferometer.

The coherent double pulse is emitted into an optical waveguide, such as an optical fibre. The optical waveguide is connected to a first input of input beam splitter 4 of the MZI 3. A first output of input beam splitter 4 is connected to the shorter arm 6 of the MZI. The shorter arm of the MZI comprises an optical waveguide connected to the input of a phase shifting element 37. The phase shifting element 37 is a small heater that heats a small section of the waveguide in the shorter arm of the MZI and thereby changes the phase of the light travelling the shorter arm. The phase change applied to the light is proportional to the power applied to the heating element, i.e. the voltage squared. The output of the phase shifting element 37 is connected to a first input of the output beam splitter 5. The second output of the input beam splitter 4 is connected to the longer arm 7 of the MZI. The longer arm 7 of the MZI comprises an optical delay $\Delta t$ 8. Longer arm 7 of the MZI is connected to the second input of output beam splitter 5. Light travelling along the longer arm 7 of the MZI is delayed with respect to light travelling along the shorter arm 6 of the MZI by the optical delay $\Delta t$ 8. Output 1 of output beam splitter 5 is connected to optical power meter 38.

Pulse B of the coherent double pulse enters the interferometer first and is split into pulse D and F by the input beam splitter 4. Pulse D travels along the shorter path 6 of the interferometer and pulse F travels along the longer path 7. After time $\Delta t$ pulse A of the coherent double pulse enters the interferometer and is split into pulse C and E by the input beam splitter. Pulse C travels along the shorter arm 6 and pulse E travels along the longer arm 7. Inside the interferometer pulse E and F are delayed by $\Delta t$ as they travel through the longer arm 7 of the interferometer. At the output beam splitter 5 therefore, pulse D arrives first; pulse C and F arrive at the same time (which is a time $\Delta t$ after pulse D arrives) and interfere; and pulse E arrives last (at a time $\Delta t$ after pulses C and F). Depending on the phase difference between pulse C and F, a first fraction of light exits the output beam splitter 5 through output 1 and a second fraction exits through output 2. If the phase difference is exactly 0 degrees, all light from pulses C and F exits through output 1; if the phase difference is exactly 180 degrees, all light from pulses C and F exits through output 2. Pulses E and D do not interfere with anything and therefore are just split at the output beam splitter. This means that there will always be a constant background optical power detected coming from these pulses.

Optical power meter 38 is connected to output 1 of interferometer 3 by an optical waveguide, such as an optical fibre. Optical power meter 38 measures the time averaged power of the light that exits through output 1. A large number of coherent double pulses (each comprising a pulse A and a pulse B) are generated by the optical device 35 over a period of time. The coherent double pulses are split at input beam splitter 4. Thus each coherent double pulse emitted from the optical device 35 can result in a set of pulses D and F and C and E travelling through the interferometer. If the phase relation between the coherent double pulses is fixed (such that the phase difference between pulse A and pulse B is the same for all of the coherent double pulses generated) then the phase relation between the pulses C and F is also fixed (such that the phase difference between pulse C and pulse F is the same for all of the coherent double pulses generated), and the fraction of light exiting the interferometer through output 1 is the same for each pair. This fraction can be varied by changing the phase difference between the short arm 6 and long arm 7 of MZI 3, by applying a voltage to the phase shifting element 37.

If the phase relation between a pair of pulses A and B is not fixed (such that the phase difference between pulse A and pulse B is a random value for each of the coherent double pulses generated) then the phase relation between pulses C and F is not fixed and the fraction of light exiting the interferometer through output 1 is random for each pair of coherent double pulses emitted.

Figure 5B:
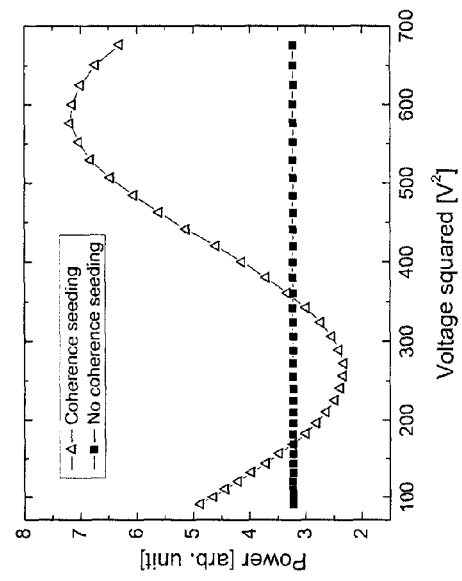
FIG. 5(b) is a graph of the time averaged power measured at an output of an asymmetric MZI against the voltage squared applied to the phase shifting element in the MZI.

FIG. 5(b) shows a graph of the power measured at output 1 with optical power meter 38 against the voltage squared applied to the phase shifting element 37 inside the interferometer. The vertical axis shows the time averaged power measured at the optical power meter 38, in arbitrary units. The horizontal axis shows the voltage squared applied to the phase shifting element 37 in units of $V^2$. The phase shift generated by phase shifting element 37 in short arm 6 of interferometer 3 is proportional to the voltage squared that is applied to the phase shifting element 37. The horizontal axis is therefore a measure of the phase shift applied. The power measured with optical power meter 38 at output 1 is a time average of the interference measured for many coherent double pulses 31 generated by optical device 35.

If the phase relation between pulse A and B is fixed, the time averaged power measured at output 1 depends on the phase difference between the short arm 6 and the long arm 7 of the interferometer 7. The phase difference between the short arm 6 and the long arm 7 of the interferometer is set by phase shifting element 37, and is proportional to the voltage squared applied to the phase shifting element 37. The measured power at optical power meter 38 as a function of the voltage squared applied to phase shifting element 37 where the phase relation between pulse A and B is fixed (and correspondingly the phase relation between pulse C and F is fixed) is shown as open triangles on the graph. It can be clearly seen that the output power measured at the optical power meter varies with the applied voltage squared in a sinusoidal manner.

The measured power at the optical power meter as a function of applied voltage squared where the coherent light source 20 inside the optical device 35 is switched off is shown as the solid squares on the graph. When the coherent light source 20 inside the optical device 35 is switched off, the pulses generated by gain switched laser 24 have a random phase relation and the time average of the interference of many double pulses measured at optical power meter 38 does not vary. In other words, if the phase relation between pulse A and B is random, the time averaged power measured by the optical power meter 38 is the mean value of the shot-by-shot random fraction of the light exiting the interferometer through output 1, which is independent of the phase difference between the short arm 6 and the long arm 7.

Figure 6A:
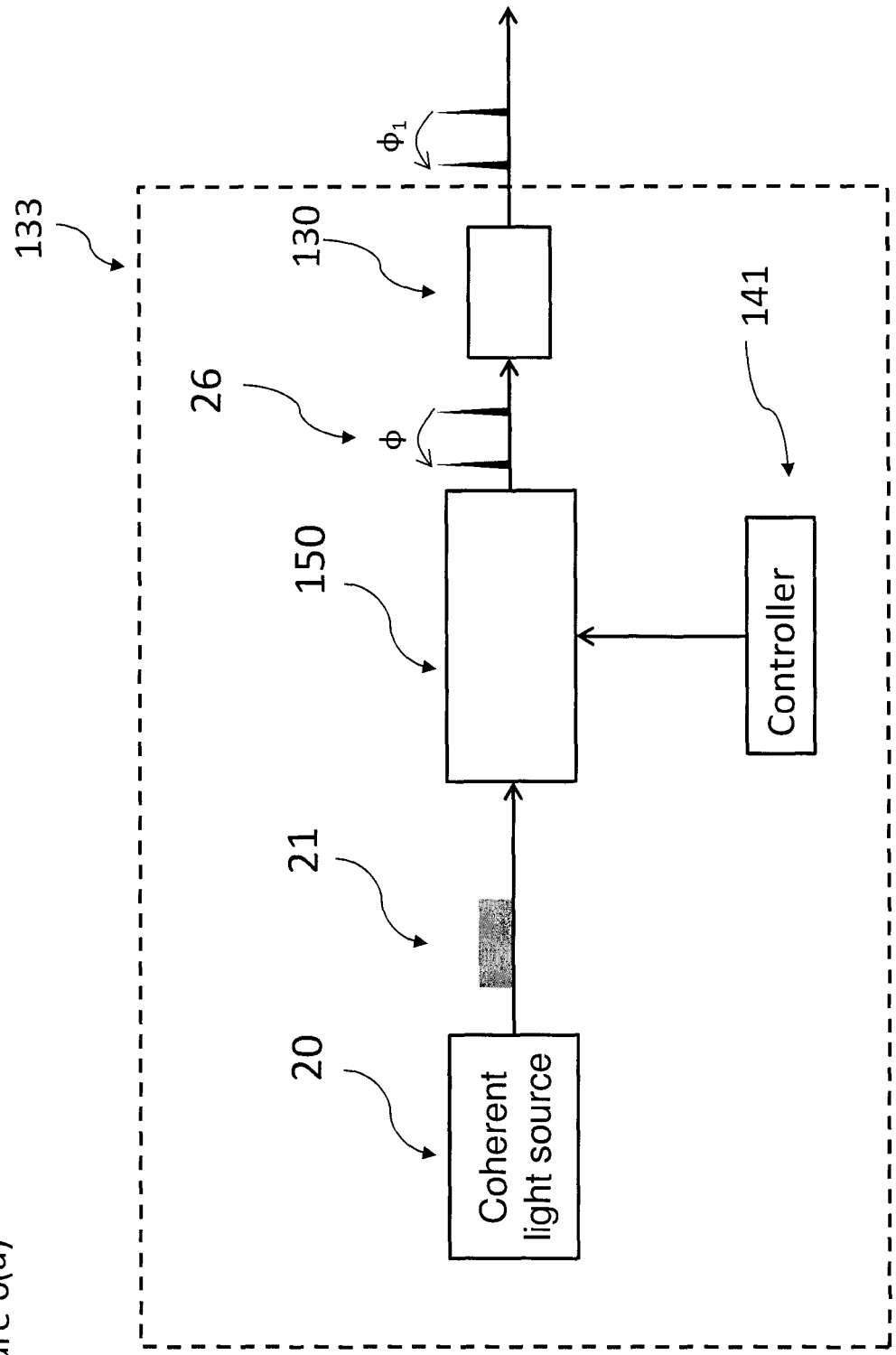
FIG. 6(a) is a schematic illustration of an optical device in accordance with an embodiment, comprising a phase modulator.

FIG. 6(a) is a schematic illustration of an optical device 133 in accordance with an embodiment, comprising an encoder that is a phase modulator 130. In an embodiment, the optical component 150 and the coherent light source 20 are integrated on a substrate, as described in relation to FIGS. 18 to 33. In one embodiment, the phase modulator 130 is also integrated on the substrate. In order to implement a QKD protocol, the phase between consecutive coherent light pulses can be modulated in order to encode information. The phase is modulated using a phase modulator 130. Optical component 150 can be a gain-switched laser. Alternatively, optical component 150 can be an optical amplifier. In alternative embodiments in which light enters and exits the optical component 150 via the same aperture, the device further comprises a light distribution device 22 such as described previously. In alternative embodiments, the optical component is a gain-switched laser, and the optical device does not comprise a coherent light source, the coherent light being supplied by the optical component itself via a mirror.

Coherent light source 20 supplies coherent light to optical component 150. In some embodiments, coherent light source 20 supplies a long light pulse 21. In alternative embodiments, coherent light source 20 supplies CW coherent light.

A coherent double pulse 26 exits the optical component 150 through an optical waveguide, such as an optical fibre, which is connected to the input of a phase modulator 130. The controller 141 supplies a time varying signal such that the optical component 150 is switched to an "on" state twice during the period that the long coherent light pulse is incident. The optical component 150 therefore emits a coherent double pulse. The phase difference between the first light pulse in the coherent double pulse 26 and the second light pulse in the coherent double pulse 26 is φ. The coherent double pulse exits the optical component 150 through an optical waveguide, such as an optical fibre, which is connected to the input of a phase modulator 130. The coherent double pulse passes through the phase modulator 130.

There may be a second controller that controls the phase shift applied by the phase modulator 130, by controlling the voltage applied to an electro-optic phase modulator. Different voltages are applied to the phase modulator 130 during the transit of the first pulse and the second pulse so as to impart a different phase modulation to each pulse. A phase modulator such as described can comprise a crystal, such as a $LiNbO_3$ crystal, in which the refractive index is a function of electric field strength. Based on the times that pulses are emitted from the optical component 150 the controller can identify each of the pulses of the coherent double pulse, in order to apply a phase shift between the pulses. For example, the time varying signal applied to the coherent light source 20 in order to generate long light pulses, the time varying signal applied to the optical component 150 in order to emit short light pulses and the controller that controls the phase modulator 130 can be synchronised to a master clock.

Alternatively the phase modulation can be provided by passive means, for example, a plurality of fixed phase elements which are each configured to apply a different fixed phase difference and a switch configured to select each of the said components. A second controller controls the phase shift applied to each pulse by controlling the switch.

Alternatively, the phase modulator 130 can be positioned between the coherent light source 20 and the optical component 150, such that the phase modulator 130 applies a phase shift to the coherent light before it is supplied to the optical component 150. For example, the phase modulator 130 can apply a phase shift when the second half of a long light pulse generated by coherent light source 20 is present. The long light pulse is then supplied to the optical component 150. A time varying signal is applied to the optical component 150 such that it emits short light pulses. A short light pulse is emitted from the optical component 150 once during the period when the first half of the long light pulse is present and once when the second half of the long light pulse is present. The phase difference between the first and second short light pulses is determined by the phase shift applied to the second half of the long light pulse by the phase modulator 130. The phase modulator 130 can apply a phase modulation a plurality of times during a period when one long light pulse is present or when CW light is present.

FIG. 6(b) is a schematic illustration of an optical device 133 in accordance with an embodiment, using a time bin encoder. In an embodiment, the optical component 150 and the coherent light source 20 are integrated on a substrate, as described in relation to FIGS. 18 to 33. In order to implement a coherent one-way QKD (COW-QKD) protocol, information can be encoded in the emission time of coherent light pulses. Coherent light source 20 generates CW light 132, which is incident on optical component 150. Where the optical component is a semiconductor gain-switched laser, controller 141 supplies a time varying current to the gain-switched laser such that it is switched above and below the lasing threshold in order to generate short light pulses. Where the optical component is a semiconductor optical amplifier, controller 141 supplies a time varying current to the semiconductor optical amplifier such that it is switched on and off in order to generate short light pulses. An encoder 131 modifies the time varying current in order to encode information in the emission time of the light pulses. The encoder can comprise a variable attenuator or several variable attenuators. The attenuator can block selected current pulses entirely, such that no light pulses are emitted from the optical component 150. Alternatively, the controller 141 itself can provide an arbitrary pattern of pulses, removing the need for an attenuator. For example, the controller 141 can be a pattern generator.

Periods are defined by the encoder, such that during each period, the time varying current is initially configured such that two coherent light pulses are emitted. The periods are indicated on the figure with dashed lines. In order to encode information, the encoder modifies the time varying current applied by the controller 141 such that it switches the gain-switched laser 24 above the lasing threshold only once during a period, instead of twice. The phase difference between each of the pulses is φ. The COW-QKD protocol and encoding are described in more detail later in relation to FIG. 15.

Alternatively, a time bin encoder can prevent emission of part of the long light pulse from coherent light source 20, thus preventing emission of a short light pulse from the optical component 150. Under the correct driving conditions it is possible not to generate a short light pulse if no coherent light is injected into a gain-switched laser or an optical amplifier. Particularly for an optical amplifier, if no light is injected, no light will be emitted. For a laser for example, the modulation signal can be reduced such that the carrier density does not cross the lasing threshold. If no coherent light is injected, therefore, no short light pulses are generated. When the coherent light is injected however, the lasing threshold is reduced, meaning that the carrier density crosses the lasing threshold and short light pulses are generated.

For example, where the coherent light source 20 is a semiconductor gain-switched laser, a series of current pulses is applied to the coherent light source 20 in order to generate long light pulses. By modifying the length of the current pulse applied to the coherent light source 20, and/or modifying the gain bias, a shorter light pulse is generated from the coherent light source 20. When the shorter light pulse is supplied to the optical component 150 only one short light pulse is generated for the period. Even though the optical component 150 is switched into the "on" state twice, no coherent light is supplied to the optical component 150 during one of the times that it is switched into the "on" state, thus no short light pulse is generated.

Alternatively, the coherent light source can comprise an intensity modulator, which can block part of the coherent light pulses before they are supplied to the optical component 150 such that a shorter coherent light pulse is supplied.

Figure 6:
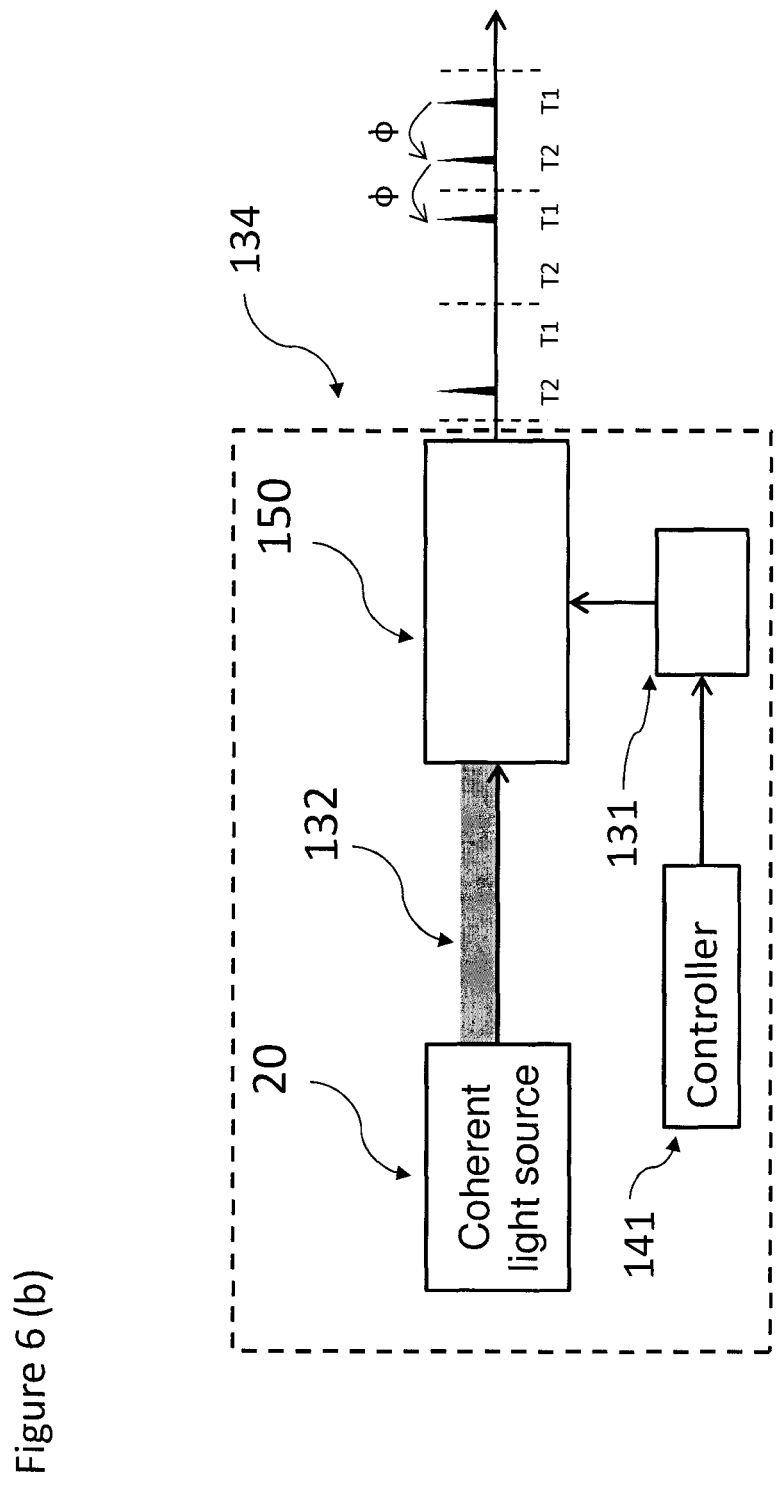
FIG. 6(b) is a schematic illustration of an optical device in accordance with an embodiment, comprising a time bin encoder.
FIG. 6(c) is a schematic illustration of an optical device in accordance with an embodiment, comprising an intensity modulator.
Figure 6C:
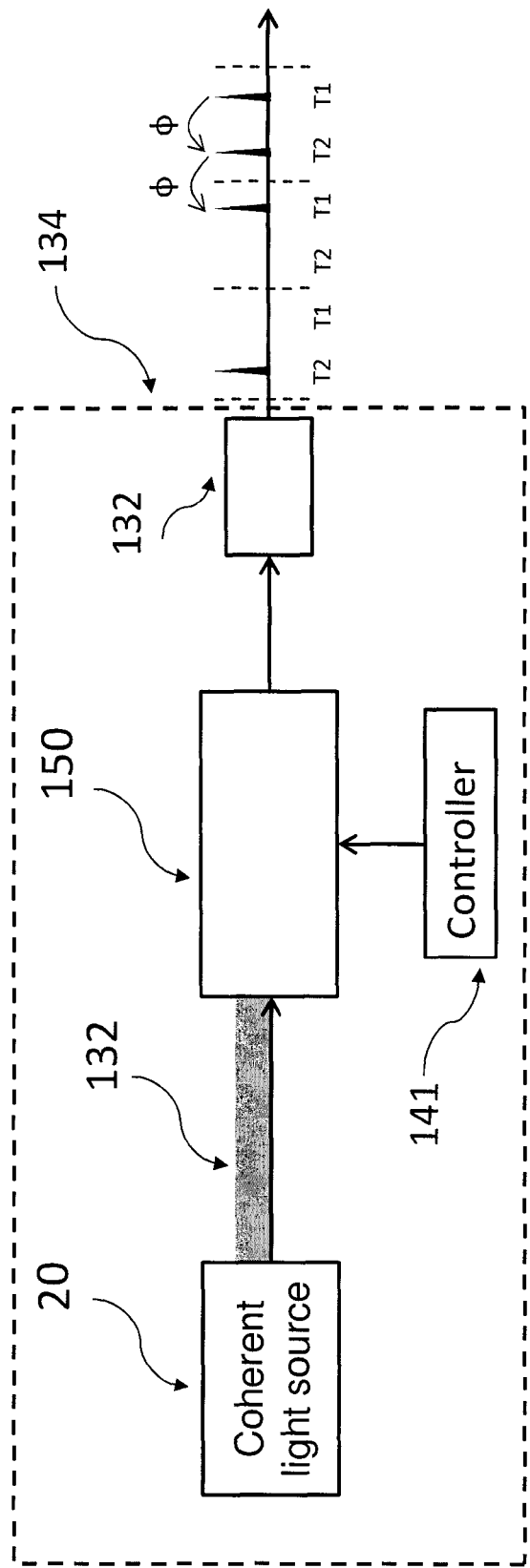

FIG. 6(c) is a schematic illustration of an optical device 133 in accordance with an embodiment, using an intensity modulator 132 as a time bin encoder. In an embodiment, the optical component 150 and the coherent light source 20 are integrated on a substrate, as described in relation to FIGS. 18 to 33. The intensity modulator 132 can also be integrated onto the substrate. The intensity modulator 132 is implemented after optical component 150 in order to encode the information. Coherent light source 20 generates CW light, which is incident on optical component 150. Where the optical component is a semiconductor gain-switched laser, controller 141 supplies a time varying current to the gain-switched laser such that it is switched above and below the lasing threshold in order to generate short light pulses. Where the optical component is a semiconductor optical amplifier, controller 141 supplies a time varying current to the semiconductor optical amplifier such that it is switched on and off in order to generate short light pulses. The phase difference between each of the pulses is φ. Periods are defined, such that during each period, the time varying current is configured such that two coherent light pulses are emitted. The periods are indicated on the figure with dashed lines.

The sequence of coherent short light pulses passes through intensity modulator 132. In order to encode information, the intensity modulator 132 is controlled to reduce the amplitude of one of the light pulses emitted during a period, meaning that only one light pulse exits the intensity modulator 132. In order to generate a decoy state, the intensity modulator is controlled to allow both light pulses to pass without any modulation.

Figure 7:
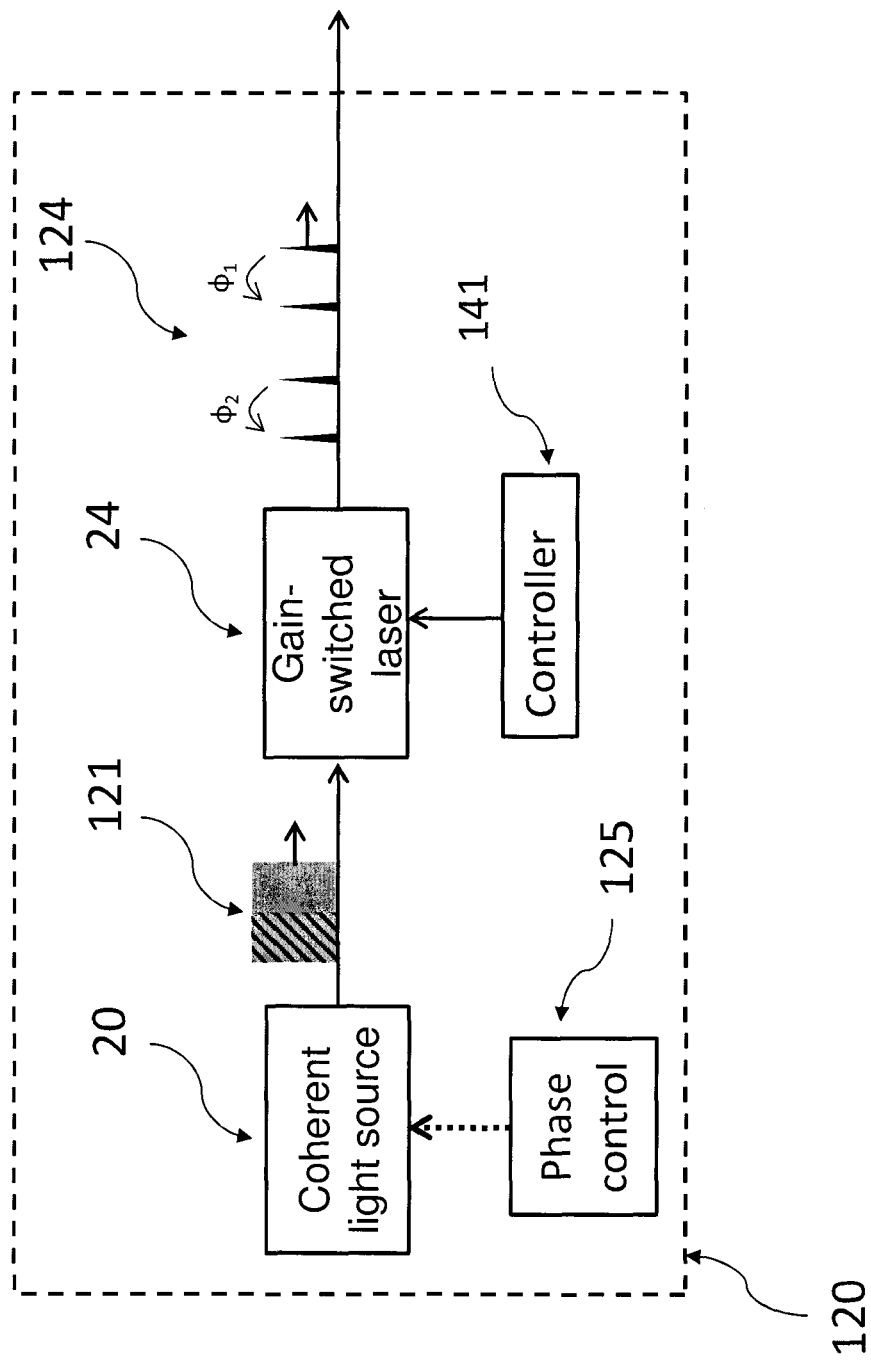
FIG. 7 is a schematic illustration of an optical device in accordance with an embodiment, comprising a phase control element.

FIG. 7 is a schematic illustration of an optical device 120 in accordance with an embodiment that includes phase modulation. In an embodiment, the gain switched laser 24 and the coherent light source 20 are integrated on a substrate, as described in relation to FIGS. 18 to 33. Phase modulation can be performed by controlling the phase of the light generated by the coherent light source 20 with a phase control element 125. Coherent light source 20 generates long light pulses 121. The phase of the second half of the long light pulse 121 generated by coherent light source 20 is modulated with respect to the first half of the long light pulse 121 by phase control element 125. Alternatively, the phase control element can apply phase modulation a plurality of times during a period when one long light pulse is generated. The coherent light source 20 may generate CW coherent light. In this case, periods are defined, and the phase of the CW light emitted during each period can be modulated with respect to the phase of the CW light emitted during the previous period.

Phase control element 125 applies a perturbation to the coherent light source 20 at regular intervals, which are timed to occur halfway through the generation of each long light pulse 121. The perturbation changes the phase of the second half of the light pulse, producing a phase difference between the first half of a light pulse and the second half of the light pulse. The perturbation is controlled, in other words, the same perturbation will always cause the same phase shift. The amplitude of the perturbation that is applied affects the phase shift that is generated. In one embodiment, the perturbation is a short current pulse. Coherent light source 20 emits a long light pulse 121 into a waveguide, such as an optical fibre. The optical fibre is connected to gain-switched laser 24. The long light pulse 121 enters gain-switched laser 24.

Alternative embodiments comprise an optical amplifier, for example a semiconductor optical amplifier instead of a gain-switched laser 24. Further alternative embodiments comprise an intensity modulator instead of a gain-switched laser 24. An intensity modulator modulates the intensity of incoming light pulses. In an "off" state, the intensity modulator reduces the intensity of the light to a low level. In an "on" state, the intensity modulator allows a larger fraction of the incoming light to exit. The intensity modulator is switched between an "on" state and an "off" state twice when the light pulse 21 from the coherent light source is present in order to generate two short light pulses 124. The phase difference between the two short light pulses is determined by the phase applied to the coherent light pulse 121 by the phase control element 125. An intensity modulator may modulate the intensity of the light by changing the absorption coefficient of the material in the modulator, for example an electro-absorption modulator. An electro-absorption modulator is a semiconductor device for which the voltage applied to the device changes the absorption coefficient, and therefore the intensity of light travelling through the device. In another embodiment the intensity modulator is based on a Mach-Zehnder interferometer. A Mach-Zehnder based intensity modulator changes the phase difference between the two arms of the interferometer to modulate the output intensity.

The coherent light source 20 may be a semiconductor laser, for which the phase change is applied to the second half of the long laser pulse 121 by applying a short current pulse to the coherent light source 20 during the time that the long laser pulse 121 is generated.

A controller 141 applies a time varying current to the gain-switched laser 24. The time varying current switches the gain-switched laser 24 above the lasing threshold once during the period when the first half of light pulse 121 is present, such that a short pulse is generated. The time varying current is configured such that it switches the gain-switched laser 24 above the lasing threshold a second time during the period when the second half of long light pulse 121 is present, such that a second short pulse is generated. During the time the first half of light pulse 121 is present the first short laser pulse is generated and during the time the second half of light pulse 121 is present the second short laser pulse is generated 124. The phase difference between the first and second short laser pulses is determined by the phase change applied to the second half of long laser pulse 121. For the first set of pulses emitted from the gain-switched laser 24 shown in FIG. 7, the phase difference between the pulses is $\varphi_1$. For the second set of pulses emitted from the gain-switched laser 24, the phase difference between the two pulses is $\varphi_2$.

Figure 8A:
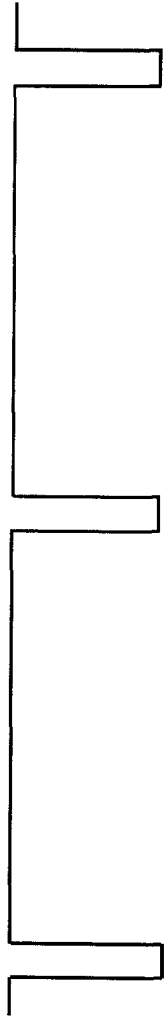
FIG. 8(a) shows the time varying current applied to a coherent light source in order to generate long light pulses.

FIG. 8(a) shows the form of a current applied to the coherent light source 20, where the coherent light source 20 is a semiconductor laser, in order to generate long light pulses. The signal has the form of a series of square type pulses, where the duration of the periods between the pulses is shorter than the duration of the pulses. The signal can be formed by combining an AC current with a DC bias current via a bias-T.

Figure 8B:
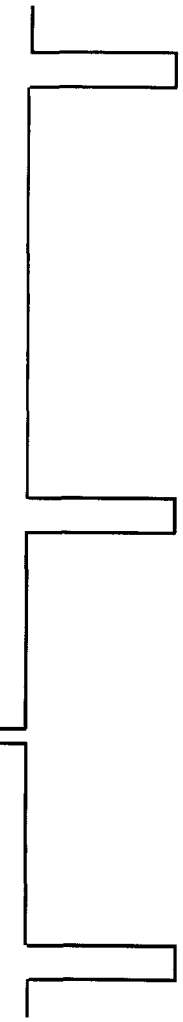
FIG. 8(b) shows the time varying current applied to the coherent light source when modified by the phase control element.

FIG. 8(b) shows the current applied to the coherent light source 20 when modified by phase control element 125. A smaller current pulse is added through the AC input of the bias tee. The current pulse is timed such that it coincides with the mid-point of the upper section of one of the square pulses. The phase control element can be a separate element that generates the smaller current pulses, which are then combined with the square pulse AC signal shown in FIG. 8(a). The combined signal is then inputted to the AC input of the bias tee.

Figure 8C:
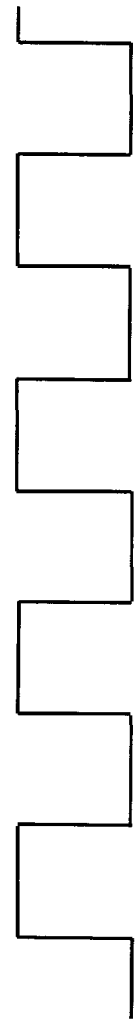
FIG. 8(c) shows the time varying current applied to the gain-switched laser by the controller.

FIG. 8(c) shows the time varying current applied to gain-switched laser 24 by the controller. The signal comprises a square wave, of a magnitude such that the gain-switched laser 24 is switched periodically above the lasing threshold. The first current pulse is applied when the first half of light pulse 122 is present. The first current pulse is timed such that the gain-switched laser 24 is switched above the lasing threshold during the section of the time when the first half of light pulse 122 is present in the gain-switched laser. The second pulse is timed such that the gain-switched laser is switched above the lasing threshold during the section of the time when the second half of the light pulse 122 is present in gain-switched laser 24. The time varying current applied to the coherent light source 20 and the time varying current applied to the gain-switched laser can be synchronised in order that the timing of the generation of the short pulses corresponds to the time when the correct section of the long light pulse is present. For example, both time varying currents can be synchronised to a master clock signal.

Figure 8D:
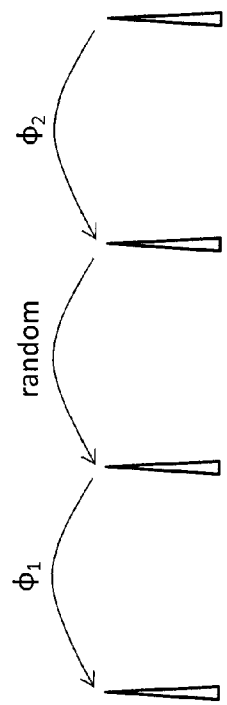
FIG. 8(d) shows the output laser pulses from the gain-switched laser.

The output laser pulses are shown in FIG. 8(d). The square current pulses are timed such that one short light pulse is generated during the time that the first half of the long light pulse is incident, and a second is generated during the time that the second half of the long light pulse is incident. The required length of the square current pulses will depend on several parameters, such as the laser type, cavity length and pumping power. The square current pulses are configured such that short light pulses are generated.

The phase change between the first half of long light pulse 122 and the second half of long light pulse 122 may not be an abrupt transition, but may occur over portion of the mid-section of the long light pulse 122. The time varying current is controlled such that short light pulses are not generated when the mid-section of the long light pulse 122 is present in the gain-switched laser.

Coherent light sources other than semiconductor lasers may have other means to modulate the phase of the long light pulse. Thus in other embodiments, means other than an applied current are used to modulate the phase of the long light pulse. These means include increasing the pumping power for a short time during the long pulse emission. For a fibre laser, an optical pulse added to the optical pump signal can be used to modulate the phase of the long light pulse.

FIG. 9 is a schematic illustration of an optical device 160 in accordance with an embodiment that includes intensity modulation. In an embodiment, the gain switched laser 24 and the coherent light source 20 are integrated on a substrate, as described in relation to FIGS. 18 to 33. Certain QKD protocols require that the intensity of the coherent pulses is varied in order to implement a decoy-state QKD protocol. In this device, the intensity modulation is realised by an intensity control element 126. The intensity control element 126 is a separate element that modifies the square pulse AC signal applied to the gain-switched laser 24 (and shown in FIG. 10(a)). For example, the intensity control element 126 can be a variable attenuator or several variable attenuators. The attenuator can reduce the intensity of selected current pulses in order to generate short light pulses of lower intensity. In some case, the attenuator can block selected current pulses entirely, such that the gain-switched laser 24 generates a vacuum state (no light pulses emitted). Alternatively, the current pulse source itself may provide an arbitrary pattern of pulses which vary in intensity. For example, the controller that supplies the time varying current signal can be a pattern generator.

Alternatively, intensity modulation of the short light pulses is realised by changing the intensity of the coherent light 21, in other words by changing the seed power. Reducing the intensity of the coherent light can reduce the intensity of the short light pulses emitted from the optical component such as the gain-switched laser 24. Where the coherent light source is a semiconductor gain-switched laser, in order to reduce the intensity of the generated coherent light pulse, a variable attenuator can reduce the intensity of selected current pulses applied to the coherent light source 20 in order to generate long light pulses of lower intensity. When the lower intensity long light pulses are supplied to the gain-switched laser 24, short light pulses of a lower intensity are emitted. Alternatively, the driving circuit of the coherent light source 20 itself can provide an arbitrary pattern of pulses which vary in intensity, removing the need for an attenuator. For example, the driving circuit can comprise a pattern generator. Alternatively, the coherent light source can comprise an intensity modulator, which can vary the intensity of the generated long light pulses before they are supplied to the gain-switched laser 24.

It is also possible to prevent emission of the short light pulses. Under the correct driving conditions it is possible not to generate a short light pulse if no coherent light is injected into the gain-switched laser 24. The modulation signal of the gain-switched laser 24 is reduced such that the carrier density does not cross the lasing threshold. If no coherent light is injected, therefore, no short light pulses are generated. When the coherent light is injected however, the lasing threshold is reduced, meaning that the carrier density crosses the lasing threshold and short light pulses are generated.

Such intensity modulation may be used to realise a decoy-state QKD protocol where photon pulses of different intensities are sent which allow the sender and receiver to determine the presence of an eavesdropper by measuring the number of pulses which have been safely received with the different intensities. For example, the decoy-state B384 protocol relies on generating light pulses with three different intensities: signal pulses, decoy pulses, and vacuum pulses.

In the optical device shown in FIG. 9, intensity modulation is achieved by controlling the output intensity of gain-switched laser 24 with an intensity control element 126. Intensity control element 126 controls the current applied to the gain-switched laser 24 in order to change the intensity of the short laser pulses generated 152.

Figure 10A:
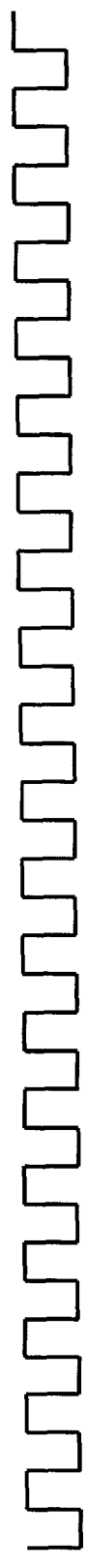
FIG. 10(a) shows the time varying current applied to the gain-switched laser by the controller.

FIG. 10(a) shows a time varying current in the form of a regular series of square shaped pulses, which are applied to the gain-switched laser 24 by a controller in order to generate the short light pulses. The signal may be formed by combining an AC current with a DC bias current via a bias-T.

Figure 10B:
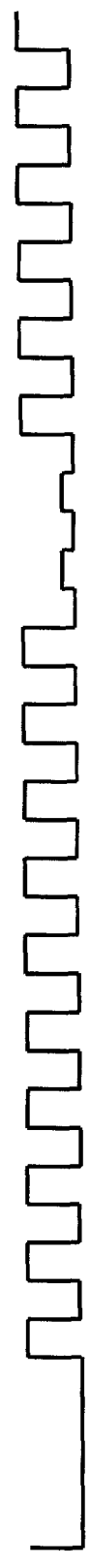
FIG. 10(b) shows the time varying current applied to the gain-switched laser when modified by the intensity control element.
Figure 10C:
FIG. 10(c) shows the output laser pulses from the gain-switched laser.

FIG. 10(b) shows the time varying current after modification by the intensity control element 126. The modified signal is then inputted to the AC input of a bias tee and the output current of the bias-T is applied to the gain-switched laser 24. For a decoy-state BB84 protocol, it may be required that 1% of the coherent double pulses are vacuum pulses, 2% of the coherent double pulses are decoy pulses and 97% of the coherent double pulses are signal pulses. The combined signal is generated such that each pair of electrical pulses applied to the gain-switched laser has a 1% probability of having zero amplitude (i.e. such that no short pulses are generated), a 2% probability of having a reduced amplitude, and a 97% probability of having an unmodified amplitude. The combined signal is shown in FIG. 10(b). The signal of FIG. 10(a) has been modified such that one pair of electrical pulses has been omitted. When applied to the gain-switched laser 24, this pair of electrical pulses will result in a vacuum state being emitted (i.e. no light pulses are emitted). The signal has also been modified such that one pair of electrical pulses has a reduced amplitude. When this pair of electrical pulses is applied to the gain-switched laser 24 a coherent double pulse with a reduced intensity is generated. FIG. 10(c) shows the light pulses emitted from the gain-switched laser 24.

Where lasers other than semiconductor lasers are used in the place of gain-switched laser 24, means other than an applied current are used to modulate the intensity of the short laser pulses. These means include varying the pump power, for example for an optical fibre laser, the optical pumping signal can be varied in order to modulate the intensity of the short laser pulses.

For optical devices such as shown in FIG. 2(b) which comprise an optical amplifier, intensity modulation can be realised by modulating the switching signal that switches the amplifier between the "on" and "off" state. For example, where the optical amplifier is a gain-switched SOA, intensity modulation can be realised by an intensity control element that modifies the switching signal. The intensity control element can be a variable attenuator or several variable attenuators. The attenuator can reduce the intensity of selected current pulses or block selected pulses entirely. Alternatively, the switching signal source itself may provide an arbitrary pattern of pulses which vary in intensity. For example, the controller that supplies the switching signal can be a pattern generator. Alternatively, intensity modulation of the short light pulses is realised by changing the intensity of the coherent light 21, and no short light pulse is generated if no coherent light is injected. For a SOA, the output power is proportional to the input power of the coherent light pulse.

Figure 11:
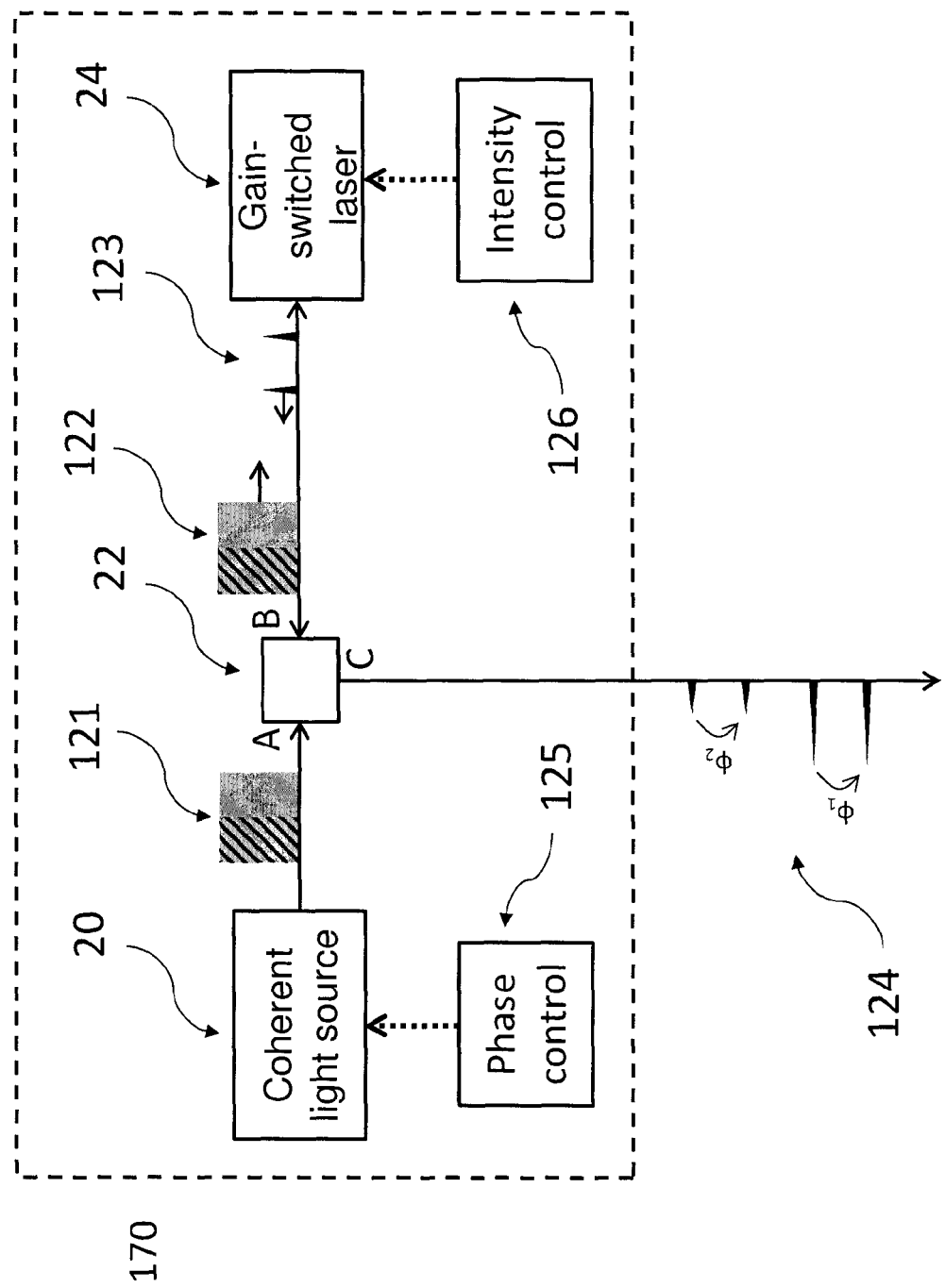
FIG. 11 is a schematic illustration of an optical device in accordance with an embodiment, comprising a phase control element and an intensity control element.

FIG. 11 is a schematic illustration of an optical device 170 in accordance with an embodiment, and that includes phase modulation and intensity modulation. In an embodiment, the gain switched laser 24 and the coherent light source 20 are integrated on a substrate, as described in relation to FIGS. 18 to 33. Phase control element 125 apples a perturbation to the coherent light source 20, such that there is a phase difference between the first half of long light pulse 121 and the second half of long light pulse 121. Long light pulse 121 enters light distribution device 22 through port A. However, in alternative embodiments, light distribution device 22 is omitted, and long light pulse 121 travels directly from coherent light source 20 to gain-switched laser 24.

Alternative embodiments comprise an optical amplifier, for example a semiconductor optical amplifier instead of a gain-switched laser 24. Further alternative embodiments comprise an intensity modulator instead of a gain-switched laser 24. An intensity modulator modulates the intensity of incoming light pulses. In an "off" state, the intensity modulator reduces the intensity of the light to a low level. In an "on" state, the intensity modulator allows a larger fraction of the incoming light to exit. The intensity modulator is switched between an "on" state and an "off" state twice when the light pulse 21 from the coherent light source is present in order to generate two short light pulses 124. The phase difference between the two short light pulses is determined by the phase applied to the coherent light pulse 121 by the phase control element 125. An intensity modulator may modulate the intensity of the light by changing the absorption coefficient of the material in the modulator, for example an electro-absorption modulator. An electro-absorption modulator is a semiconductor device for which the voltage applied to the device changes the absorption coefficient, and therefore the intensity of light travelling through the device. In another embodiment the intensity modulator is based on a Mach-Zehnder interferometer. A Mach-Zehnder based intensity modulator changes the phase difference between the two arms of the interferometer to modulate the output intensity.

Long light pulse 122 exits light distribution device 22 through port B, and is injected into gain-switched laser 24. Intensity control element 126 controls the current applied to gain-switched laser 24, in order to modulate the intensity of the double pulses 123 emitted from the gain-switched laser 24. The double pulses 123 are emitted from the same aperture through which long light pulse 122 was injected, and enter light distribution device 22 through port B. The double pulses exit light distribution device 22 through port C. The first pair of light pulses that exit port C of light distribution device 22 have an intensity that has not been modulated by the intensity control element 126, and the phase difference between the pulses is $\varphi_1$. The second pair of light pulses that exit port C of the light distribution device 22 have an intensity that has been reduced by intensity control element 126. The phase difference between the pulses is $\varphi_2$.

Figure 12:
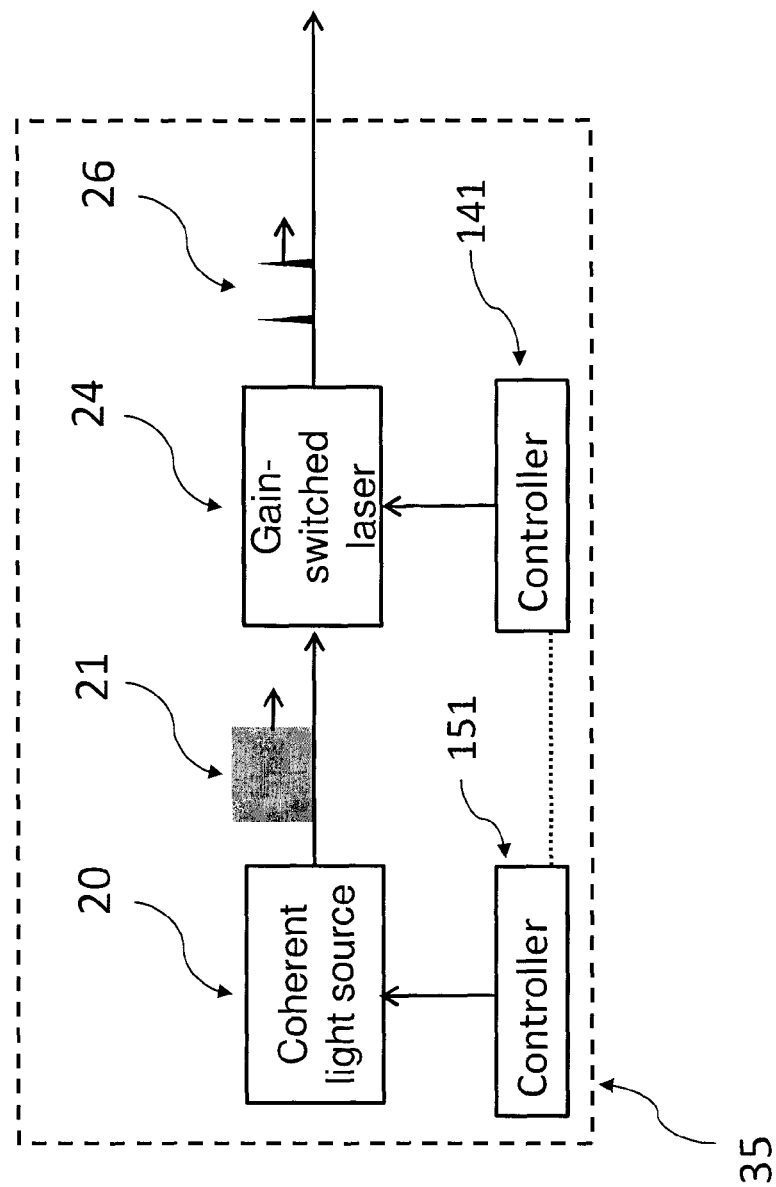
FIG. 12 is a schematic illustration of an optical device in accordance with an embodiment, comprising a controller that controls the coherent light source.

FIG. 12 is a schematic illustration of an optical device according to an embodiment. In an embodiment, the gain switched laser 24 and the coherent light source 20 are integrated on a substrate, as described in relation to FIGS. 18 to 33. The optical device is the same as that shown in FIG. 2(a), with the inclusion of a controller 151 that supplies a time varying signal to the coherent light source 20 in order to control the generation of the long light pulses 21. The controller 151 controls the length and repetition rate of the periods when coherent light is generated. Where the coherent light source is a semiconductor gain-switched laser, the controller 151 applies a time varying current such that coherent light source 20 is switched above the lasing threshold. The current applied to the laser has the form of a series of current modulation pulses. The current may not be reduced to zero in between the current modulation pulses, but only reduced to a bias value. In some embodiments, the controller 151 is an internal component of the coherent light source 20, for example a driving circuit. In some embodiments, the controller is integrated onto the substrate with the gain switched laser 24 and the coherent light source 20 by means of flip chip bonding.

The current modulation signal switches the gain of the coherent light source 20 laser above and below the lasing threshold periodically. The laser outputs light when the carrier density is above the lasing threshold. To generate longer light pulses, the gain bias is chosen to be closer to the lasing threshold. This means that the carrier density crosses the lasing threshold earlier, which gives the light pulse more time to evolve. Initially the light intensity will overshoot and quickly diminish the carrier density. This in turn causes the carrier density to increase, in turn increasing the light intensity. This competing process causes oscillations of the light intensity at the beginning of the pulse which are strongly damped leading quickly to a steady-state, where the intensity is constant. The oscillations are called relaxation oscillations. The laser pulse ends when the current pulse ends, switching the current to the bias value again.

The time varying signal applied to the gain-switched laser 24 by the controller 141 and the time varying signal applied to the coherent light source 20 are synchronised such that the gain-switched laser 24 does not generate short light pulses during time periods when no coherent light is injected into the gain-switched laser 24. A signal containing information about the time varying signal applied to the coherent light source 20 is transmitted from the controller 151 to the controller 141, in order that the time varying signal applied to the gain-switched laser 24 is synchronised to the time varying signal applied to the coherent light source 20. The information can be transmitted wirelessly, or via a cable. The time varying signal applied to the gain-switched laser 24 can be generated from this information, for example the time varying signal applied to the gain-switched laser 24 may be a frequency multiplied version of the time varying signal applied to the coherent light source 20.

Alternatively, information regarding the time varying signal applied to the gain-switched laser 24 may be transmitted from the controller 141 to the controller 151 instead. The time varying signal applied to the coherent light source 20 is synchronised to the time varying signal applied to the gain-switched laser 24 using this information. Alternatively, the optical device may include a master clock. The time varying signal applied to the gain-switched laser 24 by controller 141 and the time varying signal applied to the coherent light source 20 may be synchronised to the master clock.

Alternatively, a single controller may apply a first time varying signal to the gain-switched laser 24 and a second time varying signal to the coherent light source 20. The first and second time varying signals are synchronised such that the gain-switched laser 24 does not generate short light pulses during time periods when no coherent light is injected into the gain-switched laser 24.

Although the synchronisation of the coherent light source 20 and the gain-switched laser 24 has been described with reference to the optical device shown in FIG. 2a, it is to be understood that such synchronisation can be applied to any of the optical devices described. For devices such as shown in FIGS. 6(a), (b) and (c), the encoder, the time varying signal applied to the optical component 150 by the controller 141 and the time varying signal applied to the coherent light source by either a second controller or the controller 141 can all be synchronised. The encoder can encode information based on the emission time of the short light pulses from the optical component 150. As described for an optical device such as shown in FIG. 7, the phase control element 125, time varying signal applied to the gain-switched laser and the time varying signal applied to the coherent light source can be synchronised, for example using a master clock.

In embodiments in which CW light is supplied by the coherent light source to the optical component, there are no periods for which coherent light is not supplied, and therefore it is not required to synchronise the time varying signal applied to the optical component such that pulses are not emitted during these periods. In some cases, where the coherent light source supplies long light pulses to the optical component, the time varying signal applied to the coherent light source and the time varying signal supplied to the optical component are not synchronised, and light pulses are also generated in the periods when coherent light is not supplied. For example, the coherent light source can be configured such that it is only switched off for very short time periods, such that coherent light is supplied to the optical component most of the time. This means that only a small fraction of short light pulses are not seeded.

FIG. 13 is a schematic illustration of a quantum communication system in accordance with an embodiment, where the Quantum Transmitter 40 comprises an optical device 35 such as that shown in FIGS. 2(a) to 2(d). In an embodiment, the gain switched laser 24 and the coherent light source 20 are integrated on a substrate, as described in relation to FIGS. 18 to 33. A Quantum Receiver 47 is based on an asymmetrical MZI. Quantum Transmitter 40 and Quantum Receiver 47 are connected by an optical transmission line 46.

Optical device 35 inside quantum transmitter 40 generates a coherent double pulse, which comprises an early pulse and a late pulse. The late pulse is emitted from the optical device 35 a time Δt after the early pulse. Quantum transmitter 40 also comprises an intensity modulator 48 configured to vary the intensity of light pulses emitted from the optical device 35. Intensity modulator 48 may be configured to realise a decoy-state QKD protocol, in which coherent double pulses of different intensities are sent which allow the sender and receiver to determine the presence of an eavesdropper by measuring the number of pulses which have been safely received with the different intensities. The transmitter may comprise more than one intensity modulator.

The coherent double pulses 41 then pass through a phase modulator 42 which modulates the phase difference between the late and early pulse generated by photon source 35. In this case, the phase modulator 42 may apply a modulation to the phase of the early pulse. The phase modulated coherent double pulse 43 enters polarization modulator 44 which flips the polarization of the early pulse by 90 degrees, such that the polarization of the early pulse is orthogonal to the polarization of the late pulse. A polarization modulator 44 is a device which allows modulation of the birefringence in an optical medium by applying a voltage, in other words, the refractive index of a first polarization mode can be changed with respect to the refractive index of a second orthogonal polarization mode by applying a voltage. This effect is present for example in a Pockels cell, but other devices, based on GaAs for example, exist. Tuning the birefringence allows rotation of the polarization of incoming light because it changes the relative phase between the two polarization modes.

The double pulse with orthogonal polarization 45 then exits the quantum transmitter and is sent via optical transmission line 46 to the quantum receiver 47. The Quantum Transmitter therefore generates coherent double pulses with a chosen phase difference and orthogonal polarization travelling down the transmission line 46.

In an alternative embodiment, quantum transmitter 40 does not comprise a polarization modulator and the output of the transmitter consists of a double pulse, where the early and late pulses have identical polarization. The interferometer in the quantum receiver 47 is then polarization independent and no polarization modulator is necessary.

In a further alternative embodiment, quantum transmitter 40 does not comprise a polarization modulator and the polarization of the early and late pulses is modulated by changing the seeding or driving conditions of the gain-switched laser, for example, by rotating the polarization of the coherent light, increasing or decreasing the intensity of the coherent light, or increasing or decreasing the gain bias or the modulation amplitude of the gain-switched laser. This is possible, for example, with a vertical cavity surface emitting laser (VCSEL). In one embodiment without a polarization modulator, the polarization of the early pulse is flipped by 90 degrees with respect to the polarization of the late pulse by changing the seeding or driving conditions. In one embodiment without a polarization modulator, the gain-switched laser is a VCSEL.

At the input of the Quantum Receiver the polarization of the double pulses is restored using a polarization controller 51. The optical transmission line 46 may be a single mode optical fibre which allows propagation of the two polarization modes without causing a significant change in path length between the two modes. However, as all single mode fibres may have some birefringent characteristics, it is possible that the polarization of the two modes will rotate when travelling along the transmission line 46. The polarization controller corrects this rotation, and outputs the polarization corrected double pulse 52.

The pulses are then decoded using the asymmetrical MZI 57. The pulses are directed into a polarizing beam splitter 53, which sends a light pulse 54 that enters the polarizing beam splitter with one polarization mode (the early pulse) down the long arm 60 of the interferometer and a light pulse 55 that enters the polarizing beam splitter with the other polarization mode (the late pulse) down the short arm 58. The polarization of the early pulse is flipped by the polarizing beam splitter 53 such that the polarization of the early pulse when exiting the polarising beam splitter 53 is the same as the polarization of the late pulse. The short arm 58 of the interferometer comprises a phase modulator 56, such as has been described previously. The long arm 60 of the interferometer comprises an optical delay 59 Δt, which exactly matches the delay between the early and late pulse. The long arm and the short arm are each connected to one of the inputs of beam splitter 61.

The outputs of beam splitter 61 are connected to photon detectors 62 and 63. Depending on the phase modulation applied at the transmitter 40 and the receiver 47 the light signal will either be detected in photon detector 62 or in photon detector 63. Photon detectors 62 and 63 may be gated single-photon detectors which may be based on avalanche photo-diodes and specifically may be based on InGaAs avalanche photo-diodes.

Using phase modulator 42 and phase modulator 56 a Quantum Key Distribution protocol such as BB84 can be realized. In the BB84 protocol, Alice selects a phase value at random from four equally spaced phase values. For example, Alice can randomly set the voltage applied to the phase modulator 42 when the early pulse of a double pulse is present to one of four different values, corresponding to phase shifts of 0, $$\frac{\pi}{2},$$

π, and $$\frac{3\pi}{2}.$$

0 and π are associated with bits 0 and 1 in a first encoding basis, while $$\frac{\pi}{2}$$

and $$\frac{3\pi}{2}$$

are associated with 0 and 1 in a second encoding basis. Alternatively, the phase shift can be applied when the late pulse is present.

The phase difference between consecutive pulses from a different double pulses is random. This means that an unauthorised eavesdropper. Eve, cannot lock her measuring apparatus to this phase and thus perform a better measurement of Alice's pulses.

Bob selects a phase value at random from two values. For example, Bob can randomly set the voltage applied to the phase modulator 56 when the late pulse is present to one of two values, corresponding to a phase shift of 0 or $$\frac{\pi}{2}.$$

This amounts to selecting between the first and second measurement bases, respectively. In other words, Alice's 0 and $\pi$ values are compatible with Bob's 0 value (first basis), and Alice's $$\frac{\pi}{2}$$

and $$\frac{3\pi}{2}$$

values are compatible with Bob's $$\frac{\pi}{2}$$

value (second basis). Neither Alice nor Bob knows what values the other chooses or will choose when choosing their values. Only afterwards do they compare whether they used the same basis, and then only use the values for the final key where they used the same basis.

A phase difference of 0 (i.e. the phase shift applied by Alice is 0 and the phase shift applied by Bob is 0 or the phase shift applied by Alice is $$\frac{\pi}{2}$$

and the phase shift applied by Bob is $$\frac{\pi}{2}),$$

leads to a detection at detector 62. If, on the other hand, there is a phase difference of $\pi$ (i.e. the phase shift applied by Alice is $\pi$ and the phase shift applied by Bob is 0 or the phase shift applied by Alice is $$\frac{3\pi}{2}$$

and the phase shift applied by Bob is $$\frac{\pi}{2})$$

there will be a detection at detector 63. For any other value of difference between the phase modulation applied at the two phase modulators, there will be a finite probability that a photon may output at detector 62 or detector 63.

Phase stabilisation is included in the QKD system in order to ensure that the interferometers are aligned correctly, such that a phase difference of 0 leads to a detection at detector 62 and a phase difference of leads to a detection at detector 63. The phase difference between the two pulses emitted from the optical device 35 is an unknown value. For each double pulse emitted from the optical device 35, the phase difference between the early and late pulse is the same unknown value. For each double pulse, the phase difference between the early and late pulse is then modulated by a certain amount (0, $$\frac{\pi}{2},$$

$\pi$, or $$\frac{3\pi}{2})$$

by Alice phase modulator 42.

The receiver interferometer has a phase difference itself between the arms. The interferometer brings the pulses together to interfere at the output beam splitter by applying the time delay $\Delta t$ to one arm (the long arm). The precision of the time delay applied is much less than the time it takes to acquire a phase shift of $2\pi$.

For example, let the phase difference between the two arms of the receiver interferometer be $\varphi$. The phase difference between two pulses for which a modulation of 0 is applied by Alice at phase modulator 42 is $\varphi_0$ (i.e. the unknown value of the phase difference between the early pulse and late pulse). The receiver interferometer is configured such that $\varphi+\varphi_0$ is equal to 0 or a multiple of $2\pi$ in order that the photon is directed to detector 62. The phase difference of the interferometer, $\varphi$, will drift if it is not stabilised as it is very sensitive to temperature. Phase stabilisation is therefore included in the QKD system. For example, phase stabilisation can be achieved by including a phase shifting device such as a fibre stretcher in the receiver interferometer. It can also be implemented at the transmitter side by tuning $\varphi_0$. The phase stabilisation is implemented by looking at the counts in the receiver until only detector 62 clicks for a modulation value of 0 (i.e. $\varphi+\varphi_0$ is equal to 0 or a multiple of $2\pi$).

An optical device such as described herein can also be used for distributed phase reference QKD protocols such as differential-phase shift (DPS) QKD or coherent one-way (COW) QKD.

Figure 14:
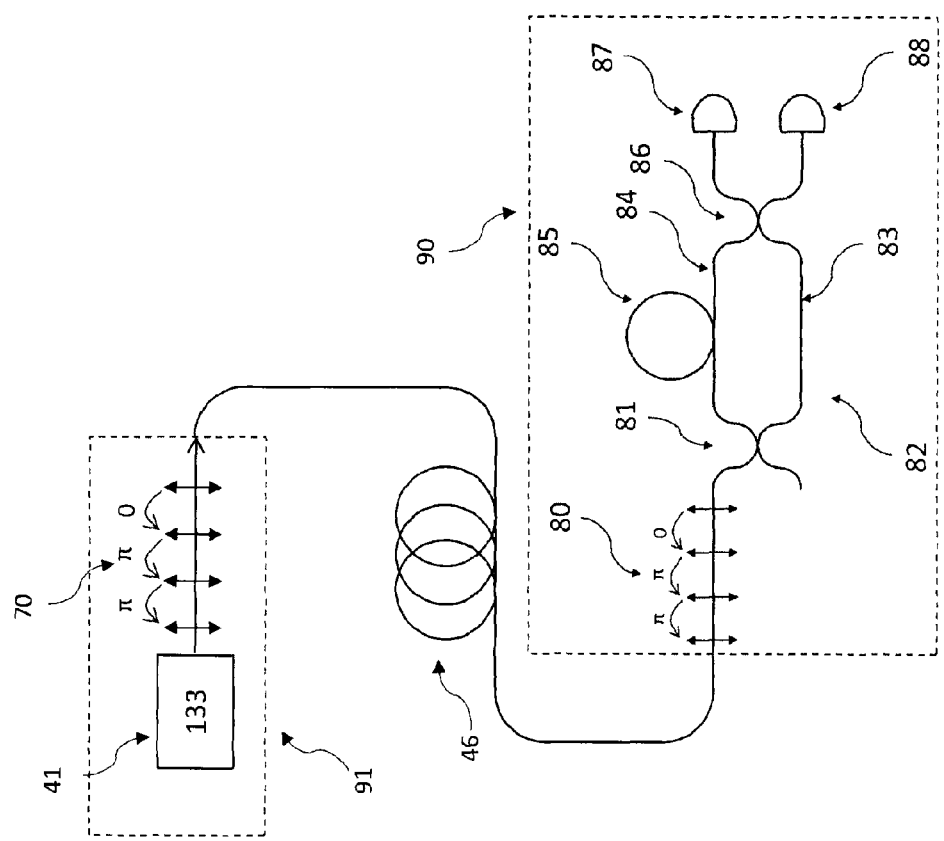
FIG. 14 is a schematic illustration of a differential-phase shift quantum communication system in accordance with an embodiment, where the Quantum Transmitter comprises an optical device such as that shown in FIG. 6(a)

FIG. 14 is a schematic illustration of a quantum communication system in accordance with an embodiment, where the Quantum Transmitter (91) comprises an optical device 133 such as that shown in FIG. 6(*a*). In an embodiment, the optical component 150 and the coherent light source 20 are integrated on a substrate, as described in relation to FIGS. 18 to 33. The system is a differential-phase shift QKD system, in which the coherent light source 20 generates CW light. In some alternative embodiments, the coherent light source generates long light pulses of duration greater than or equal to 10 ns. In the DPS-QKD protocol the bit values are encoded into the phase difference between subsequent light pulses of a sequence of light pulses 70. The sequence of light pulses consists of two or more light pulses which are phase coherent. In the case where a sequence of many pulses is generated, all of the pulses are coherent with each other, not only with the adjacent pulses. For example, the first pulse is coherent with pulse 2, but also with pulses 3, 4, 5 and 6 etc. Pulse 2 is also coherent with pulses 3, 4, 5 and 6 etc.

A quantum transmitter for DPS-QKD can be realized as shown in this figure. The coherent light source 20 in optical device 133 generates CW light. This results in the generation of a sequence of coherent light pulses comprising two or more pulses. The time delay between the pulses is $\Delta t$.

Optical device 133 also comprises a phase modulator 130. The sequence of coherent light pulses emitted from optical component 150 pass through phase modulator 130. Phase modulator 130 introduces a phase shift of either 0 or $\pi$ between subsequent pulses generating a coherent sequence of light pulses 70 in which the relative phase is determined by the phase modulator. The phase modulator is configured to randomly vary the phase modulation between two values, 0 and $\pi$.

In this case, a phase difference of 0 is introduced between pulse 1 and 2, a phase difference of $\pi$ between pulse 2 and 3, and a phase difference of $\pi$ between pulses 3 and 4 in the sequence. A phase difference of 0 between subsequent pulses is associated with a bit value of 0. A phase difference of $\pi$ between subsequent pulses is associated with a bit value of 1.

The light pulses are sent over transmission line 46 to quantum receiver 90. Quantum receiver 90 comprises an asymmetric MZI 82 with an optical delay 85 which is equal to the time delay $\Delta t$ between two subsequent pulses of coherent pulse sequence 70. The pulse sequence 80 enters one input of beam splitter 81. A first output of input beam splitter 81 is connected to the long arm 84 of the interferometer 82, and a second output is connected to the short arm 83 of the interferometer 82. A first fraction of each pulse of the pulse sequence 80 is sent along the short arm 83 of interferometer 82 and a second fraction is sent along the long arm 84 of interferometer 82. The long arm 84 is connected to a first input of output beam splitter 86 and the short arm is connected to a second input of output beam splitter 86. At the output beam splitter 86 subsequent pulses of pulse sequence 80 are overlapped in time. For example, a second fraction of the first light pulse (which has travelled the long arm 84) will arrive at the output beam splitter 86 at the same time as a first fraction of the second light pulse (which has travelled the short arm 83).

The pulses are coherent and therefore they interfere at the beam splitter. The output depends on the phase difference. If the phase difference is zero there is a detection at detector 87. If, on the other hand, the phase difference is $\pi$, there is a detection at detector 88. For any other value of difference between the phase modulation applied at the phase modulator, there will be a finite probability that a photon may output at detector 87 or detector 88.

The phase difference between the second fraction of the first light pulse and the first fraction of the second light pulse is zero, therefore detector 87 registers a detection. This corresponds to a bit value of 0. The phase difference between the second fraction of the second light pulse and the first fraction of the third light pulse is $\pi$, therefore the detector 88 registers a detection. Both the fractions of each light pulse interfere and can give rise to a detection. Specifically, the second fraction of the nth pulse can always interfere with the first fraction of the (n+1)th pulse and result in a detection. This happens because each pulse is coherent with the following one. Which detector registers a detection depends on whether the phase value is 0 or $\pi$.

Although the explanation refers to fractions of the light pulses, for an application in which the pulses have on average less than one photon per pulse, each photon will either go along the long arm or the short arm. In these cases, a photon detected at any detector cannot lead to a detection event in any other detector.

The phase difference between a certain pair of pulses is determined after all the short light pulses have been transmitted. Bob tells Alice only about the times that he detected a photon (this is similar to telling Alice which basis he chose for a BB84 protocol). From the detection times Alice can figure out which bit Bob detected, because she knows which phase shift she applied to the pulses which could have contributed to this click. Bob on the other hand directly gets the bit because he knows which detector clicked.

Taking the example of the first three pulses in the sequence described earlier (for which the phase shift applied between the first two is 0, and the phase shift applied to the second two is $\pi$). Bob can detect a photon at four different times (corresponding to first pulse going through short arm; first pulse going through long arm/second pulse going through short arm; second pulse going through long arm/third pulse going through short arm; third pulse going through long arm), all separated by $\Delta t$. In the middle two cases there will be interference. At the second time (i.e. when the first pulse going through the long arm and the second pulse going through the short arm interfere) there should be a detection in detector 87 (as the phase shift is 0). At the third time (i.e. when the second pulse going through the long arm and the third pulse going through the short arm interfere) there should be a detection in detector 88 (as the phase shift is $\pi$). If Bob detects a photon during the second time and tells Alice about it, she will know which detector should have clicked because she knows which phase shift was applied.

For a sequence of any number of pulses, it is always only two pulses which can contribute to a single detection.

If Eve tries to measure one pulse, she destroys the coherence between that pulse and its neighbour and this can be detected by Alice and Bob. The security of the DPS protocol stems from this fact.

For example, if Eve wants to read the information encoded in the phase difference between pulse 3 and pulse 4. Eve must remove these pulses, and make an interference measurement using a beam splitter. After recording the result of this measurement, she must then place two "fake" pulses back into the sequence, to replace those removed. However, despite Eve replacing the removed pulses with the fake pulses, Alice and Bob can detect Eve's presence. Eve's measurement on pulses 3 and 4 will have destroyed the coherence between pulses 2 and 3, and between pulses 4 and 5. Therefore, when pulses 2 and 3 (or 4 and 5) arrive at Bob's beam splitter, they will not interfere. A detection will be registered at detector 87 or 88 at random. When Alice and Bob compare part of their coding/decoding values, they will realise that they are totally uncorrelated, which is evidence of Eve's presence.

Figure 15:
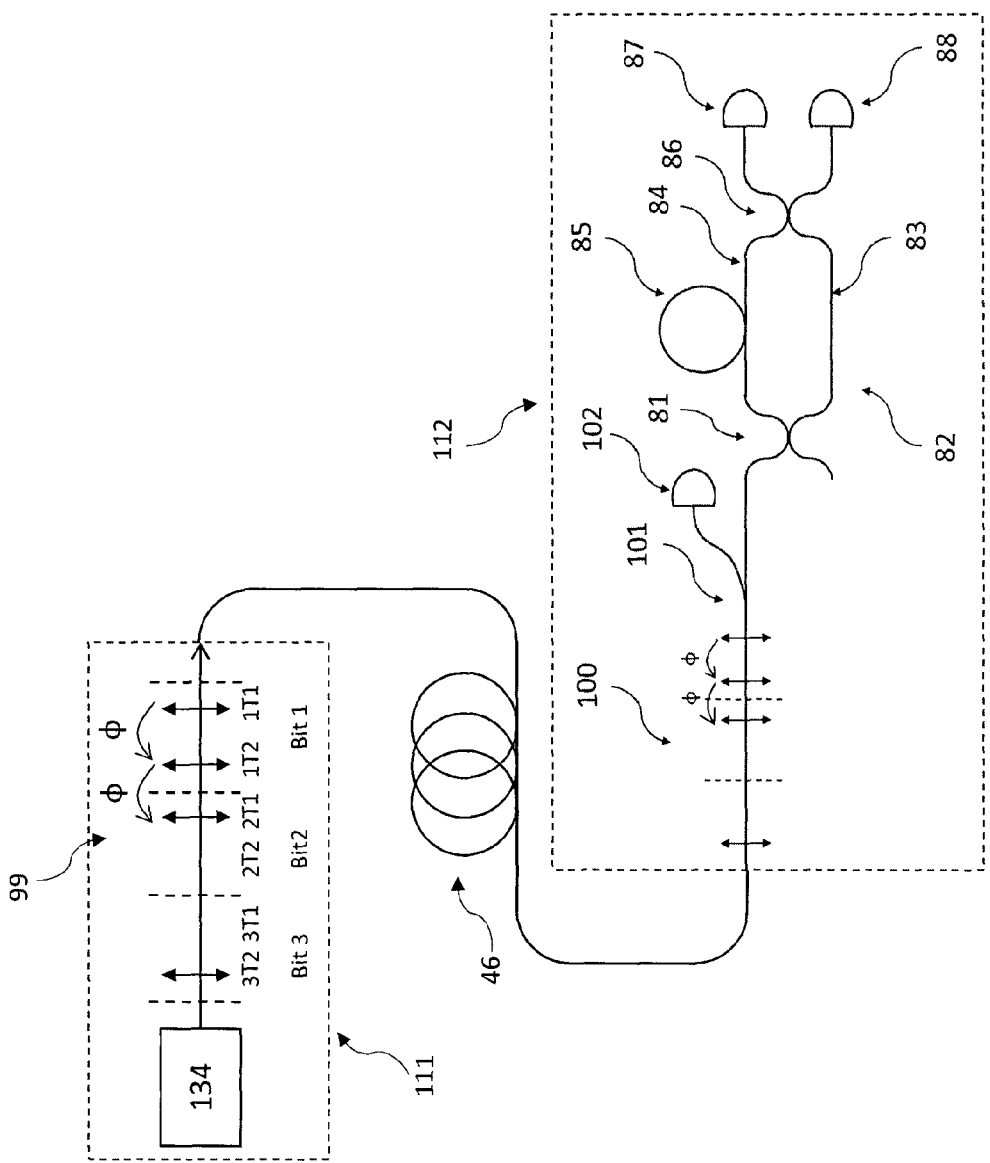
FIG. 15 is a schematic illustration of a coherent one-way quantum communication system in accordance with an embodiment, where the Quantum Transmitter comprises an optical device such as that shown in FIG. 6(b) or 6(c)

FIG. 15 is a schematic illustration of a coherent one-way (COW) quantum communication system in accordance with an embodiment, where the Quantum Transmitter comprises an optical device such as that shown in FIG. 6(b) or 6(c). In an embodiment, the optical component 150 and the coherent light source 20 are integrated on a substrate, as described in relation to FIGS. 18 to 33. In the COW-QKD protocol the bit values are encoded as time bins. Every bit value consists of two time bins T1 and T2. By generating a light pulse either in the first time bin (T1) or the second time bin (T2) the transmitter encodes the bit values 0 and 1. To ensure the security of the COW protocol, decoy states have to be generated where a light pulse is present in both time bins. The term decoy states here does not refer to light pulses with different intensities, but rather to states in which both time slots, rather than only one time slot, are non-empty. The receiver has a matching interferometer 82 to decode the phase information of these decoy pulses to check that it is constant.

Coherent light source 20 generates CW light, which is incident on gain-switched laser 24. In alternative embodiments, the coherent light source generates long light pulses of duration greater than or equal to 10 ns. In one embodiment, optical device 134 generates the time-bin encoded pulse sequence 99 by switching a gain-switched laser 24 above the lasing threshold either once or twice during the time the coherent light 132 is incident on the gain-switched laser 24. A controller 141 supplies a time varying current to the gain-switched laser 24, such that it is switched above and below the lasing threshold in order to generate short light pulses. As the short light pulses are all generated during the period when the CW light is incident on the gain-switched laser 24, the phase difference between each pair of consecutive light pulses is constant. All of the pulses are coherent. The phase is always constant and is only used to check for the presence of an eavesdropper using the Mach Zehnder interferometer and the two monitoring detectors 87 and 88, in a similar manner to the DPS protocol. The information is encoded by modulating the intensity.

An encoder 131 modifies the time varying current applied by the controller 141 to the gain-switched laser 24 in order to encode information in time-bins in the following manner. Bit periods are defined by the encoder 131, such that during one bit period the pulses which are associated with that bit are generated. Each bit period is split into a first time bin and a second time bin. In order to encode a bit value of zero for a bit period, the encoder 131 modifies the current applied to the gain-switched laser 24 by the controller 141 such that it switches the gain-switched laser 24 above the lasing threshold once during the first time bin (T1) only. In order to encode a bit value of one, the current is modified to switch the gain-switched laser 24 above the lasing threshold once during the second time bin (T2) only. In order to generate a decoy state, the current is modified to switch the gain-switched laser 24 above the lasing threshold once during the first time bin (T1) and once during the second time bin (T2). The generated pulses are emitted from the optical device 134.

In the system shown, in the bit period "Bit 1", a decoy state is generated. A first pulse is emitted in the first time bin (T1) and a second pulse is emitted in the second time bin (T2). The phase difference between the two pulses is φ. For bit period "Bit 2", a short light pulse is generated in the first time bin (T1) only. This corresponds to a bit value of zero. The phase difference between the pulse in the second time bin of bit period 1 and the pulse in the first time bin of bit period 2 is also φ, because these pulses are consecutive. In the third bit period "Bit 3", a short light pulse is generated in the second time bin (T2) only. This corresponds to a bit value of one.

The pulses for all of the bit periods form a sequence of pulses. All of the pulses are coherent i.e. not only the intra bit period pulses are coherent (e.g. a pulse at 1T1 and a pulse at 1T2, a pulse at 2T1 and a pulse at 2T2) but also the inter bit period pulses (e.g. a pulse at 1T2 and a pulse at 2T1, a pulse at 2T2 and a pulse at 3T1). The phase difference between all the consecutive pulses is the same. For example, the phase difference between a pulse at 2T1 and a pulse at 2T2 is the same as the phase difference between a pulse at 2T2 and a pulse at 3T1. Bit periods are sometimes referred to as "symbols".

In an alternative embodiment, the optical device 134 comprises an intensity modulator 132 that generates the time-bin encoded pulse sequence. The optical device 35 generates a sequence of regular pulses in the following way. Coherent light source 20 generates CW light, which is incident on gain-switched laser 24. A controller 141 supplies a time varying current to the gain-switched laser 24, such that the gain-switched laser 24 is switched above the lasing threshold at regular intervals, generating a sequence of regularly spaced short coherent pulses. The phase difference between each of the pulses is φ. Bit periods are defined by the encoder, during which the pulses associated with each bit are generated. Each bit period is split into a first time bin and a second time bin. Each bit period contains two pulses.

The sequence of coherent short pulses passes through intensity modulator 132. In order to encode a bit value of zero for a bit period, the intensity modulator is controlled to reduce the amplitude of the light during the second time bin (T2), meaning that a light pulse exits the intensity modulator 132 for the first time bin (T1) only. In order to encode a bit value of one, the intensity modulator 132 is controlled to reduce the amplitude of the light during the first time bin (T1), meaning that a light pulse exits the intensity modulator during the second time bin (T2) only. In order to generate a decoy state, the intensity modulator is controlled to allow both pulses to pass without any modulation. Alternatively, the time varying signal supplied to coherent light source 20 is modulated in order to prevent emission of a light pulse in one of the time bins. Alternatively, an intensity modulator modulates the intensity of the coherent light supplied to the optical component 150 in order to prevent emission of a light pulse in one of the time bins.

The pulse sequence 99 is sent to the quantum receiver 112 via optical transmission line 46. The quantum receiver 112 comprises a first beam splitter 101. The pulse sequence 100 is received at the quantum receiver 112 and enters first beam splitter 101. A first output of beam splitter 101 is connected to a first photon detector 102 by an optical waveguide, for example an optical fibre. Quantum receiver 112 further comprises an asymmetric MZI 82. Asymmetric MZI comprises an input beam splitter 81. A second output of beam splitter 101 is connected to an input of input beam splitter 81 via an optical waveguide, such as an optical fibre.

A first output of input beam splitter 81 is connected to the long arm 84 of MZI 82. The long arm 84 of MZI 82 comprises an optical delay 85, and is connected to a first input of output beam splitter 86. The second output of input beam splitter 81 is connected to the short arm 83 of the MZI 82, which is connected to a second input of output beam splitter 86. A second photon detector 87 is connected to a first output of output beam splitter 86 and a third single photon detector 88 is connected to a second output of output beam splitter 86.

A first fraction of each light pulse exits the beam splitter 101 through the output connected to first photon detector 102 and a second fraction of each light pulse exits the beam splitter 101 through the output connected to MZI 82. First photon detector 102 is configured to distinguish if a photon was detected in the first time bin or the second time bin, and thus determine whether a bit value of one or zero was encoded. The first photon detector 102 is therefore synchronised with the optical device in order to distinguish from the detection time whether the detected photon was in the first or second time bin.

The optical delay 85 of MZI 82 is equal to the time difference between consecutive pulses. The second fraction of each pulse of pulse sequence 100 enters MZI 82 through beam splitter 81 which sends a first fraction of the second fraction of each pulse in the pulse sequence along long arm 84 and a second fraction along the short arm 83. At the output beam splitter 86, a first fraction of one pulse and a second fraction of the next consecutive pulse are overlapped in time and interfere. Which detector registers a detection depends on the phase difference.

Although the explanation refers to fractions of the light pulses, for an application in which the pulses have on average less than one photon per pulse, each photon will either go along the long arm or the short arm. In these cases, a photon detected at any detector cannot lead to a detection event in any other detector.

For example, if the phase difference between all the consecutive pulses is zero a detection is always expected in detector 87, assuming there is no eavesdropper. In other words, a first fraction of pulse 1T1 and a second fraction of pulse 1T2 interfere at the beam splitter. As the phase difference between pulse 1T1 and 1T2 is zero, detector 87 registers a detection. Next, a first fraction of pulse 1T2 and a second fraction of pulse 2T1 interfere. Again, the phase difference between pulse 1T2 and 2T1 is zero, therefore detector 87 registers a detection. The time difference between consecutive pulses in different periods is equal to the optical delay of the interferometer (e.g. the delay between pulse 1T2 and 2T1) such that consecutive pulses in different periods interfere.

If Eve does make a measurement, for example if Eve measures the pulses in bit period 2 (i.e. those at 2T1 and 2T2), she will then place "fake" pulses back into the sequence in order to try to avoid detection. However, in making the measurement, Eve necessarily destroys the coherence between those pulses and the adjacent pulses (for example the coherence between a pulse at 1T2 and 2T1). When these pulses arrive at the beam splitter, they will not interfere, and a detection is registered at one of the detectors at random. Detector 88 will register detections with a certain probability and this reveals the presence of Eve. Bob records the time when he detects each photon. Alice than tells Bob the times that she sent out the decoy pulses in order to detect an eavesdropper. Based on the times Bob detects the photon they can decide if it was an error introduced by Eve or not.

Figure 16:
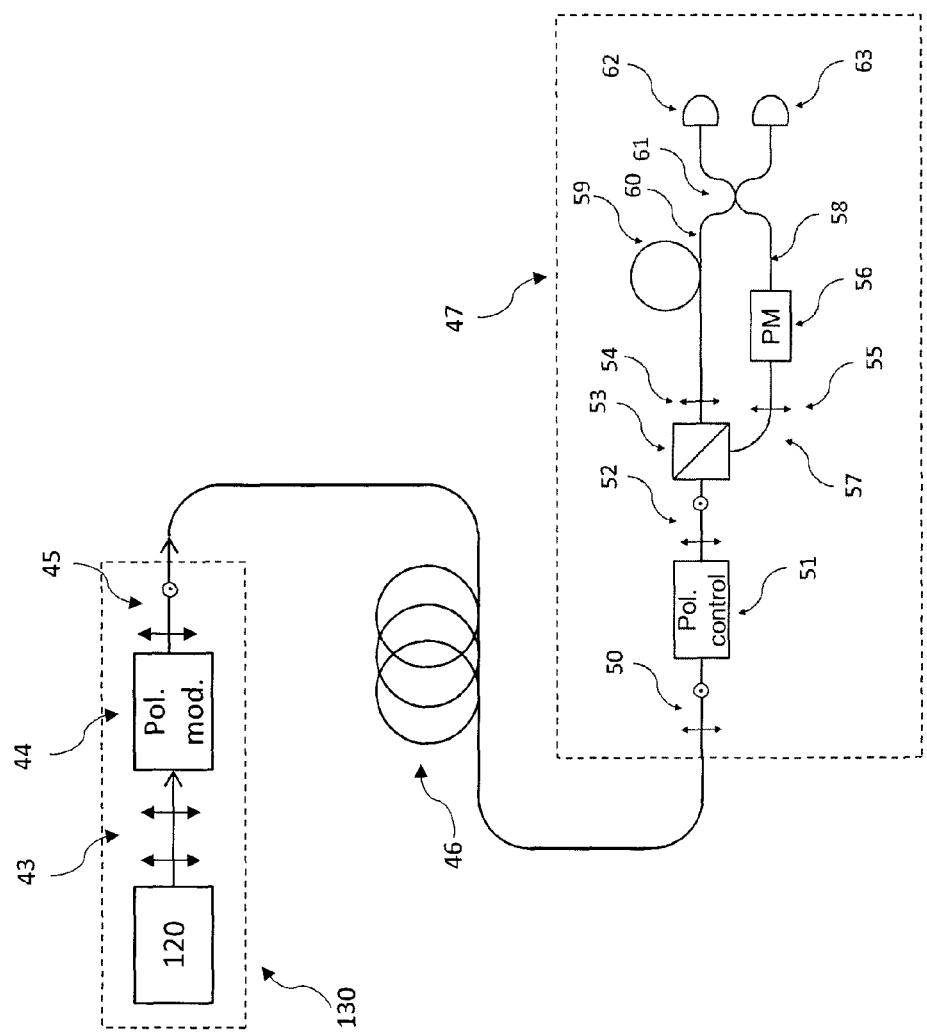
FIG. 16 is a schematic illustration of a quantum communication system in accordance with an embodiment, where the Quantum Transmitter comprises an optical device with a phase control element such as that shown in FIG. 7.

FIG. 16 is a schematic illustration of a quantum communication system in accordance with an embodiment, where the Quantum Transmitter comprises an optical device 170 with a phase control element 125 and an intensity control element such as that shown in FIG. 11. In an embodiment, the gain switched laser 24 and the coherent light source 20 are integrated on a substrate, as described in relation to FIGS. 18 to 33. Quantum transmitter 130 comprises a polarization modulator. In alternative embodiments, the transmitter does not comprise a polarization modulator. Quantum receiver 47 is the same as in the system shown in FIG. 13. Quantum Transmitter 130 and Quantum Receiver 47 are connected by an optical transmission line 46.

A schematic illustration of optical device 120 is shown in FIG. 7. Coherent light source 20 is a semiconductor laser. Coherent light source 20 is configured to generate long light pulses at regular intervals. In order to encode information, phase control element 125 may apply a short current pulse to coherent light source 20 which is timed to occur halfway through the generation of a long light pulse. This applies a phase shift to the second half of the long light pulse. The long light pulse 121 then enters gain-switched laser 24, which generates a first short pulse when the first half of the long light pulse is incident, and generates a second short pulse when the second half of the long light pulse is incident. The phase difference between the two generated short light pulses is determined by the phase shift applied by the phase control element 125. The phase difference between a short light pulse generated when a first long light pulse is supplied and a short light pulse generated when a second long light pulse is supplied is random.

Using phase control element 125 and phase modulator 56 a Quantum Key Distribution protocol such as BB84 can be realized. For example, Alice can randomly set the amplitude of the current pulse applied by the phase control element 125 to the coherent light source 20 to one of four different values, corresponding to phase shifts of 0

$$\frac{\pi}{2},$$

π, and $$\frac{3\pi}{2}.$$

0 and π associated with bits 0 and 1 in a first encoding basis, while $$\frac{\pi}{2}$$

and $$\frac{3\pi}{2}$$

are associated with 0 and 1 in a second encoding basis.

The phase modulated double pulses 43 exit the optical device 120. The late pulse is emitted from the optical device 120 a time Δt after the early pulse. The phase modulated double pulse 43 enters polarization modulator 44 which flips the polarization of the early pulse by 90 degrees, such that the polarization of the early pulse is orthogonal to the polarization of the late pulse. The coherent double pulse with orthogonal polarization 45 then exits the quantum transmitter and is sent via optical transmission line 46 to the quantum receiver 47.

Quantum receiver 47 has been described previously with reference to FIG. 13. Bob can randomly set the voltage applied to the phase modulator 56 when the late pulse is present to one of two values, corresponding to a phase shift of 0 or This amounts to selecting between the first and second measurement bases, respectively.

There is constructive interference at detector 62 (and thus destructive interference at detector 63) when there is a phase difference of 0 (i.e. the phase shift applied by Alice is 0 and the phase shift applied by Bob is 0 or the phase shift applied by Alice is $$\frac{\pi}{2}$$

and the phase shift applied by Bob is $$\frac{\pi}{2}),$$

leading to a detection at detector 62. If, on the other hand, there is a phase difference of π (i.e. the phase shift applied by Alice is π and the phase shift applied by Bob is 0 or the phase shift applied by Alice is $$\frac{3\pi}{2}$$

and the phase shift applied by Bob is $$\frac{\pi}{2})$$

there will be a detection at detector 63. For any other value of difference between the phase modulation applied at the two phase modulators, there will be a finite probability that a photon may output at detector 62 or detector 63. The phase shift applied and the measurement result are recorded.

If the phase control element 125 does not supply any current pulse to the coherent light source 20 for two consecutive long light pulses, the phase difference between two short light pulses generated during the time the first long light pulse is supplied to the gain-switched laser 24 and the phase difference between two short light pulses generated during the time the second long light pulse is supplied to the gain-switched laser 24 is the same. In some cases however, the phase difference may drift over time due to ambient temperature changes or changes of the driving conditions of the coherent light source 20 for example. These drifts are much slower than the pulse repetition rate of the coherent light source 20. For example, for two long light pulses generated several seconds apart without any current pulse supplied to the coherent light source 20 by the phase control element 125, the phase difference between two short light pulses generated during the time the first long light pulse is supplied to the gain-switched laser 24 and the phase difference between two short light pulses generated during the time the second long light pulse is supplied to the gain-switched laser 24 may be slightly different due to drift. This can be compensated for by the phase control element 125. The compensation is based on a measurement of the phase difference which, for example, is performed in the receiver. Based on the error rate detected at the receiver. Bob sends a feedback signal to Alice to adjust the phase of the phase control element 125 to minimize the error rate. The drift could also be compensated in the receiver interferometer.

The intensity control element 126 in optical device 170 can be used to implement the decoy state BB84 protocol.

Figure 17:
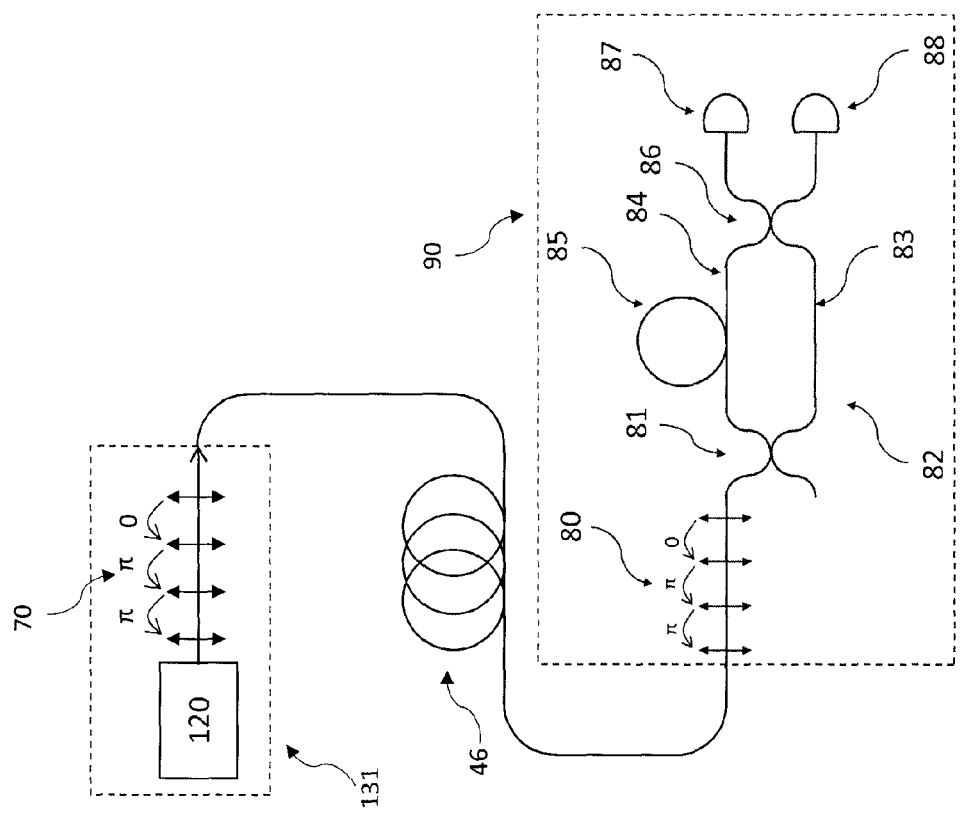
FIG. 17 is a schematic illustration of a differential-phase shift quantum communication system in accordance with an embodiment, where the Quantum Transmitter comprises an optical device with a phase control element such as that shown in FIG. 7.

FIG. 17 is a schematic illustration of a differential-phase shift quantum communication system in accordance with an embodiment, where the Quantum Transmitter comprises an optical device 120 with a phase control element 125 such as that shown in FIG. 7. In an embodiment, the gain switched laser 24 and the coherent light source 20 are integrated on a substrate, as described in relation to FIGS. 18 to 33. Quantum receiver 90 is the same as in the system shown in FIG. 14. Quantum Transmitter 131 and Quantum Receiver 90 are connected by an optical transmission line 46.

A schematic illustration of optical device 120 is shown in FIG. 7. Coherent light source 20 is a semiconductor laser. Coherent light source 20 is configured to generate CW light. In alternative embodiments, the coherent light source generates long light pulses of duration greater than or equal to 10 ns. In order to encode information, phase control element 125 may apply a short current pulse to coherent light source 20. This results in a phase difference between a first part and a second part of the CW light. The CW light enters gain-switched laser 24, which generates a first short pulse when the first part of the light is incident, and generates a second short pulse when the second part of the light is incident. There is a phase difference between the generated short light pulses equal to the phase difference between the first part and second part. The phase control element 125 encodes information between consecutive pulses by controlling the phase difference between parts of the generated CW light.

The phase control element 125 is configured to introduce a phase shift of either 0 or π between subsequent pulses to generate the sequence of light pulses 70. For the pulses shown in FIG. 17, phase control element 125 applies no short current pulse to coherent light source 20 initially, resulting in no phase difference between the first part and the second part of the CW light, and thus no phase difference between the first and second short light pulses. At the next regular interval, phase control element 125 then applies a short current pulse to coherent light source 20, resulting in a phase difference of π between the second part and the third part of the CW light, and thus a phase difference of π between pulse 2 and 3. At the next regular interval, phase control element 125 applies a short current pulse of a particular amplitude to coherent light source 20, resulting in a phase difference of π between the third and fourth part of the CW light, and thus a phase difference of π between pulses 3 and 4 in the sequence. A phase difference of 0 between subsequent pulses is associated with a bit value of 0. A phase difference of π between subsequent pulses is associated with a bit value of 1.

In some embodiments in which the optical device is used in a quantum communication system, an attenuator reduces the intensity of the light pulses emitted from the optical device. In some embodiments, the intensity if reduced such that the light pulses comprise 10 or fewer photons. In some embodiments, the average number of photons per pulse is less than 1.

Figure 18:
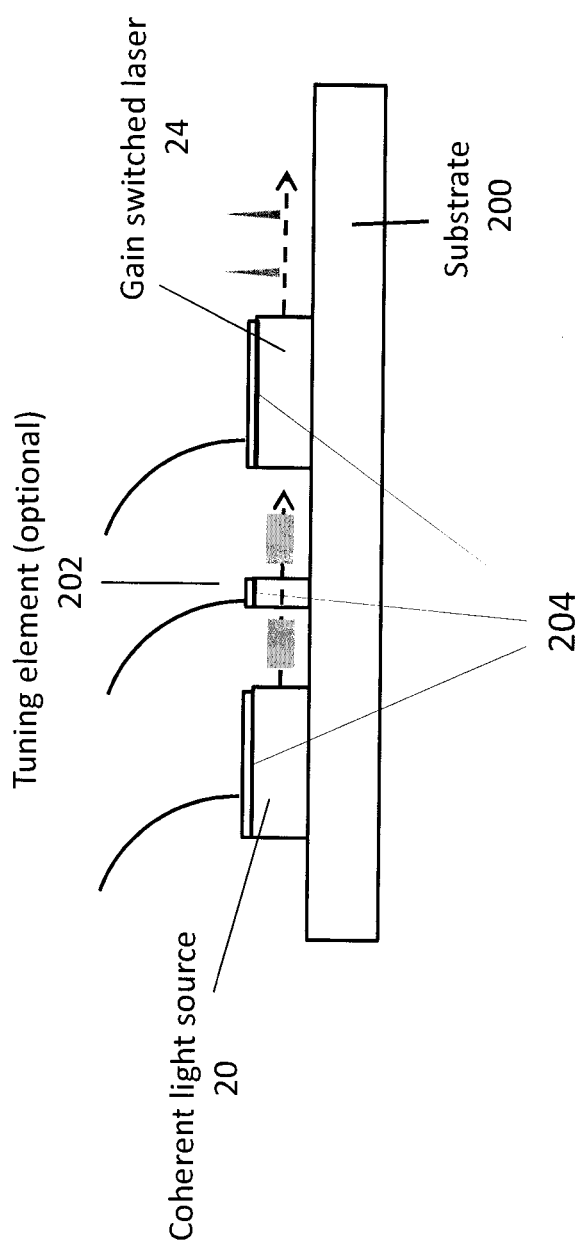
FIG. 18 shows a schematic illustration of an optical device in accordance with an embodiment, in which a coherent light source 20 and a gain switched laser 24 are integrated on a semiconductor substrate 200 in a lateral combination.

FIG. 18 shows a schematic illustration of an optical device in accordance with an embodiment, in which a coherent light source 20 and a gain switched laser 24 are integrated on a semiconductor substrate 200. The coherent light source 20 and the gain switched laser 24 are edge emission lasers, and are laterally combined on the substrate 200. Light is emitted in the plane of the layers, i.e. in a direction perpendicular to the stacking direction of the layers.

The coherent light source 20 and the gain switched laser 24 are integrated onto a first surface of the substrate 200. The coherent light source 20 and the gain switched laser 24 are arranged relative to each other in a first plane, which is substantially parallel to the first surface of the substrate 200. Light is emitted from the coherent light source 20 and the gain switched laser 24 in the first plane. The coherent light source 20 and the gain switched laser 24 are configured such that light emitted from the coherent light source 20 enters an aperture of the gain switched laser 24. A time varying signal is applied to the gain switched laser such that it emits a plurality of light pulses during each period of time when the coherent light is received. The plurality of light pulses emitted during each period have a fixed phase relation.

The optical device shown in FIG. 18 can be grown by metal organic vapour phase epitaxy (MOVPE). MOVPE is suitable due to the multiple overgrowth steps in the process. The device can be grown using a monolithically integrated approach or alternatively can be flip-chip bonded on a foreign carrier, as described in relation to FIG. 33.

The optical device may optionally comprise a tuning element 202 also integrated onto the substrate 200. The tuning element may be arranged in the first plane, between the coherent light source 20 and the gain switched laser 24.

The tuning element 202 may be a phase modulator 130 such as described in relation to FIG. 6(*a*) for example. Where the tuning element 202 is a phase modulator, changing the voltage across this section changes the index of refraction and therefore the phase of the light which is injected into the gain switched laser 24. This allows phase modulation to be achieved without an external phase modulator. The phase modulator can also be positioned after the gain switched laser 24, such that the gain switched laser 24 is between the phase modulator and the coherent light source 20.

The phase modulator applies a phase shift to the coherent light before it is supplied to the gain switched laser 24. For example, the coherent light source 20 may apply long light pulses to the gain switched laser 24. The phase modulator can apply a phase shift when the second half of a long light pulse generated by the coherent light source 20 is present. The long light pulse is then supplied to the gain switched laser 24. A time varying signal is applied to the gain switched laser 24 such that it emits short light pulses. A short light pulse may be emitted from the gain switched laser 24 once during the period when the first half of the long light pulse is present and once when the second half of the long light pulse is present. Each light pulse generated in the gain-switched laser 24 has a fixed phase relation to the injected coherent light.

The phase difference between the first and second short light pulses is thus determined by the phase shift applied to the second half of the long light pulse by the phase modulator. The relative phase of any two consecutive pulses emitted when a single coherent light pulse is received with the same difference in emission times can therefore be different in different periods, depending on the phase modulation applied at the phase modulator. However, the relative phase of two pulses emitted during a period when a coherent light pulse is incident is not random, but is fixed. The relative phase will depend on the phase applied at the phase modulator. For example, the phase difference between two light pulses emitted when a first coherent light pulse is received and the phase difference between two light pulses emitted when a second coherent light pulse is received has a fixed relationship, which will depend on the phase applied at the phase modulator. The relative phase of any two pulses emitted during periods when different long light pulses were incident is not fixed, and is random. For example, the phase difference between a light pulse emitted when a first coherent light pulse is received and a light pulse emitted when a second coherent light pulse is received has a random relationship to the phase difference between a light pulse emitted when the second coherent light pulse is received and a light pulse emitted when a third coherent light pulse is received. This means that for a QKD system, an unauthorised eavesdropper, Eve, cannot lock her measuring apparatus to this phase. The phase modulator can apply a phase modulation a plurality of times during a period when one long light pulse is present or when CW light is present for example.

Alternatively, the tuning element 202 may be an intensity modulator as described in relation to FIG. 6(*b*) for example.

Further sections may be included. For example the device may comprise: a coherent light source, a phase tuning element, a gain switched laser, an intensity tuning element for generating decoy states, and an intensity tuning element for generating vacuum states. The device may comprise two or more intensity modulators, where one is used to generate the decoy level, for example, and the second one to generate the vacuum level. Alternatively, the device can comprise a single intensity modulator, and both levels are generated with the single intensity modulator.

In one embodiment, phase modulation can be performed by controlling the phase of the light generated by the coherent light source 20 with a phase control element 125 such as described in relation to FIG. 7. Coherent light source 20 generates long light pulses. The phase of the second half of a long light pulse generated by coherent light source 20 is modulated with respect to the first half of the long light pulse by phase control element 125. Alternatively, the phase control element can apply phase modulation a plurality of times during a period when one long light pulse is generated.

The coherent light source 20 may generate CW coherent light. In this case, periods are defined, and the phase of the CW light emitted during each period can be modulated with respect to the phase of the CW light emitted during the previous period.

Phase control element 125 applies a perturbation to the coherent light source 20 at regular intervals, which are timed to occur halfway through the generation of each long light pulse. The perturbation changes the phase of the second half of the light pulse, producing a phase difference between the first half of a light pulse and the second half of the light pulse. The perturbation is controlled, in other words, the same perturbation will always cause the same phase shift. The amplitude of the perturbation that is applied affects the phase shift that is generated. In one embodiment, the perturbation is a short current pulse. The long light pulse enters gain-switched laser 24.

A controller applies a time varying current to the gain-switched laser 24. The time varying current switches the gain-switched laser 24 above the lasing threshold once during the period when the first half of light pulse is present, such that a first short pulse is generated. The time varying current is configured such that it switches the gain-switched laser 24 above the lasing threshold a second time during the period when the second half of long light pulse is present, such that a second short pulse is generated. During the time the first half of light pulse is present the first short laser pulse is generated and during the time the second half of light pulse is present the second short laser pulse is generated. The phase difference between the first and second short laser pulses is determined by the phase change applied to the second half of long laser pulse.

The phase difference between the first and second short light pulses is thus determined by the perturbation applied by the phase control element 125. The relative phase of any two consecutive pulses emitted when a single coherent light pulse is received with the same difference in emission times can therefore be different in different periods, depending on the perturbation applied at the phase control element. However, the relative phase of two pulses emitted during a period when a coherent light pulse is incident is not random, but is fixed. The relative phase will depend on the perturbation applied at the phase control element. For example, the phase difference between two light pulses emitted when a first coherent long light pulse is received and the phase difference between two light pulses emitted when a second coherent light pulse is received has a fixed relationship, which will depend on the perturbation applied at the phase control element. The relative phase of any two pulses emitted during periods when different long light pulses were incident is not fixed, and is random. For example, the phase difference between a light pulse emitted when a first coherent light pulse is received and a light pulse emitted when a second coherent light pulse is received has a random relationship to the phase difference between a light pulse emitted when the second coherent light pulse is received and a light pulse emitted when a third coherent light pulse is received. This means that for a QKD system, an unauthorised eavesdropper, Eve, cannot lock her measuring apparatus to this phase.

In one embodiment, the substrate is InP. InP substrates can be used for devices operating at telecom wavelengths, as its crystallographic structure allows emission at energies from telecom bands. Alternatively, it is possible to use GaAs as a substrate. GaAs can be used to form emitters at 1.3 um. In one embodiment, the individual components are grown on InP and then flip-chip bonded to a different substrate.

One or more electrical contacts may be formed to the coherent light source 20 and gain switched laser 24. In an embodiment, AuGeNi may be used as an n-type contact metal and the p-contact metal may be any one of PdZnAu, AuCrAuZnAu or AuBe. An n-type electrode is formed comprising the n-contact and a p-type electrode is formed comprising the p-contact.

For fabrication of the device, wet etching of InP based materials can be used, for example with $Cl_2$ based etching at high temperatures diluted with Ar or $N_2$, $CH_4$ based etching or $SiCl_4$Ar based etching. Dielectric dry etching may also be used, and can be performed using $CHF_3$ or $CF_4$ based chemistry, with a dielectric hard mask formed using $Si_3N_4$ or $SiO_2$. Further details of methods of fabrication of specific examples of such devices are described below.

Various lateral shapes of the coherent light source 20 and the gain switched laser 24 can be formed, for example rectangular or square cross-section.

The optical device may comprise an integrated heat sink, which may be synthetic diamond for example.

In one embodiment, either or both of the coherent light source 20 and the gain switched laser 24, are distributed feedback (DFB) lasers, distributed Bragg reflector (DBR) lasers or ridge lasers. Ridge lasers are also referred to as stripe lasers. A Fabry-Perot laser is a type of ridge or stripe laser. The terms stripe and ridge refer to the form of the laser waveguide. Fabry Perot refers to the form of the laser cavity i.e. two parallel mirrors made up by the end faces of the waveguide.

Figure 20:
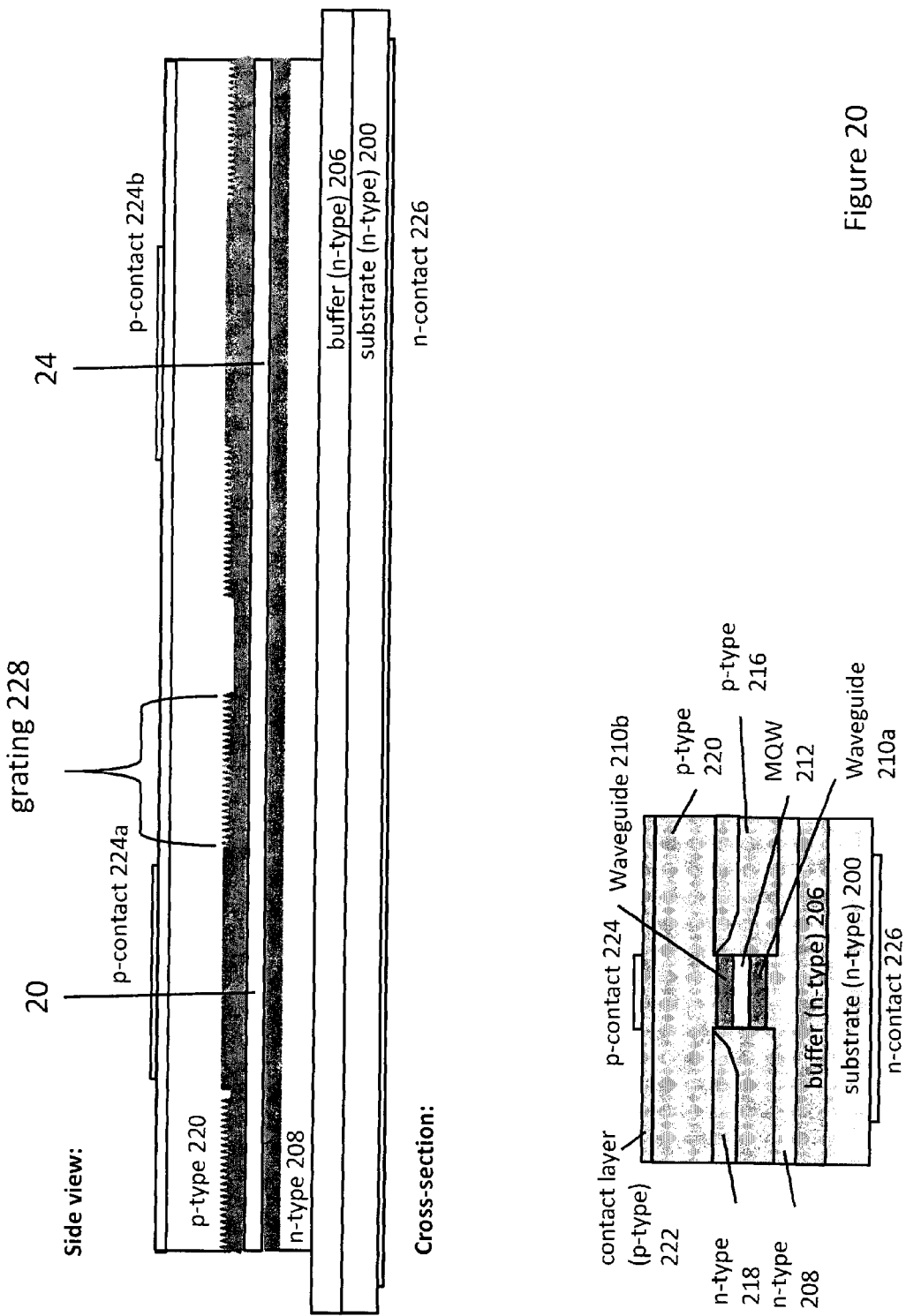
FIG. 20 shows a schematic illustration of an optical device in accordance with an embodiment, in which the coherent light source and the gain switched laser are both DFB lasers, in a vertical junction and in a lateral combination.
Figure 21:
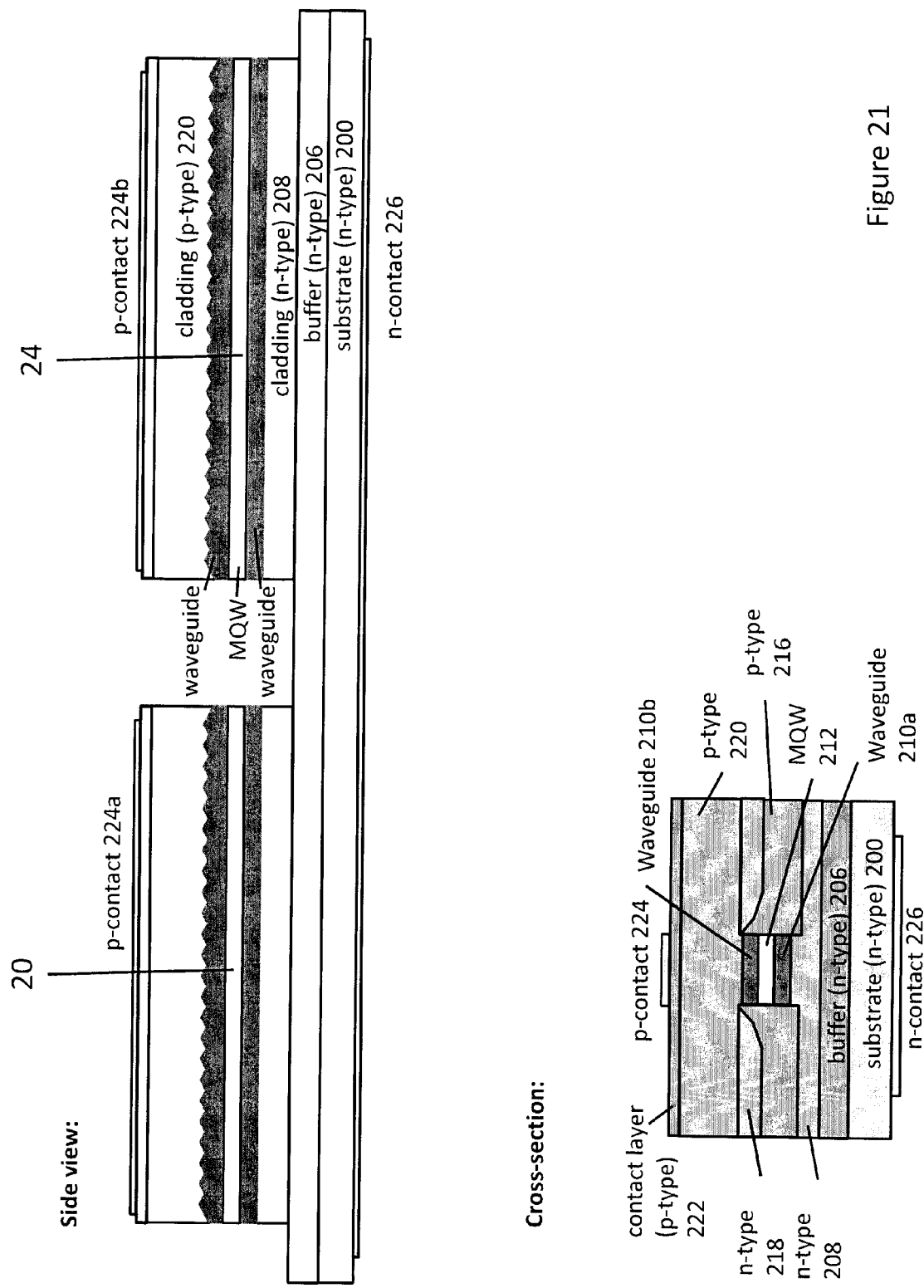
FIG. 21 shows a schematic illustration of an optical device in accordance with an embodiment, in which the coherent light source and the gain switched laser are both DFB lasers, in a vertical junction and in a lateral combination.

The lasers may comprise grating. The grating region may be separate from the active region or the active region may comprise the grating. A laser where the active region and grating are separate is referred to as DBR (distributed Bragg reflector) laser. A DBR is shown in FIG. 20. A laser where the active region comprises the grating is a DFB laser. A DFB laser is shown in FIG. 21.

In one embodiment, instead of a gain-switched laser 24, the device comprises an optical amplifier or an intensity modulator.

The optical amplifier may comprise an MQW.

An intensity modulator modulates the intensity of incoming light pulses. In an "off" state, the intensity modulator reduces the intensity of the light to a low level. In an "on" state, the intensity modulator allows a larger fraction of the incoming light to exit. An intensity modulator may modulate the intensity of the light by changing the absorption coefficient of the material in the modulator, for example an electro-absorption modulator. An electro-absorption modulator is a semiconductor device for which the voltage applied to the device changes the absorption coefficient, and therefore the intensity of light travelling through the device. In another embodiment the intensity modulator is based on a Mach-Zehnder interferometer. A Mach-Zehnder based intensity modulator changes the phase difference between the two arms of the interferometer to modulate the output intensity.

Where two different devices, such as a coherent light source and an optical amplifier, are monolithically grown, a physical gap is created between them, which may be achieved by etching trenches for example. This gap can be filled with a material with a similar index of refraction, after the trenches are etched.

In one embodiment, the device comprises a coherent light source 20 and a mirror 156 such as described in relation to FIG. 2(*d*), integrated onto a substrate. The device may comprise a DFB or ridge laser, and a light guiding region integrated onto the substrate. The mirror is formed by cleaving an edge of the light guiding region located at the other end of the light guiding region from the coherent light source 20.

FIG. 19(*a*) is a flow chart of a method of growth and fabrication of a monolithically integrated coherent light source 20 and gain switched laser 24 in a vertical junction in accordance with an embodiment. The method can be used to fabricate an optical device having a coherent light source 20 and a gain switched laser 24 which are the same type, for example both DFB lasers or both stripe lasers, in a lateral combination. The method may be used to fabricate a device such as described in relation to any of FIGS. 20 to 22.

In devices fabricated by this method, both the coherent light source 20 and the gain switched laser 24 are integrated monolithically on a substrate. In an embodiment, the substrate is an n-type InP substrate.

In step S101, a buffer layer 206 is grown on the substrate 200, followed by an active area structure. The active area structure may be referred to as an active region. In one embodiment, the buffer layer is 200 nm thick. In one embodiment, the buffer layer is n-type InP. The active area structure may be a multi quantum well (MQW) structure, where the method is used to fabricate DFB lasers or stripe lasers. A MQW structure is described in more detail in relation to FIG. 20 below. The active structure may comprise an n-type layer 208, a first waveguide layer 210*a*, a MQW layer 212 and a second waveguide layer 210*b*. This stage may be referred to as "0-level growth". The waveguide layers 210*a* and *b* may be InGaAs layers. The cladding layers, i.e. n-type layer 208 and p-type layer above the waveguide region 210b may be InAlAs, lattice matched to InP. The MQW active area within the waveguide may be InAs/InGaAs.

For a stripe laser, a p-type layer 220 is grown overlying and in contact with the second waveguide layer 210b and a p-type layer 222 is grown overlying and in contact with the p-type layer 220. The p-type layer 222 is a heavily doped p-type material, in which the carrier concentration is higher than layer 220. This can be omitted providing layer 220 has sufficient doping.

In step S102, the device is removed from the growth machine for "0-level fabrication". This step comprises deposition of a dielectric hard mask 214, which may be a $Si_3N_4$ or a $SiO_2$ layer for example. The thickness of this dielectric layer may be dependent on the thickness of the active area and the dry etch selectivity. A photo resist is then spun on the dielectric layer, and a strip is defined in the photo resist by optical lithography. In one embodiment, the strip is 1.5-2.5 μm in width and 500 μm length. For a DFB laser, the strip may be longer to include the grating length. The depth will depend on the wafer design. After development, the strip pattern defined in the resist is transferred to the dielectric layer through dry etching based on $CF_4$ or $CHF_3$ chemistry, for example. Next, the remaining resist on the surface is removed, for example in a resist remover solution or by $O_2$ plasma ashing. Next, a semiconductor dry etch is carried out. $Cl_2$ based chemistry may be used to provide good quality vertical sidewalls. The etch is performed down to the n-type layer 208 for a DFB laser. For a stripe laser, the etch is performed down to the p-type layer 220.

The sample is then ready for step S103: "1-level overgrowth". The dielectric hard mask 214 is left on the strip area for this step. This prevents local overgrowth on top of the active area. A p-type layer 216 followed by an n-type layer 218 are then grown. The etched area of the device is planarized. Planarization is a growth process performed at certain conditions in order to fill the etched areas with new epitaxial material. The top of the ridge is covered with a dielectric mask so growth does not occur there. The adatoms will preferentially form a layer at the bottom of the trench etched in the previous step.

Step S104 is "1-level fabrication". In this step, the dielectric hard mask 214 is removed. This may involve dipping the sample in HF or dry etching.

At this stage, step S104a, "active grating fabrication", may optionally follow if a DFB laser or a DBR laser is being fabricated. Alternatively, the fabrication method may proceed directly from step S102 to step S106 for a stripe laser.

Step S104a involves spinning the sample with an electron beam lithography resist and defining the grating pattern with electron beam lithography. The grating dimensions may depend on the laser output wavelength. After development the pattern is transferred by wet or dry shallow etching. Gratings are formed by etching part of the waveguide layer 210b off, for example by etching trenches in the waveguide layer 210b. The trenches may have a groove-shaped pattern. The dimensions of the grating are calculated according to the operation wavelength of the device. The grating on the surface of the waveguide layer 210b opposing the surface overlying and in contact with the MQW layer acts in a similar manner to a mirror. For a DBR laser, a grating may be formed at both ends of the component to create a cavity. The gratings at each end may have different reflectivity to enable output of the light from one end. For a DFB laser, a grating may be formed throughout the active region.

Step S105 is "2-level overgrowth". This involves growing an epitaxial p-type layer 220, which may be patterned by grating if optional step S104a has been performed. In an embodiment, this layer is 200 nm thick. Although the p-type layer 220 is grown across the entire device, due to the n-type layer 218 and p-type layer 216 the current is provided only to the active area.

Step S106 is "2-level fabrication", which involves definition of contact areas with optical lithography, depositions of n and p metal contacts and annealing. The n metal contact is deposited on the opposite surface of the substrate 200 to the coherent light source 20 and gain switched laser 24. The p metal contact is deposited on the p-type layer 220.

In the case where the device comprises two stripe lasers, vertical trenches are etched at each and of the coherent light source 20 and the gain switched laser 24 to provide end mirrors.

Similar devices can be fabricated in two independent runs, diced and then flip chip mounted and aligned on a foreign platform. For example two InP-based lasers can be mounted on a common Si carrier substrate. This is described in relation to FIG. 33.

Figure 19A:
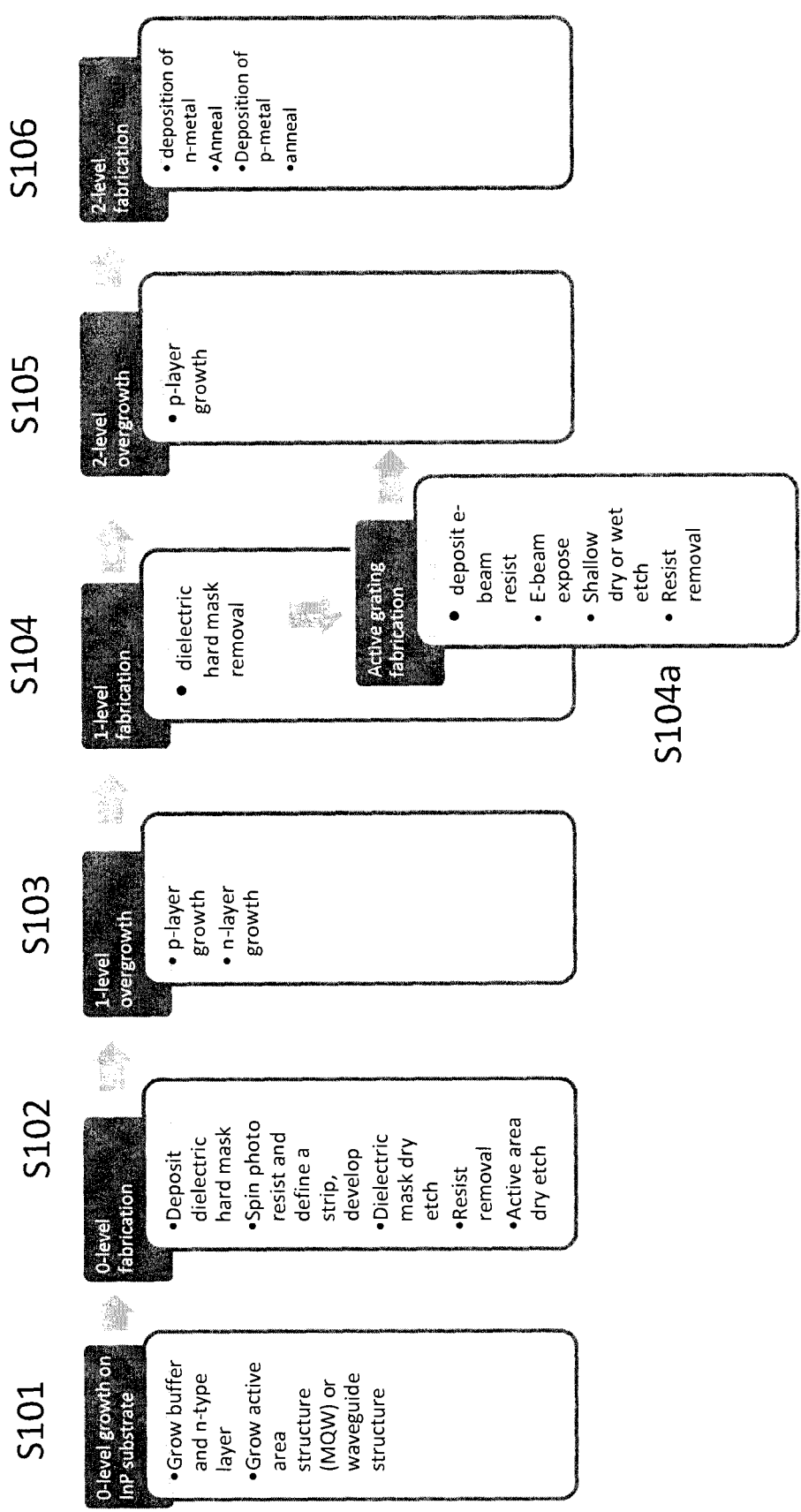
FIG. 19(a) is a flow chart of a method of growth and fabrication of a monolithically integrated coherent light source and gain switched laser in a vertical junction and a lateral combination in accordance with an embodiment.
Figure 19B:
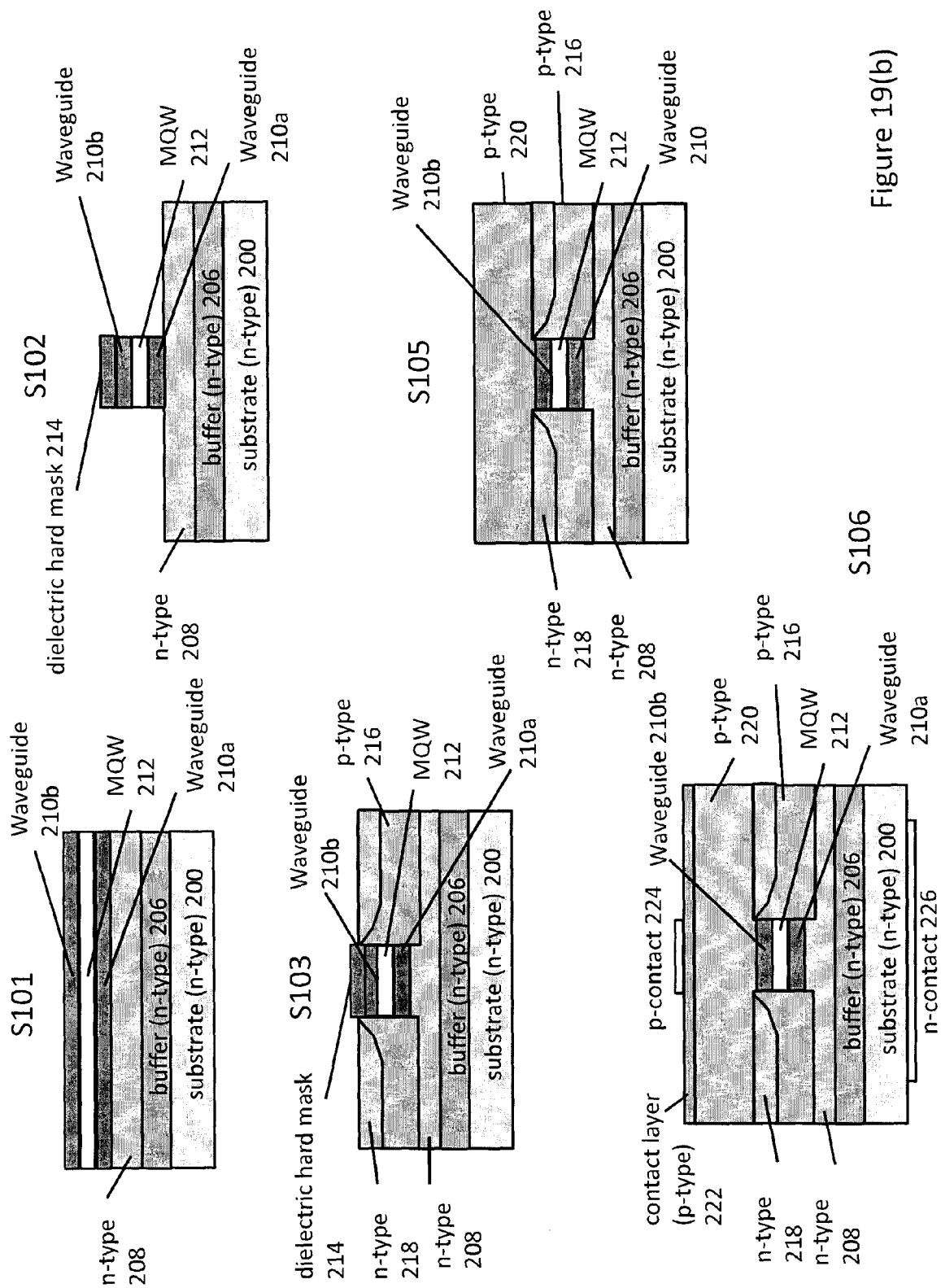
FIG. 19(b) shows the structure of the device after selected steps of the method of FIG. 19(a), for an optical device having two DFB lasers.

FIG. 19(b) shows the structure of the sample after the steps of FIG. 19a, for an optical device having two DFB lasers.

After step S101, the sample comprises a substrate 200, a buffer layer 206 overlying and in contact with the substrate 200, an n-type layer 208 overlying and in contact with the buffer layer 206, a first waveguide layer 210a overlying and in contact with the n-type layer 208, an MQW layer 212 overlying and in contact with the first waveguide layer 210a and a second waveguide layer 210b overlying and in contact with the MQW layer 212.

After step S102, the dielectric hard mask 214, second waveguide layer 210b, MQW layer 212 and first waveguide layer 210a are a ridge which is overlying and in contact with the n-type layer 208.

After step S103, the p-type layer 216 is overlying and in contact with the n-type layer 208 either side of the ridge, and the n-type layer 218 is overlying and in contact with the p-type layer 216.

After step S105, the dielectric hard mark 214 has been removed, and the p-type layer 220 is overlying and in contact with the ridge and the n-type layer 218.

After step S106, a p-type contact layer 222 is overlying and in contact with the p-type layer 220. A p-contact metal 224 is overlying and in contact with the p-type contact layer 222. An n-contact metal 226 is in contact with the opposite surface of the substrate to the p-contact metal 224.

Figure 19C:
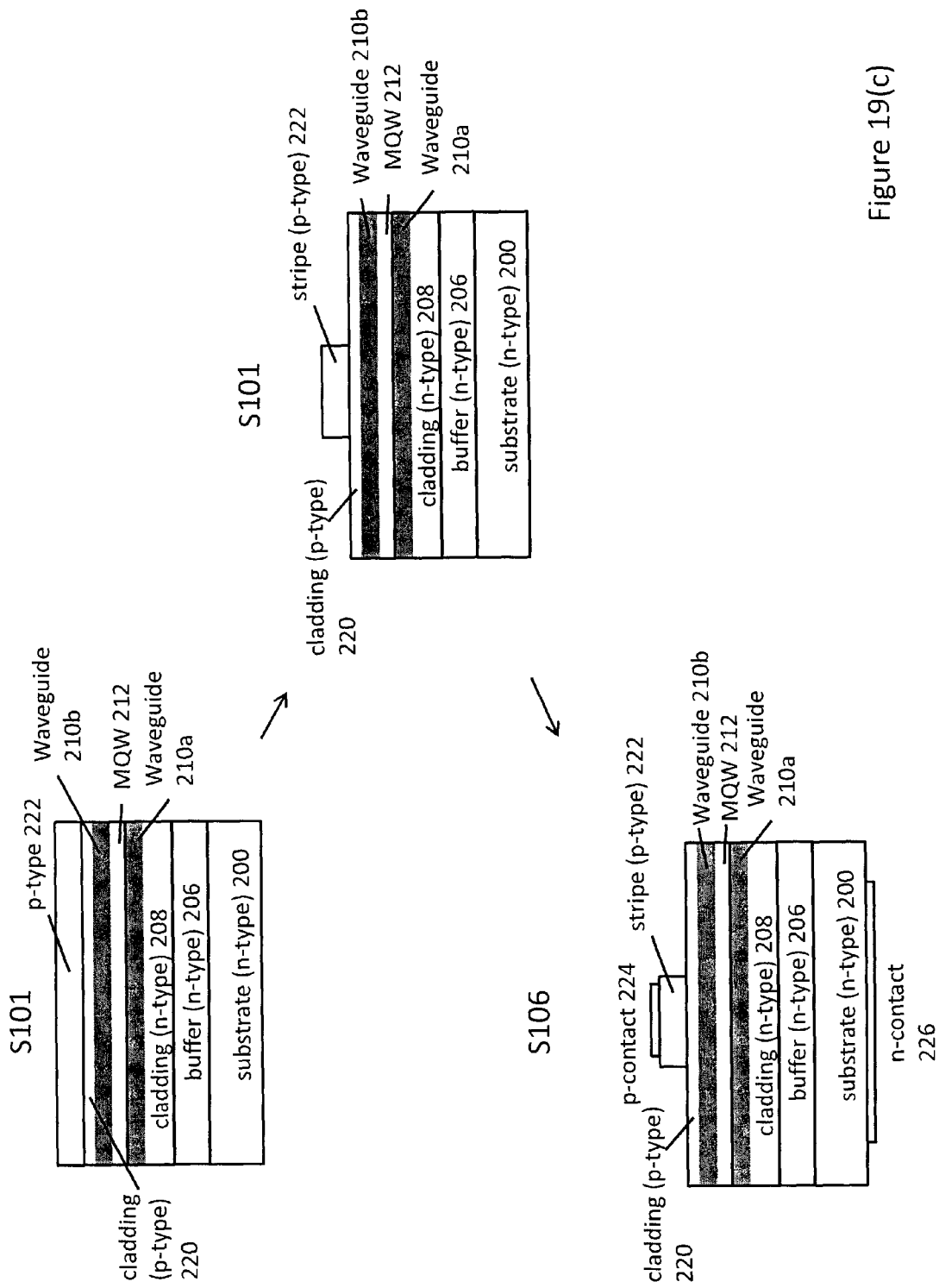
FIG. 19(c) shows the structure of the device after selected steps of the method of FIG. 19(a), for an optical device having two stripe lasers.

FIG. 19(c) shows the structure of the sample after each step for two stripe lasers.

After step S101, the sample comprises a substrate 200, a buffer layer 206 overlying and in contact with the substrate 200, an n-type layer 208 overlying and in contact with the buffer layer 206, a first waveguide layer 210a overlying and in contact with the n-type layer 208, an MQW layer 212 overlying and in contact with the first waveguide layer 210a and a second waveguide layer 210b overlying and in contact with the MQW layer 212, a p-type layer 220 overlying and in contact with the second waveguide layer 210b and a p-type layer 222 overlying and in contact with the p-type layer 220.

After step S102, the p-type layer 222 is a ridge which is overlying and in contact with the p-type layer 220.

After step S106, a p-contact metal 224 is overlying and in contact with the p-type layer 222. An n-contact metal 226 is in contact with the opposite surface of the substrate to the p-contact metal 224.

FIG. 20 shows a schematic illustration of an optical device in accordance with an embodiment, in which the coherent light source 20 and the gain switched laser 24 are both DBR lasers, in a vertical junction and in a lateral combination. The figure shows a side view along the length of the device, i.e. along the direction along which light is emitted and a cross-section through a direction perpendicular to the direction along which light is emitted are shown.

The active area in each DBR laser comprises a multi quantum well region (MQW). The MQW region comprises a plurality of quantum well layers. In an embodiment, in which a DBR laser is configured for 1.55 um operation, the MQW region comprises alternating layers of materials such as, for example: AlInGaAs/InP, AlInGaAs/AlInAs, InGaAsP/InP, InGaAsP/AlInAs or InGaAs/AlInGaAs. All these layers are lattice matched to the InP substrate.

The device comprises a substrate 200. On one surface of the substrate is an n-contact 226. Overlying and in contact with the opposite surface to the substrate 200 is the buffer layer 206. Both the substrate 200 and the buffer layer 206 are n-type layers. Alternatively, the structure can be reversed, such that the substrate 200 is a p-type layer. The layers may be n-doped InP. Overlying and in contact with the buffer layer 206 is the n-type layer 208. The n-type layer 208 may be n-doped InP. Overlying and in contact with a strip of the n-type layer 208 is a first waveguide material 210a. Overlying and in contact with the first waveguide material 210a is a MQW layer 212. Overlying and in contact with the MQW layer 210 is a second waveguide material 210b. On either side of the strip and overlying and in contact with the n-type material 208 is a p-type material 216, which may be p-doped InP. The n-type layer 218 is overlying and in contact with the p-type layer 216, and may be n-doped InP. The p-type layer 220 is overlying and in contact with the second waveguide layer 210b and the n-type layer 218, and may be p-doped InP. A p-type contact layer 222 is overlying and in contact with the p-type layer 220. In one embodiment, the p-type contact layer 222 is heavily doped InP, i.e. having a dopant concentration higher than that of layer 220. A p-contact metal 224 is overlying and in contact with part of the p-contact layer 222.

As shown in the side view, the MQW strip runs along the length of the device. There is a first p-type contact layer 224a over part of the MQW strip. On either side of the part of the strip under the first p-contact 224a along the direction in which light is emitted, there is a diffraction grating in the second waveguide material. This forms the coherent light source 20. A second p-type contact 224b is configured over a second part of the MQW strip, which is further along the length of the device from the coherent light source 20. On either side of the part of the strip under the second p-contact 224b in the direction in which light is emitted, there is a diffraction grating in the second waveguide material. This forms the gain switched laser 24.

A current is applied between the first p-contact 224a and the n-contact 226 in order to generate light in the MQW strip of the coherent light source 20. Light generated in the MQW strip of the coherent light source 20 is emitted along the MQW layer. The light is laterally confined by the p-type layer 216 and vertically confined by the waveguide layers 210a and b. The light enters the MQW layer of the gain-switched laser 24. A time varying current is applied between the second p-contact 224b and the n-contact 226. The light travels between the coherent light source 20 and the gain switched laser 24 in a waveguide region in this device.

FIG. 21 shows a schematic illustration of an optical device in accordance with an embodiment, in which the coherent light source 20 and the gain switched laser 24 are both DFB lasers, in a vertical junction and in a lateral combination. The figure shows a side view along the length of the device, i.e. along the direction along which light is emitted and a cross-section through a direction perpendicular to the direction along which light is emitted are shown.

The structure of the device is similar to the device shown in FIG. 20. However, FIG. 21 shows two DFB lasers, in which the grating is along the entire structure on the surface of the waveguide region 210b. The DFB lasers do not have discrete mirrors, instead the grating provides optical feedback distributed over the active region and the light is reflected by the grating. This is different to FIG. 20, which shows DBR lasers in which discrete mirrors are formed by gratings at the ends of the laser and the active regions and gratings are separate. There is a gap between the coherent light source 20 and the gain switched laser 24. The gap may extend across the entire device in the direction perpendicular to the direction in which light is emitted. The gap extends down to the buffer layer 206. Light travels between the coherent light source 20 and the gain switched laser 24 though free space in the gap. The gap is etched during fabrication of the device.

Figure 22:
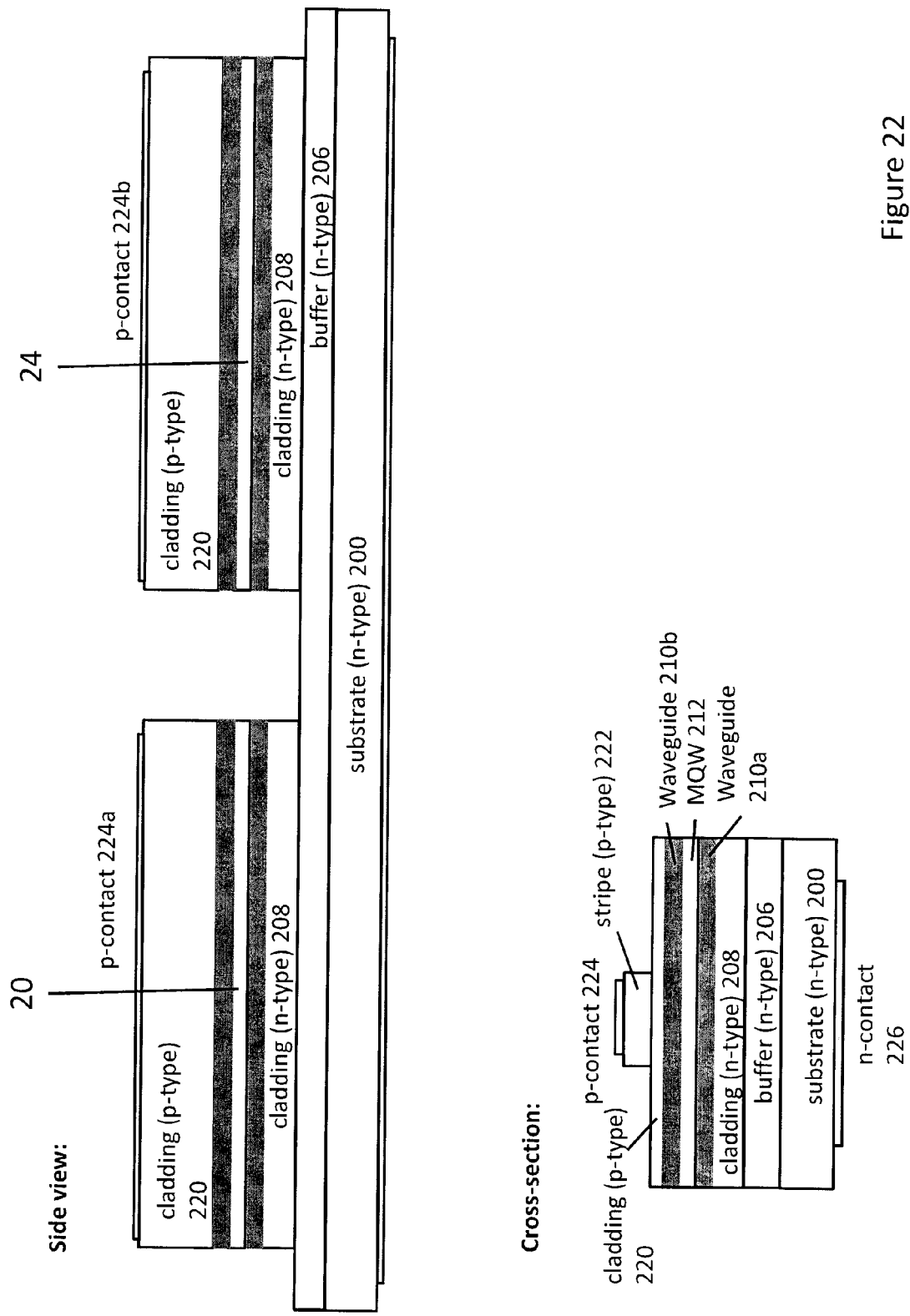
FIG. 22 shows a schematic illustration of an optical device in accordance with an embodiment, in which the coherent light source and the gain switched laser are both ridge lasers or stripe lasers, in a vertical junction and in a lateral combination.

FIG. 22 shows a schematic illustration of an optical device in accordance with an embodiment, in which the coherent light source 20 and the gain switched laser 24 are both ridge lasers or stripe lasers, in a vertical junction and in a lateral combination. The figure shows a side view along the length of the device, i.e. along the direction along which light is emitted and a cross-section through a direction perpendicular to the direction along which light is emitted are shown.

In one embodiment, the ridge lasers are waveguides with well-defined facets. The material structure comprises a core surrounded by cladding material which is lattice matched to an InP substrate 200. In one embodiment, the cladding material is InP and the core is AlInGaAs, for example. AlInGaAs may be used because it has a higher refractive index compared to InP.

The device comprises a substrate 200. On one surface of the substrate is an n-contact 226. Overlying and in contact with the opposite surface to the substrate 200 is the buffer layer 206. Both the substrate 200 and the buffer layer 206 are n-type. Alternatively, the device may have a reversed structure, in which the substrate 200 is p-type. Overlying and in contact with the buffer layer 206 is the n-type, cladding layer 208. Overlying and in contact with the n-type layer 208 is a first waveguide material 210a. Overlying and in contact with the first waveguide material 210a is a MQW layer 212. Overlying and in contact with the MQW layer 210 is a second waveguide material 210b. A p-type, cladding layer 220 is overlying and in contact with the second waveguide layer 210b. The cladding layer may be InAlAs. A ridge of a p-type material 222 is overlying and in contact with the p-type layer 220. A p-contact metal 224 is overlying and in contact with the ridge 222. In one embodiment, the p-type contact layer 222 is InGaAs.

As shown in the side view, there is a gap between the coherent light source 20 and the gain switched laser 24. The gap may extend across the entire device in the direction perpendicular to the direction in which light is emitted. The gap extends down to the substrate 200.

A current is applied between the p-contact 224a and the n-contact 226 in order to generate light. Light generated in the MQW strip of the coherent light source 20 is emitted along the MQW layer. The light is vertically confined by the waveguide layers 210a and b. The laser mode is guided beneath the etched stripe, i.e. layer 222 in FIG. 22. Light travels between the coherent light source 20 and the gain switched laser 24 though free space in the gap. The light enters the MQW layer of the gain-switched laser 24. A time varying current is applied between the p-contact 224b and the n-contact 226.

Figure 23:
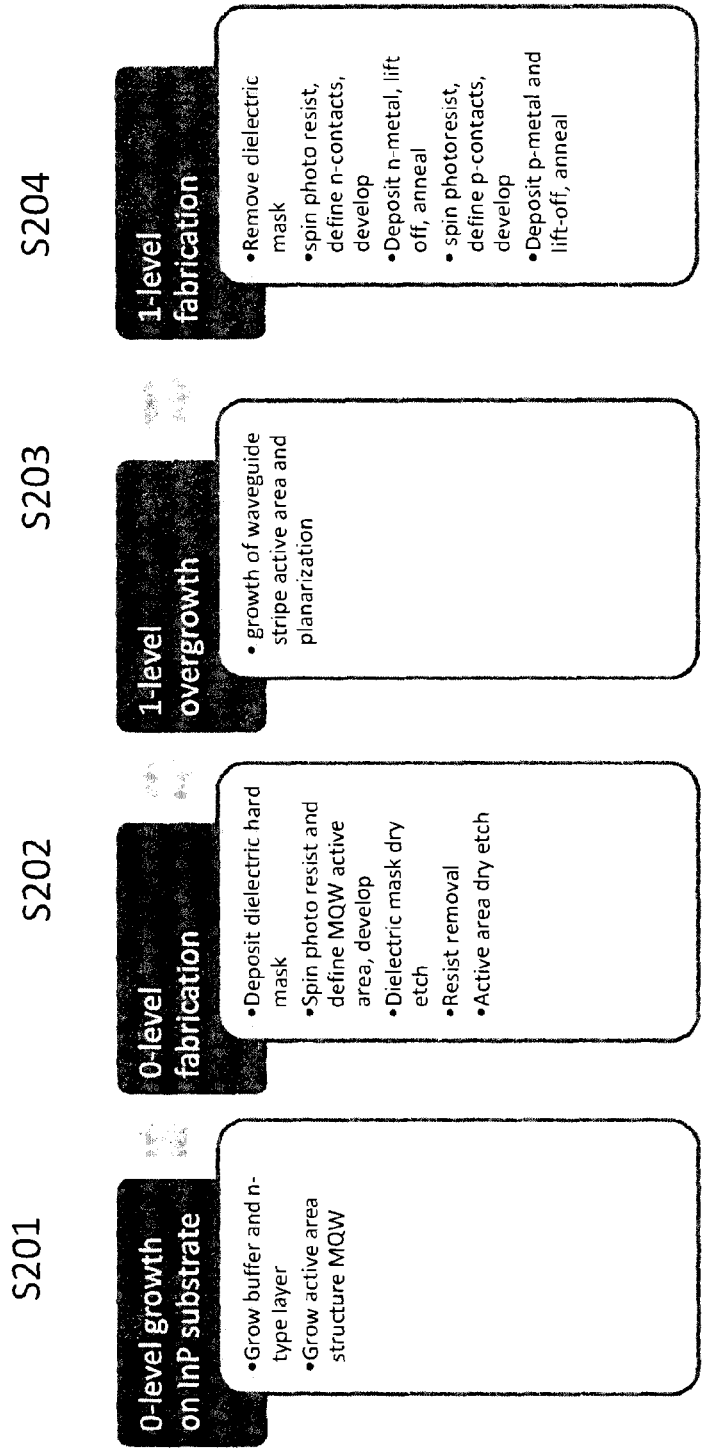
FIG. 23 shows a flow chart of a method of growth and fabrication of a monolithically integrated coherent light source and gain switched laser in a vertical junction and a lateral combination in accordance with an embodiment.

FIG. 23 shows a flow chart of a method of growth and fabrication of a monolithically integrated coherent light source 20 and gain switched laser 24 in a vertical junction in accordance with an embodiment. The method can be used to fabricate an optical device having a coherent light source 20 and a gain switched laser 24 which are different types, or which are the same type but which are in combination with further devices, in a lateral combination. The method may be used to fabricate a device such as described in relation to FIG. 24 or 25.

In devices fabricated by this method, both the coherent light source 20 and the gain switched laser 24 are integrated monolithically on a substrate. In an embodiment, the substrate is an n-type InP substrate. One of the coherent light source 20 and the gain switched laser 24 may be a DFB laser and the other may be a stripe laser, for example. Alternatively, the method may be used where both the coherent light source 20 and the gain switched laser 24 are the same type, but a further element is included in the device.

In step S201, "0-level growth", a buffer layer 206 is grown on the substrate 200, followed an active area structure, for example a MQW region 212. In one embodiment, the buffer layer 206 is 200 nm. The buffer layer may be an n-type InP layer.

In step S202, the sample is then taken out of the growth machine for "0-level fabrication". This step comprises deposition of a dielectric hard mask, which could be a $Si_3N_4$ or $SiO_2$ layer for example. The thickness of this dielectric layer may be dependent on the thickness of the active area grown and the dry etch selectivity. Next a photo resist is spun and a strip is defined by optical lithography. After development, the strip pattern defined in the resist is transferred to the dielectric layer through dry etching based on $CF_4$ or $CHF_3$ chemistry. Next, the remaining resist on the surface is removed in a resist remover solution or by $O_2$ plasma ashing. Next, a semiconductor dry etch is carried out. $Cl_2$ based chemistry may be used to provide good quality vertical sidewalls. This forms the "body" of one of the coherent light source 20 or gain switched laser 24, which may be, for example, a DFB laser. For a DFB laser, the steps for growing the p-type layer 216 and n-type layer 218 as described in relation to FIG. 19 may be included. In this stage, trenches are formed, by selectively removing the MQW area by etching.

The sample is then ready for step S203, "1-level overgrowth". The dielectric hard mask is left on the strip area. This will prevent local overgrowth on top of the device active area. In this step "the body" of the other of the coherent light source 20 and gain switched laser 24, which may be for example a stripe laser, is grown followed by planarization. The second laser structure is grown in the pre-defined trenches formed in step S202.

Where the coherent light source 20 and gain switched laser 24 are the same type, both are grown in step S202. A further component of a different type, for example a light guiding region, may then be grown in step S203.

In step S204, "1-level fabrication", the dielectric hard mask is removed. This involves dipping the sample in HF or dry etching. For the DFB laser, a diffraction grating should be formed at this stage by spinning the sample with an electron beam lithography resist and defining the grating pattern with electron beam lithography. The grating dimensions may depend on the laser output wavelength. After development the pattern is transferred by wet or dry shallow etching.

Next, fabrication is carried out, which involves spinning the optical resist and defining the n-contact 226. After development of the resist the n-metal is deposited and lifted off and annealed. A similar procedure is applied to define the p-contacts 224.

For the stripe laser, vertical trenches should be etched at either end of the stripe laser to provide end mirrors.

Similar devices can be fabricated in two independent runs, diced and then flip chip mounted and aligned on a foreign platform. For example two InP-based lasers may be mounted on a common Si carrier substrate.

Figure 24:
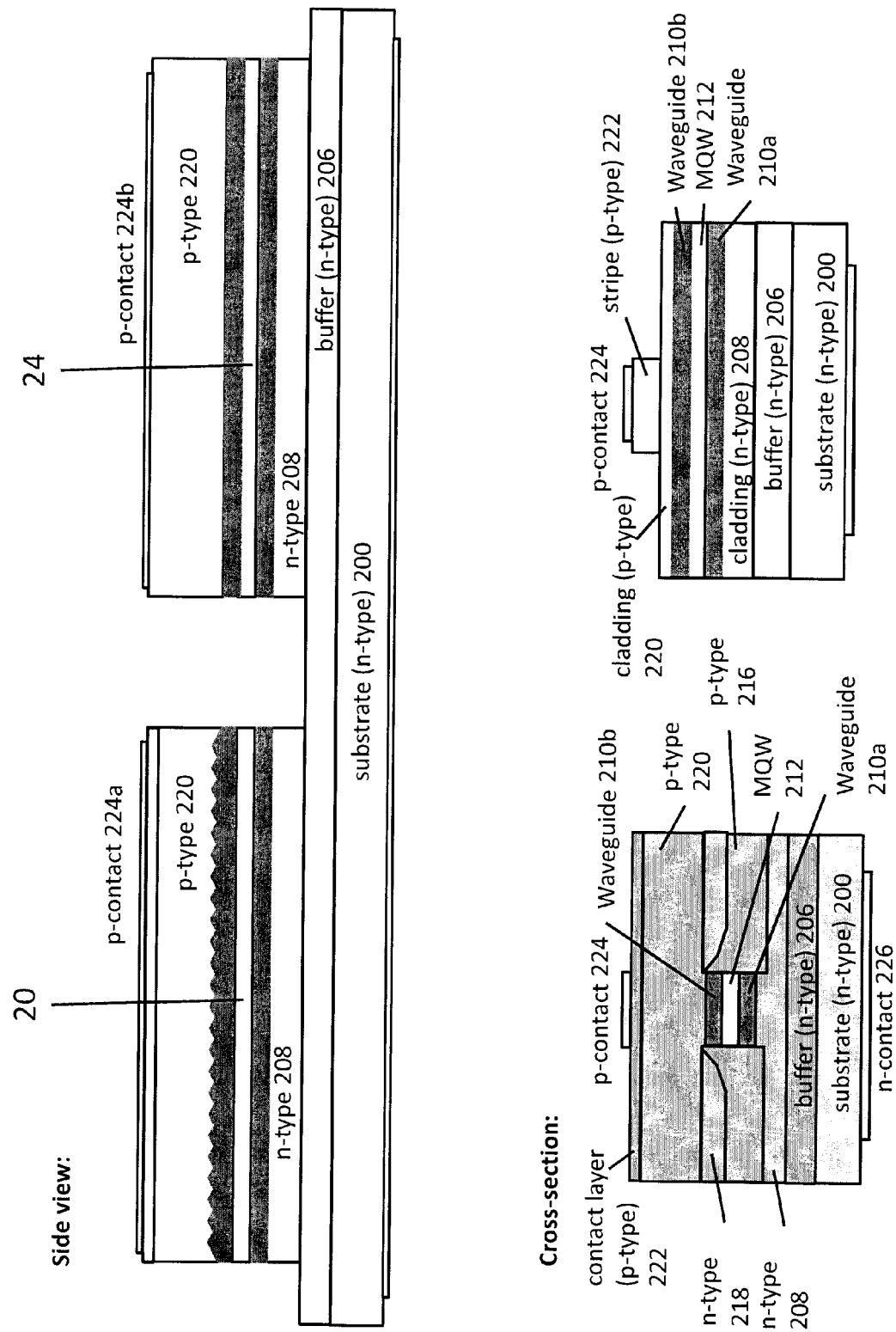
FIG. 24 shows a schematic illustration of an optical device in accordance with an embodiment, in which the coherent light source is a DFB laser and the gain switched laser is a stripe laser, in a vertical junction and in a lateral combination.

FIG. 24 shows a schematic illustration of an optical device in accordance with an embodiment, in which the coherent light source 20 is a DFB laser and the gain switched laser 24 is a stripe laser, in a vertical junction and in a lateral combination. The figure shows a side view along the length of the device, i.e. along the direction along which light is emitted and a cross-section through a direction perpendicular to the direction along which light is emitted.

The DFB laser has the structure described in relation to FIG. 21. The stripe laser has the structure described in relation to FIG. 22. There is a gap between the coherent light source 20 and the gain switched laser 24. The gap may extend across the entire device in the direction perpendicular to the direction in which light is emitted. The gap extends down to the substrate 200. Light travels between the coherent light source 20 and the gain switched laser 24 though free space in the gap.

Figure 25:
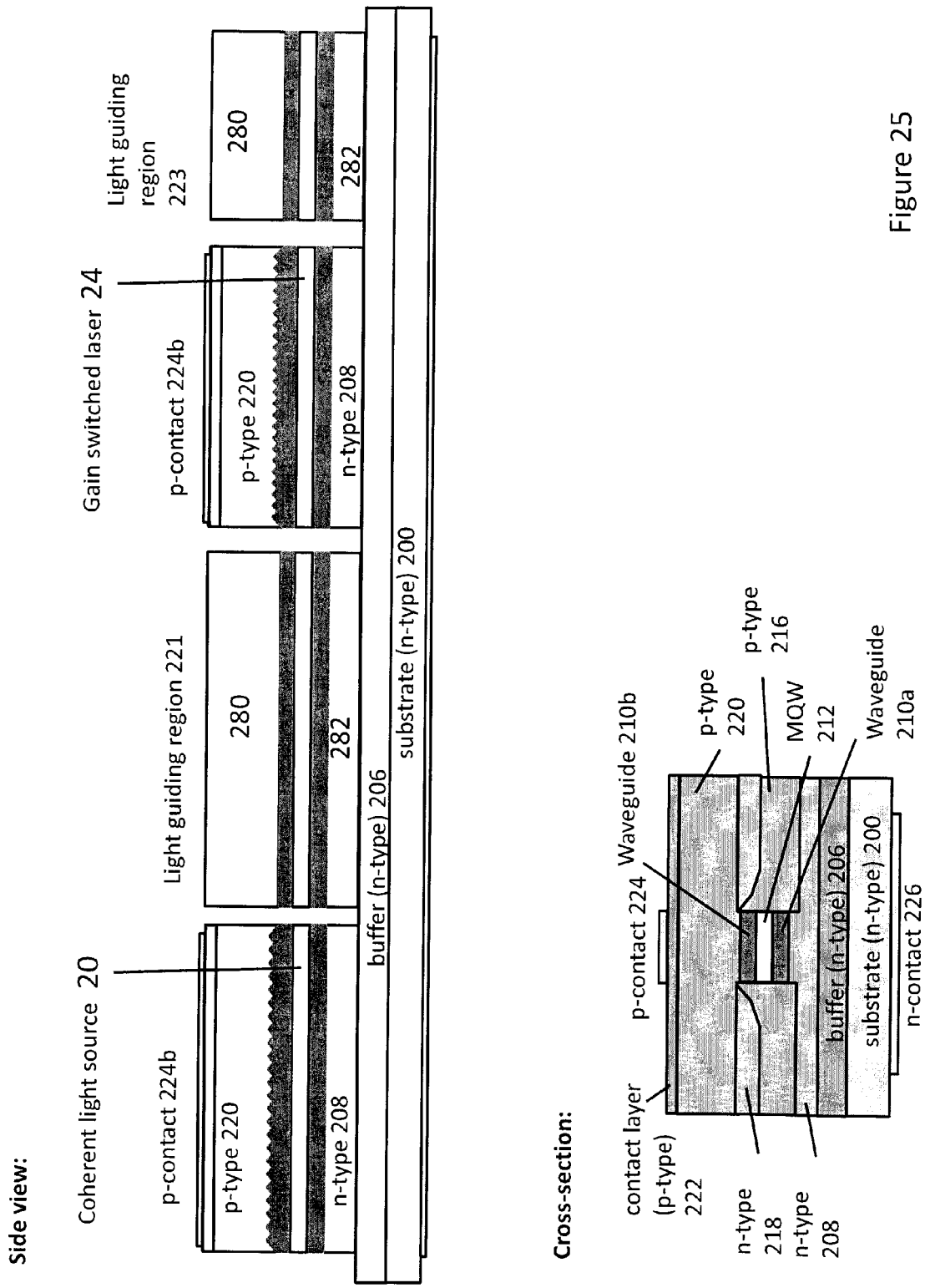
FIG. 25 shows a schematic illustration of an optical device in accordance with an embodiment, in which the coherent light source and the gain switched laser are both DFB lasers and comprising light guiding regions, in a vertical junction and in a lateral combination.

FIG. 25 shows a schematic illustration of an optical device in accordance with an embodiment, in which the coherent light source 20 and the gain switched laser 24 are both DFB lasers and comprising light guiding regions, in a vertical junction and in a lateral combination. The figure shows a side view along the length of the device. i.e. along the direction along which light is emitted and a cross-section through a direction perpendicular to the direction along which light is emitted are shown.

The DFB lasers have the structure described in relation to FIG. 21. There is a light guiding region 221 between the coherent light source 20 and the gain switched laser 24. There is a gap between the coherent light source 20 and the light guiding region 221, and a gap between the light guiding region 221 and the gain switched laser 24. There is a second light guiding region 223 positioned on the opposite side of the gain switched laser 24 to the first light guiding region 221. There is a gap between the gain switched laser 24 and the second light guiding region 223. The gaps may extend across the entire device in the direction perpendicular to the direction in which light is emitted. The gaps extend down to the buffer layer 206. Light travels between the coherent light source 20 and the gain switched laser 24 though free space in the gaps and the light guiding region 221.

The light guiding regions comprise a first layer 280 overlying and in contact with the buffer layer 206, a waveguide region overlying and in contact with the first layer 280 and a second layer 282 overlying and in contact with the waveguide region. Light is confined vertically and laterally in the waveguide region. The first layer 280 and second layer 282 may be InP for example. The waveguide region may comprise an InGaAs layer with InAlAs cladding regions.

Figure 26A:
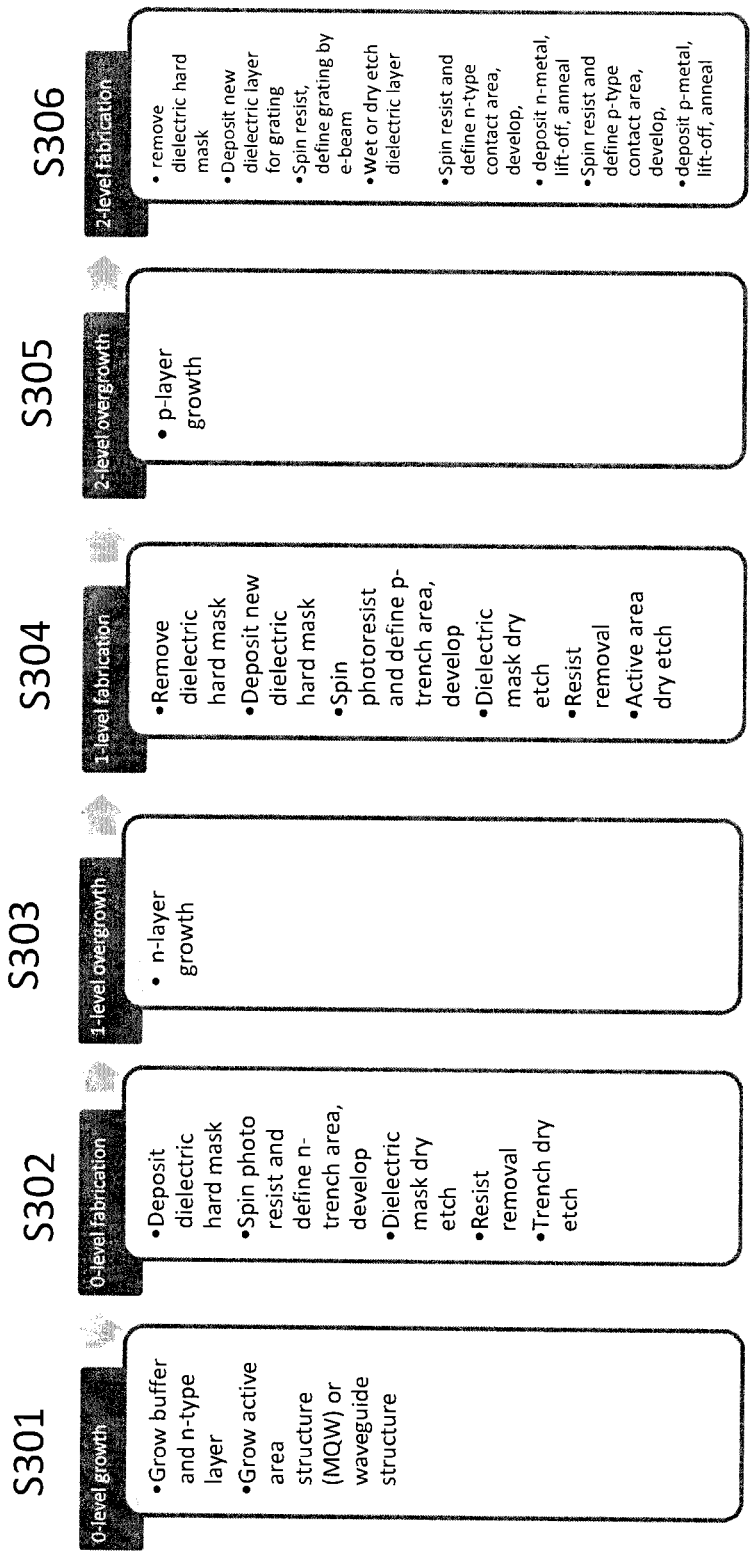
FIG. 26(a) shows a flow chart of a method of growth and fabrication of monolithically integrated coherent light source and gain switched laser in a lateral junction and a lateral combination in accordance with an embodiment.

FIG. 26(a) shows a flow chart of a method of growth and fabrication of monolithically integrated coherent light source 20 and gain switched laser 24 in a lateral junction in accordance with an embodiment. The method can be used to fabricate an optical device having a coherent light source 20 and a gain switched laser 24 which are the same types in a lateral combination. The method may be used to fabricate a device such as described in relation to FIG. 27.

In devices fabricated by this method, both the coherent light source 20 and the gain switched laser 24 are integrated monolithically on a substrate, for example a Si—InP substrate. A Si—InP substrate is used to create a lateral junction, in which all the current flows between the lateral n- and p-contacts.

In step S301, a buffer layer 206 is grown followed by an active area structure. In one embodiment, the buffer layer is 200 nm thick. In one embodiment, the buffer layer is semi insulating InP. The active area structure could comprise a multi quantum well (MQW) structure as described in relation to previous figures. This step is referred to as "0-level growth".

The sample is then taken out of the growth machine for step S302, "0-level fabrication". This involves deposition of a dielectric hard mask, which can be a $Si_3N_4$ or $SiO_2$ layer. The thickness of this dielectric layer may be dependent on the thickness of the active area grown and the dry etch selectivity. Next, a photo resist is spun and an n-trench area is defined by optical lithography. After development, the pattern defined in the resist is transferred to the dielectric layer, for example through dry etching based on $CF_4$ or $CHF_3$ chemistry. Next, the remaining resist on the surface is removed in resist remover solution or by $O_2$ plasma ashing. Next, a semiconductor dry etch is carried out. $Cl_2$ based chemistry may be used to provide good quality vertical sidewalls.

The sample is then ready for step S303, "1-level overgrowth". The dielectric hard mask is left on the area outside of the n-trench. This will provide selective area growth. The n-type layer 228 is grown in the n-trench and the etched area is planarized. The n-type layer 228 may be InP for example.

In step S304, "1-level fabrication" the dielectric hard mask is removed. This involves dipping the sample in HF or dry etching. At this point a new dielectric layer is deposited that will act as a new hard mask for dry etching. Again, the thickness of this layer may be dependent on the thickness of the active area grown and the dry etch selectivity. A photoresist is spun to define a p-trench area by optical lithography and developed. The pattern is transferred to dielectric layer by dry etching, for example based on $CHF_3$ or $CF_4$ chemistry. The resist is then removed, as before. The p-trench area is then dry etched based on $Cl_2$ chemistry.

Step S305, "2-level overgrowth" involves growing an epitaxial p-type layer 230 on top of the etched p-trench area. The p-type layer 230 may be InP for example. The dielectric layer left in previous growth steps enables selective area epitaxy.

Step S306, "2-level fabrication" involves removing the dielectric hard mask by HF dip or dry etching. For a DFB laser, a new dielectric layer is deposited which is then spun with resist and electron beam patterned with grating pattern. This is then dry or wet etched into the dielectric area.

In the final steps n- and p-type contacts are defined on top of the n- and p-type trenches respectively by optical lithography. Appropriate metals for n- and p-contacts are deposited, lifted off and annealed.

Similar devices can be fabricated in two independent runs, diced and then flip chip mounted and aligned on a foreign platform. For example, two InP-based lasers can be flip chip mounted onto a common Si carrier substrate.

Figure 26B:
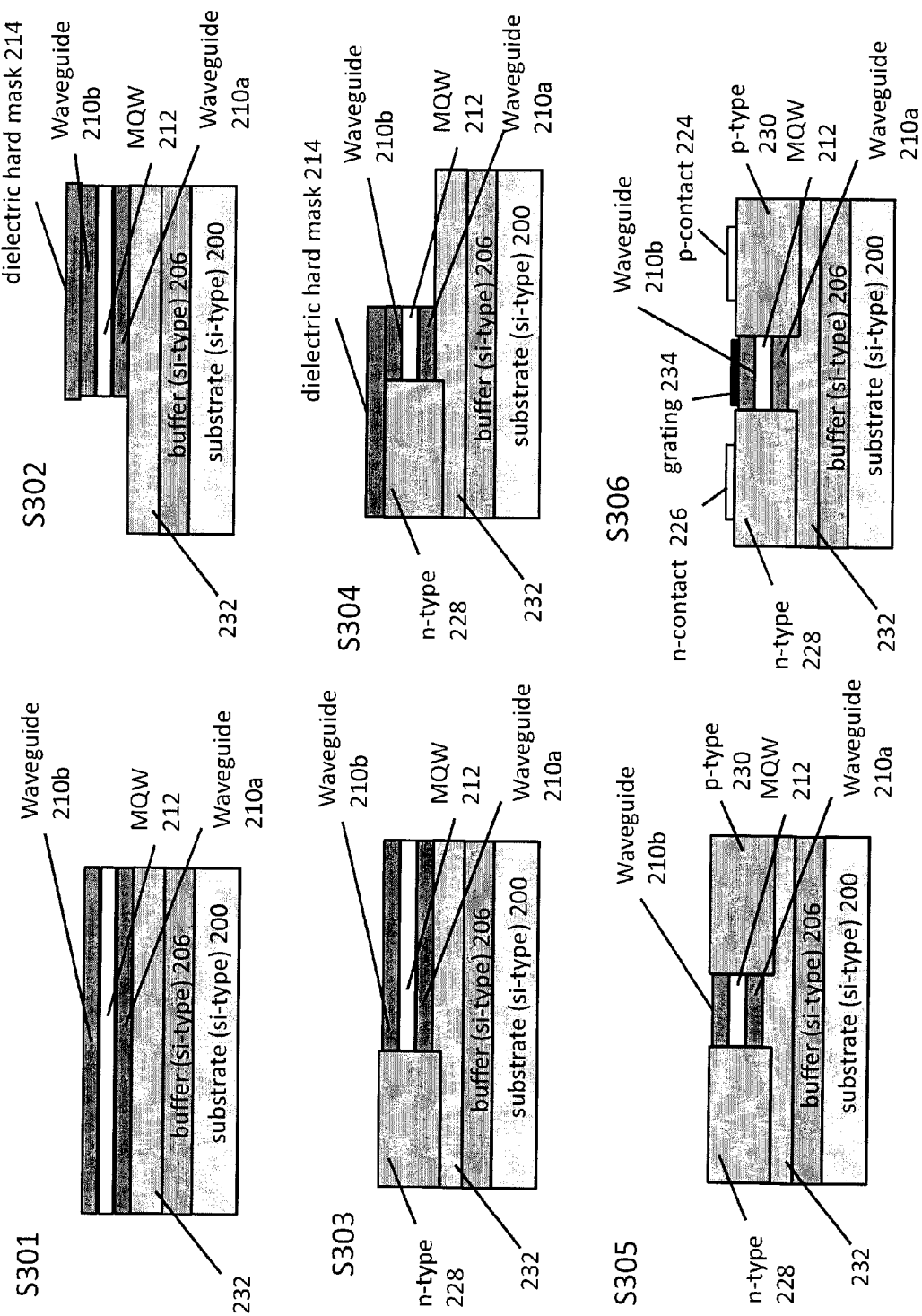
FIG. 26(b) shows the structure of the device after selected steps of the method of FIG. 26(a), for an optical device having two DFB lasers.

FIG. 26(b) shows the structure of the sample after the steps of FIG. 26(a), for an optical device having two DFB lasers.

After step S301, the sample comprises a substrate 200, a buffer layer 206 overlying and in contact with the substrate 200, a layer 232 overlying and in contact with the buffer layer 206, a first waveguide layer 210a overlying and in contact with the layer 232, an MQW layer 212 overlying and in contact with the first waveguide layer 210a and a second waveguide layer 210b overlying and in contact with the MQW layer 212.

After step S302, a plateau comprising the dielectric hard mask 214, second waveguide layer 210b, MQW layer 212 and first waveguide layer 210a is overlying and in contact with part of the layer 232.

After step S303, the n-type layer 228 is overlying and in contact with the layer 232, adjacent to the plateau, and the dielectric hard mask 214 has been removed.

After step S304, there is a plateau comprising the dielectric hard mask 214, overlying and in contact with the n-type layer 228 and the stack comprising the second waveguide layer 210b. MQW layer 212 and first waveguide layer 210a. The plateau is overlying and in contact with part of the layer 232.

After step S305, the n-type layer 228; stack comprising the second waveguide layer 210b, MQW layer 212 and first waveguide layer 210a; and the p-type layer 230 are overlying and in contact with the layer 232. The n-type layer 228 is adjacent to one side of the stack and the p-type layer 230 is adjacent to the opposite side of the stack.

After step S306, a grating is formed on the second waveguide layer 210b. A p-contact metal 224 is overlying and in contact with the p-type layer 230. An n-contact metal 226 is overlying and in contact with the n-type layer 228.

Figure 27:
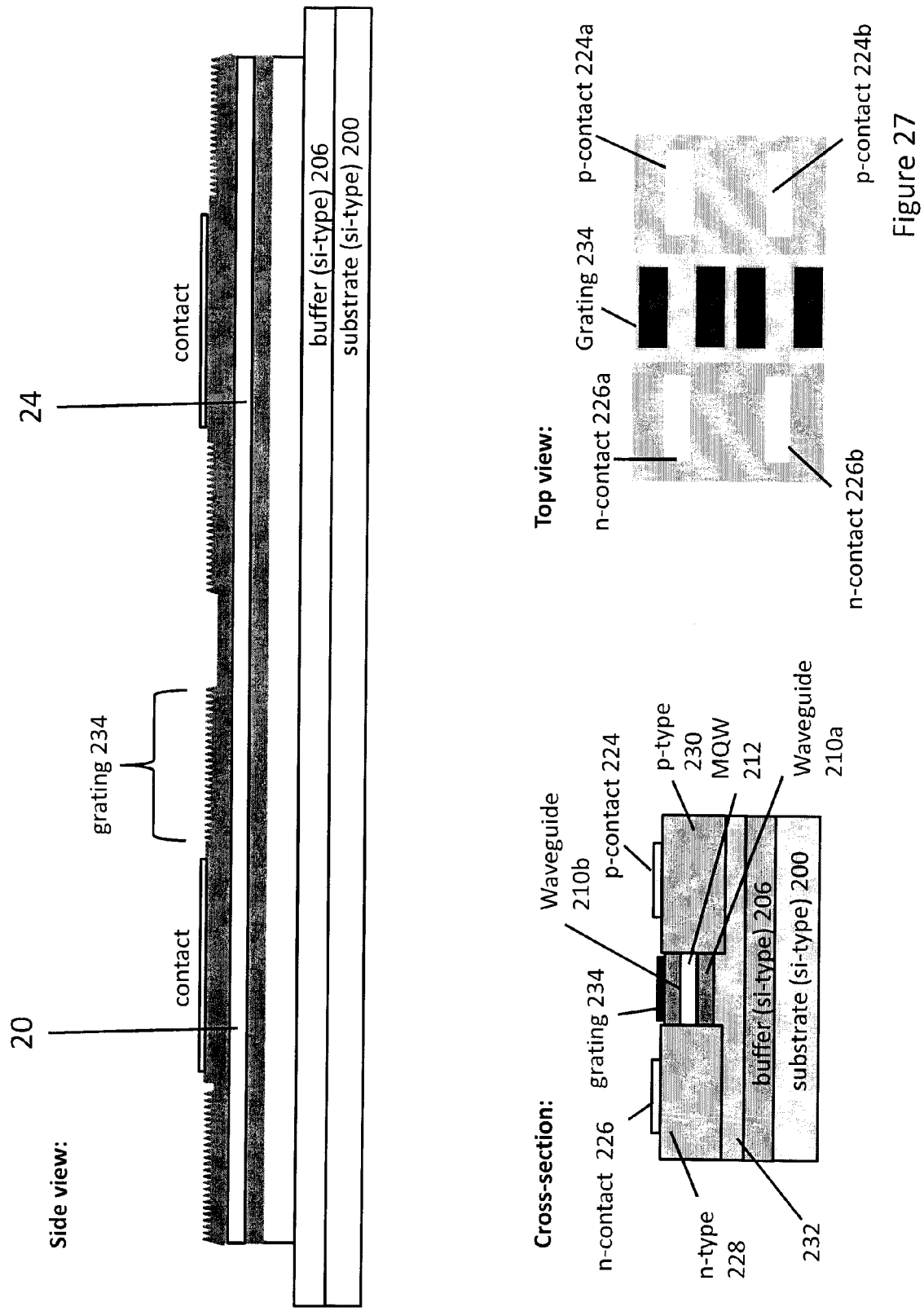
FIG. 27 shows a schematic illustration of an optical device in accordance with an embodiment, in which the coherent light source and the gain switched laser are both DFB lasers, in a lateral junction and in a lateral combination.

FIG. 27 shows a schematic illustration of an optical device in accordance with an embodiment, in which the coherent light source 20 and the gain switched laser 24 are both DBR lasers, in a lateral junction and in a lateral combination. Alternatively, the coherent ht source 20 and the gain switched laser 24 could be DFB lasers. The figure shows a side view along the length of the device, i.e. along the direction along which light is emitted, a cross-section through a direction perpendicular to the direction along which light is emitted are shown, and a top view down on the device from above, i.e. in the stacking direction of the layers.

The device comprises a substrate 200, a buffer layer 206 overlying and in contact with the substrate 200 and a layer 232 overlying and in contact with the buffer layer 206. The layer 232 is an extension of the buffer layer. The n-type layer 228; stack comprising the second waveguide layer 210b, MQW layer 212 and first waveguide layer 210a; and the p-type layer 230 are overlying and in contact with the layer 232. The stack is between the n-type layer 228 and the p-type layer 230. The n-type layer 228 is adjacent to one side of the stack and the p-type layer 230 is adjacent to the opposite side of the stack. A p-contact metal 224 is overlying and in contact with the p-type layer 230. An n-contact metal 226 is overlying and in contact with the n-type layer 228.

As shown in the side view and top view, the MQW strip runs along the length of the device. A first p-contact 224a and n-contact 226a are on either side of part of the MQW strip in the direction perpendicular to the direction of emission of light. On either side of the part of the strip in the direction of the emission of light there is a diffraction grating in the second waveguide material. This forms the coherent light source 20. A second p-contact 224b and n-contact 226b are on either side of a second part of the MQW strip in the direction perpendicular to the direction of emission of light, which is further along the length of the device from the coherent light source 20. On either side of the second part of the strip in the direction of the emission of light, there is a diffraction grating in the second waveguide material. This forms the gain switched laser 24.

The top view shows the first p-contact 224a on one side of the strip and the first n-contact 226a on the other side of the strip, in the direction perpendicular to the emission of light. These contacts form part of the coherent light source 20. The second p-contact 224b on one side of the strip and the second n-contact 226b on the other side of the strip, in the direction perpendicular to the emission of light form the gain switched laser 24.

A current is applied between the first p-contact 224a and the first n-contact 226a in order to generate light at the coherent light source. Light generated in the MQW strip of the coherent light source 20 is emitted along the MQW layer. The light is laterally confined by the p-type layer 230 and the n-type layer 228, and vertically confined by the waveguide layers 210a and b. The light enters the MQW layer of the gain-switched laser 24. A time varying current is applied between the second p-contact 224b and the second n-contact 226b of the gain switched laser 24.

Figure 28A:
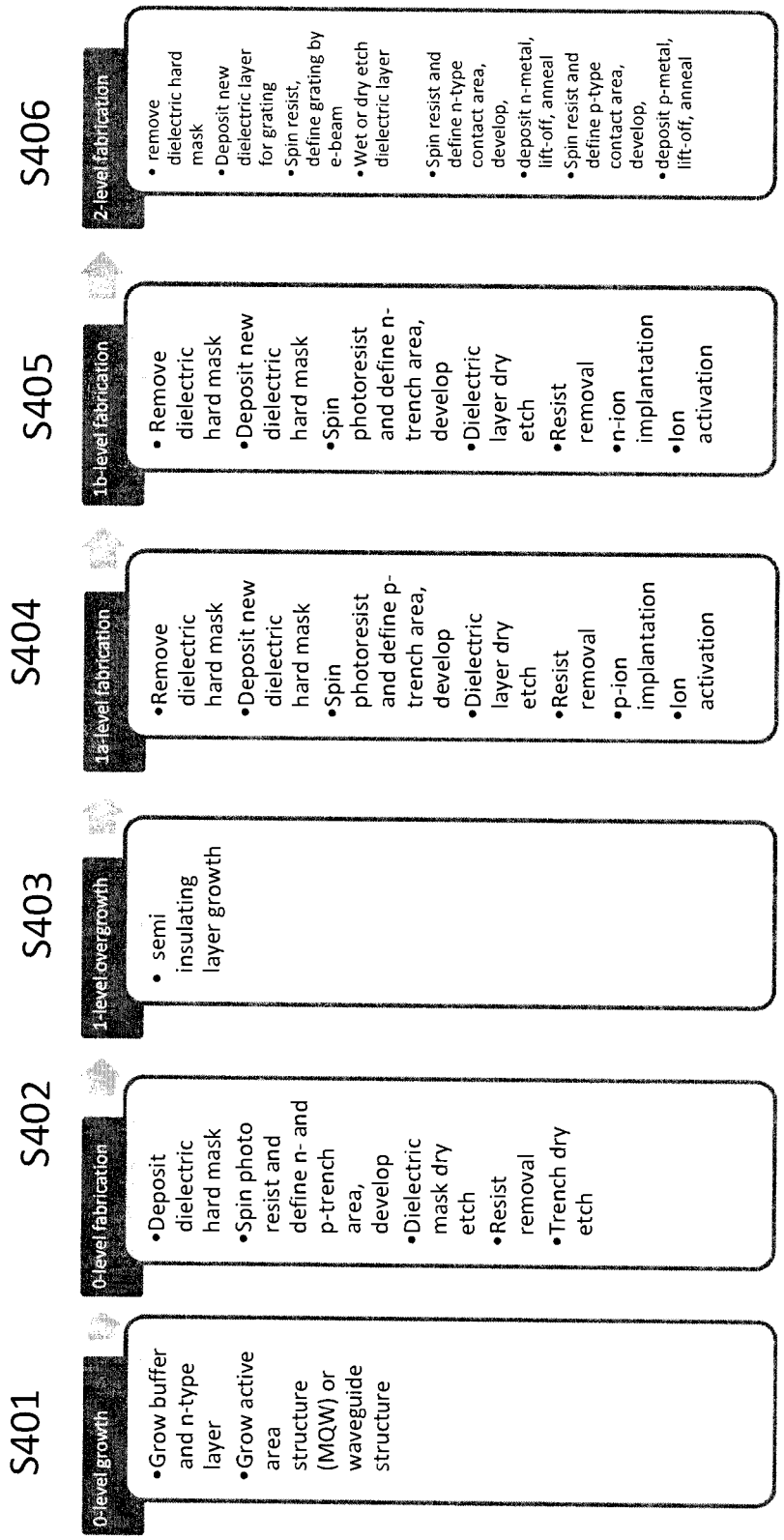
FIG. 28(a) shows a flow chart of a method of growth and fabrication of a monolithically integrated coherent light source and gain switched laser in a lateral junction via ion implantation, in accordance with an embodiment.

FIG. 28(a) shows a flow chart of a method of growth and fabrication of a monolithically integrated coherent light source 20 and gain switched laser 24 in a lateral junction via ion implantation, in accordance with an embodiment. The method can be used to fabricate an optical device having a coherent light source 20 and a gain switched laser 24 which are the same types in a lateral combination. The method may be used to fabricate a device such as described in relation to FIG. 29.

In a device fabricated by this method, both the coherent light source 20 and gain switched laser 24 devices are integrated monolithically on a substrate. In an embodiment, the substrate is Si—InP In step S401, a buffer layer is grown followed by an active area structure. In an embodiment, the buffer layer is 200 nm. In an embodiment, the buffer layer is Si—InP. The active area structure could be multi quantum well (MQW) structure as described in relation to FIG. 20 above. This step is referred to as "0-level growth".

The sample is then taken out of the growth machine for step S402, "0-level fabrication". This involves deposition of a dielectric hard mask, which could be a $Si_3N_4$ or $SiO_2$ layer for example. The thickness of this layer may be dependent on the thickness of the active area grown and the dry etch selectivity. Next, a photo resist is spun and the n- and p-trench areas are defined by optical lithography. After development, the pattern defined in the resist is transferred to the dielectric layer through dry etching, based on $CF_4$ or CHF; chemistry for example. Next, the remaining resist on the surface is removed in a resist remover solution or by $O_2$ plasma ashing. Next, a semiconductor dry etch is carried out. $Cl_2$ based chemistry may be used to provide good quality vertical sidewalls. The depth of the etch may be dependent on the thickness of the active area.

The sample is then ready for step S403, "1-level overgrowth". The dielectric hard mask is left on the device area. This provides selective area growth. The semi insulating layer is grown and the etched area planarized. The semi-insulating layer may be InP for example.

In the step S404, "1a-level fabrication", the dielectric hard mask is removed. This involves dipping the sample in HF or dry etching. At this point a new dielectric layer is deposited that will act as a new hard mask for dry etching. Again, the thickness of this layer may be dependent on the thickness of the active area grown and the dry etch selectivity. A photoresist is spun to define a p-trench area by optical lithography and developed. The pattern is transferred to the dielectric layer by dry etching based on $CHF_3$ or $CF_4$ chemistry. This is selective area etch of the dielectric mask. The resist is then removed. The p-trench area is then implanted with ions which are then activated to create p-doping in the semi insulating layer. Wherever the mask is removed the ions are implanted into the semi-insulating layer. Where the mask remains, the ions will not be implanted.

In the step S405, "1b-level fabrication" the dielectric hard mask is removed. This involves dipping the sample in HF or dry etching. At this point a new dielectric layer is deposited that will act as a new hard mask for dry etching. Again, the thickness of this layer may be dependent on the thickness of the active area grown and dry etch selectivity. A photoresist is spun to define an n-trench area by optical lithography and developed. The pattern is transferred to dielectric layer by dry etching based on $CHF_3$ or $CF_4$ chemistry. The resist is then removed. The n-trench area is then implanted with ions which are then activated to create n-doping in the semi insulating layer.

Step S406, "2-level fabrication", involves removing the dielectric hard mask by HF dip or dry etching. For fabrication of a DFB laser, a new dielectric layer is deposited which is then spun with resist and electron beam patterned with a grating pattern. This is then dry or wet etched into the dielectric area.

In the final steps n- and p-type contacts are defined on top of n- and p-type trenches accordingly by optical lithography. Appropriate metals for n- and p-contacts are deposited, lifted off and annealed.

Similar devices can be fabricated in two independent runs, diced and then flip chip mounted and aligned on a foreign platform. For example two InP-based lasers can be flip chip mounted on a common Si carrier substrate.

Figure 28B:
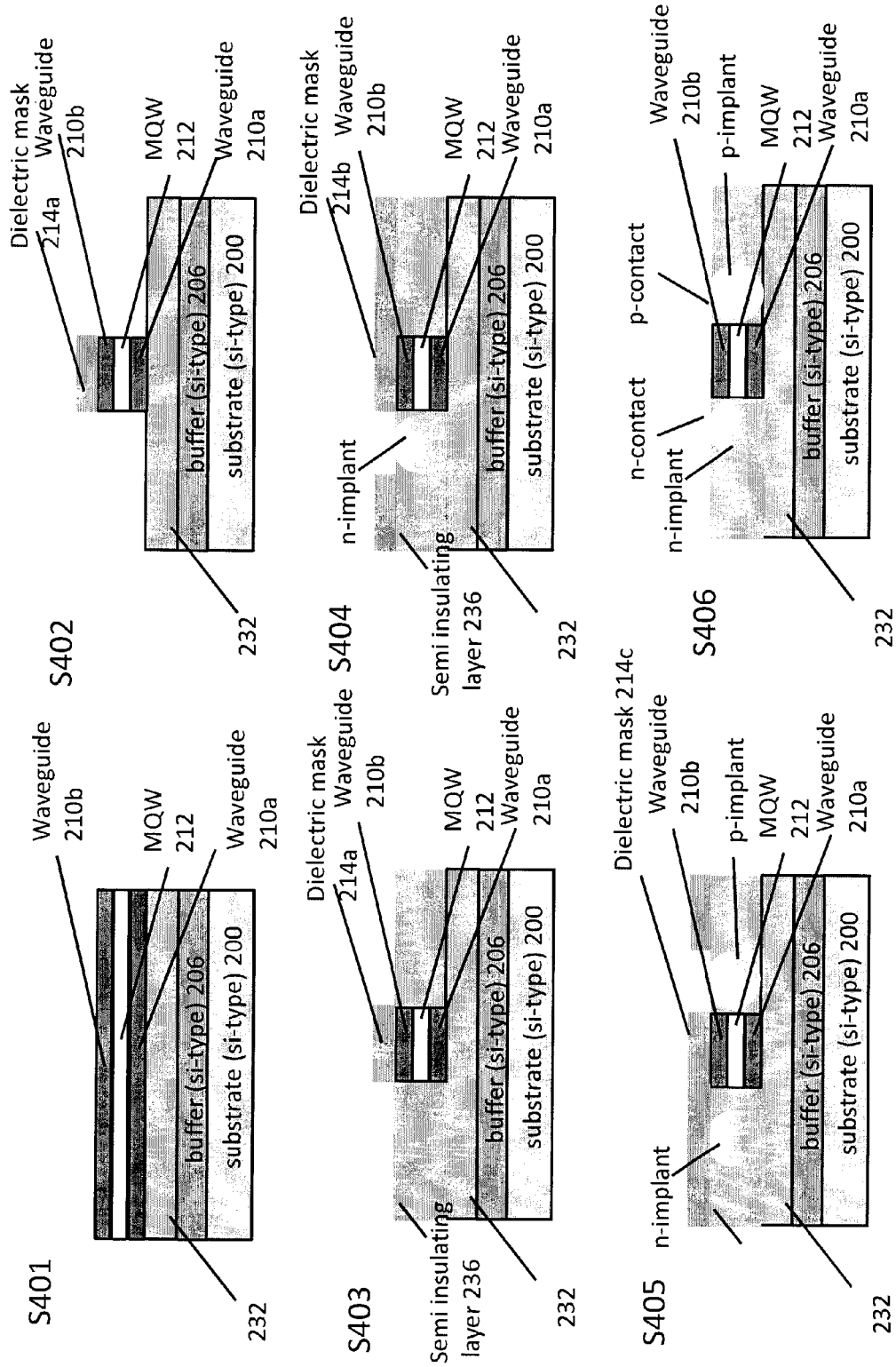
FIG. 28(b) shows the structure of the device after selected steps of the method of FIG. 28(a)

FIG. 28(b) shows the fabrication stages of the method described in relation to FIG. 28(a).

After step S401, the sample comprises a substrate 200, a buffer layer 206 overlying and in contact with the substrate 200, an layer 232 overlying and in contact with the buffer layer 206, a first waveguide layer 210a overlying and in contact with layer 232, an MQW layer 212 overlying and in contact with the first waveguide layer 210a and a second waveguide layer 210b overlying and in contact with the MQW layer 212.

After step S402, the dielectric hard mask 214a, second waveguide layer 210b, MQW layer 212 and first waveguide layer 210a are a ridge which is overlying and in contact with the layer 232.

After step S403, the semi-insulating layer 236 is overlying and in contact with the layer 232 either side of the ridge.

After step S404, a second dielectric hard mask 214b is overlying and in contact with the ridge, the semi-insulating layer 236 on one side of the ridge and part of the semi-insulating layer 236 on the other side of the ridge. There is a region of n-doping in the part of the semi-insulating layer 236 not under the dielectric hard mask 214b.

After step S405, a third dielectric hard mask 214b is overlying and in contact with the ridge, the semi-insulating layer 236 with the n-doping region on one side of the ridge and part of the semi-insulating layer 236 on the other side of the ridge. There is a region of p-doping in the part of the semi-insulating layer 236 not under the dielectric hard mask 214c.

After step S406, a p-type contact is overlying and in contact with the p-doping region in the semi-insulating layer 236. An n-contact is overlying and in contact with the n-doping region in the semi-insulating layer 236.

Figure 29:
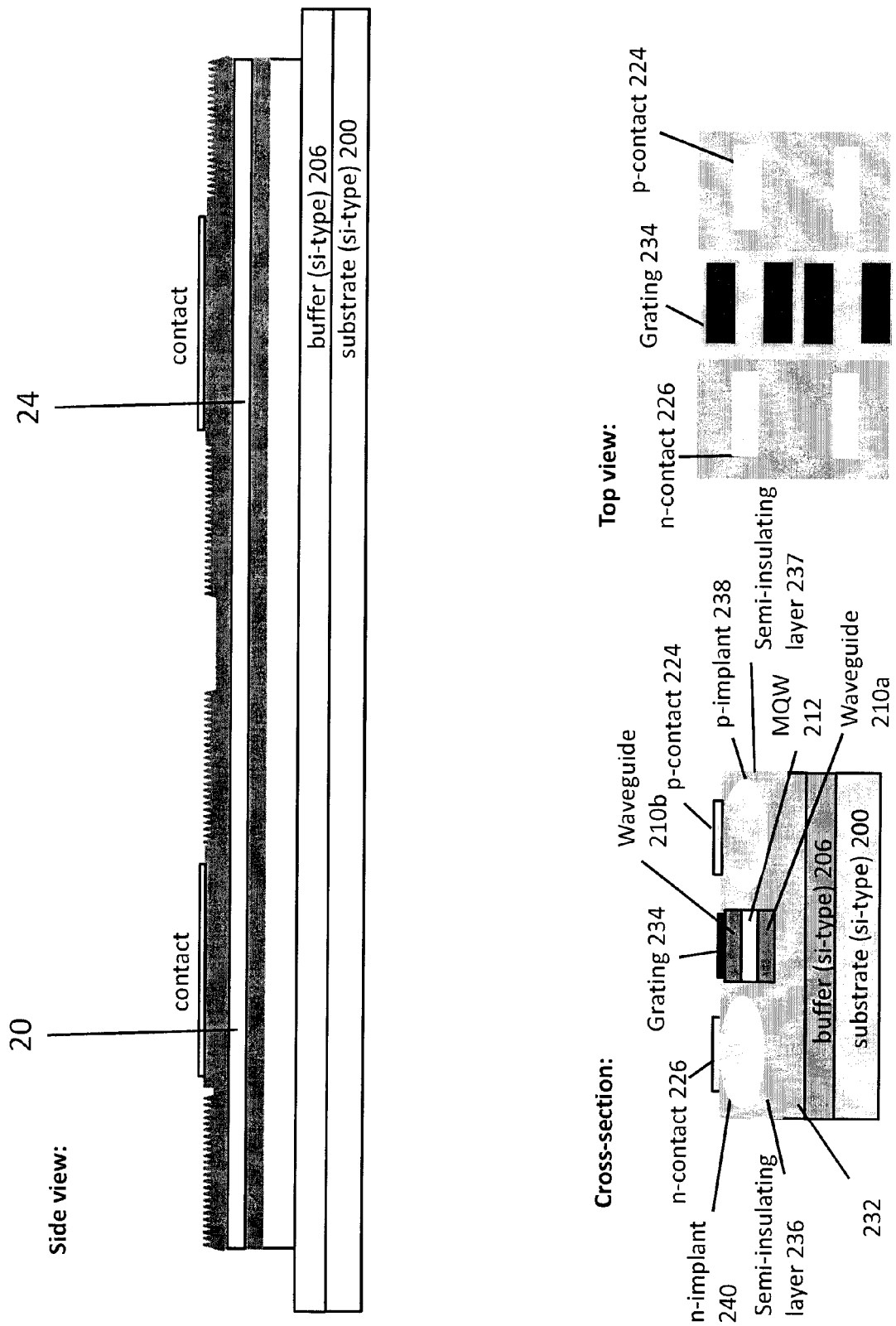
FIG. 29 shows a schematic illustration of an optical device in accordance with an embodiment, in which the coherent light source and the gain switched laser are both DFB lasers, in a lateral junction and in a lateral combination and fabricated via ion implantation.

FIG. 29 shows a schematic illustration of an optical device in accordance with an embodiment, in which the coherent light source 20 and the gain switched laser 24 are both DBR lasers, in a lateral junction and in a lateral combination and fabricated via ion implantation. Alternatively, the coherent light source 20 and the gain switched laser 24 could be DFB lasers. The figure shows a side view along the length of the device, i.e. along the direction along which light is emitted, a cross-section through a direction perpendicular to the direction along which light is emitted are shown and a top view down on the device from above, i.e. in the stacking direction of the layers.

The device comprises a substrate 200, a buffer layer 206 overlying and in contact with the substrate 200 and a layer 232 overlying and in contact with the buffer layer 206. A semi-insulating layer 237; stack comprising the second waveguide layer 210b, MQW layer 212 and first waveguide layer 210a; and the semi-insulating layer 237 are overlying and in contact with the layer 232. The stack is between the semi-insulating layer 236 and the semi-insulating layer 237. The semi-insulating layer 236 is adjacent to one side of the stack and the semi-insulating layer 237 is adjacent to the opposite side of the stack. The semi-insulating layer 236 comprises n-implant region 240 and the semi-insulating layer 237 comprises p-implant region 238. A p-contact metal 224 is overlying and in contact with the semi-insulating layer 237. An n-contact metal 226 is overlying and in contact with the semi-insulating layer 236.

As shown in the side view and top view, the MQW strip runs along the length of the device. A first p-contact 224a and n-contact 226a are on either side of part of the MQW strip in the direction perpendicular to the direction of emission of light. On either side of the pad of the strip in the direction of the emission of light there is a diffraction grating in the second waveguide material. This forms the coherent light source 20. A second p-contact 224b and n-contact 226b are on either side of a second part of the MQW strip in the direction perpendicular to the direction of emission of light, which is further along the length of the device from the coherent light source 20. On either side of the second part of the strip in the direction of the emission of light, there is a diffraction grating in the second waveguide material. This forms the gain switched laser 24.

The top view shows the p-contact 224a on one side of the strip and the n-contact 226a on the other side of the strip, in the direction perpendicular to the emission of light.

These contacts form part of the coherent light source 20. The p-contact 224b on one side of the strip and the n-contact 226b on the other side of the strip, in the direction perpendicular to the emission of light form the gain switched laser 24.

A current is applied between the first p-contact 224a and the first n-contact 226a in order to generate light at the coherent light source 20. Light generated in the MQW strip of the coherent light source 20 is emitted along the MQW layer. The light is laterally confined by the semi-insulating layers 236 and 237, and vertically confined by the waveguide layers 210a and b. The light enters the MQW layer of the gain-switched laser 24. A time varying current is applied between the second p-contact 224b and the second n-contact 226b of the gain switched laser 24.

FIG. 30 shows a schematic illustration of an optical device in accordance with an embodiment, in which a coherent light source 20 and a gain switched laser 24 are integrated on a substrate 200. The coherent light source 20 and the gain switched laser 24 are vertical cavity lasers. Light is emitted in a direction out of the plane of the layers, i.e. in a direction parallel to the stacking direction of the layers.

The optical device may optionally comprise a tuning element also integrated onto the substrate 200. The tuning element may be arranged between the coherent light source 20 and the gain switched laser 24.

The coherent light source 20 and the gain switched laser 24 are integrated onto a first surface of the substrate 200. The coherent light source 20 and the gain switched laser 24 are arranged relative to each other in a second plane which is substantially perpendicular to the first surface of the substrate 200. Light is emitted from the coherent light source 20 and the gain switched laser 24 in the second plane. The coherent light source 20 and the gain switched laser 24 are configured such that light emitted from the coherent light source 20 enters an aperture of the gain switched laser 24. The gain switched laser 24 is stacked on top of the coherent light source 20, in other words, the coherent light source 20 is between the gain-switched laser 24 and the substrate 200.

A structure such as shown in FIG. 30 can be grown by MOVPE. MOVPE is suitable due to the multiple overgrowth steps in the process. The devices described in relation to FIGS. 30 to 32 can be grown using a monolithically integrated approach.

In one embodiment, the substrate is InP.

One or more electrical contacts may be formed to the coherent light source 20 and the gain switched laser 24. AuGeNi may be used as an n-type contact metal and the p-contact metal may be any one of PdZnAu, AuCrAuZnAu or AuBe. An n-type electrode is formed comprising an n-contact and a p-type electrode is formed comprising a p-contact.

Wet etching of InP based materials can be performed using $Cl_2$ based etching at high temperatures diluted with Ar or $N_2$, $CH_4$ based etching or $SiCl_4Ar$ based etching. Dielectric dry etching may be performed using $CHF_3$ or $CF_4$ based chemistry, with a dielectric hard mask formed using $Si_3N_4$ or $SiO_2$. Further details of methods of device fabrication are described below.

Various lateral shapes of the coherent light source 20 and the gain switched laser 24 can be formed. The cross-section of the coherent light source 20 and the gain switched laser 24 may be circular for example.

The optical device may comprise an integrated heat sink, which is may be synthetic diamond for example.

In one embodiment, either or both of the coherent light source 20, and the gain switched laser 24, are VCSELs.

The lasers may comprise grating. The grating region may be separate from the active region or the active region may comprise the grating. A laser where the active region and grating are separate is referred to as DBR (distributed Bragg reflector) laser. A VCSEL is a type of DBR laser.

Figure 31A:
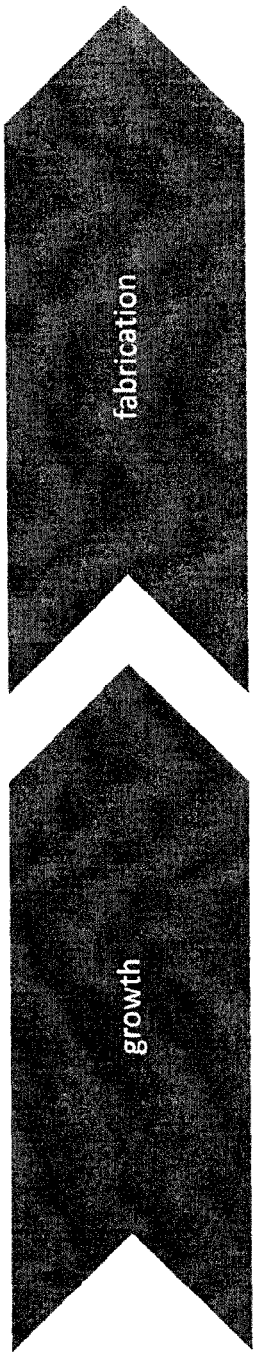
FIG. 31(a) shows a flow chart of a method of growth and fabrication of monolithically integrated coherent light source and gain switched laser in a vertical junction, in accordance with an embodiment.

FIG. 31(a) shows a flow chart of a method of growth and fabrication of monolithically integrated coherent light source 20 and gain switched laser 24 in a vertical junction, in accordance with an embodiment. The method can be used to fabricate an optical device having a coherent light source and a gain switched laser which are both VCSELs, in a vertical combination. The method may be used to fabricate a device such as described in relation to FIG. 32, in which the gain switched laser 24 is stacked vertically on top of the coherent light source 20.

The device is monolithically grown in step S501. The growth phase, step S501, is completed before any fabrication starts in step S502.

In an embodiment, the substrate 200 is p-type InP. The substrate 200 is overgrown with a buffer layer. In an embodiment, the buffer layer is 200 nm thick. In an embodiment, the buffer layer is a p-type layer. Then a p-doped distributed Bragg reflector (DBR) 246 is grown. The DBR 246 comprises multiple layers of alternating materials with varying refractive index. The materials may be InP/AlInGaAs, InP/InGaAsP or AlInGaAs/AlInAs, all being lattice matched to InP for example. As the DBR 246 is located at the "bottom" of the device, i.e. closest to the substrate 200, in one embodiment it is configured to have greater than 95% reflectivity. A layer 250 of high Al content material is then grown. In one embodiment, the material has an Al content of greater than 60%. This material may be AlAs for example. A bottom active area 247 layer is then grown. The bottom active area 247 may comprise a MQW structure. A second layer 252 of high Al content material is then grown. Next, an n-type DBR 248 is grown. This n-DBR 248 is less reflective than bottom p-DBR 246. The bottom active area 247 is thus separated from the DBRs by two layers of high Al content material, for example AlAs, 250 and 252, that will be used for selective area oxidation during processing. Next, the top active area 254 followed by p-type DBR 256, which has the lowest reflectivity, are grown.

In an embodiment, the reflectivity relation for the three DBRs follows the relation below:

$$R(\text{bottom p-DBR246}) > R(\text{n-DBR248}) > R(\text{top p-DBR256})$$

The fabrication step S502 starts with deposition of the p-type contact 260 at the back of the wafer, i.e. on the opposite side of the substrate 200 to the buffer layer 206. Then the resist is spun on top of the wafer to define optically the top p-type contact 261. After resist development, p-metal is deposited and lifted off. The top p-contact 261 is on the p-DBR layer 256. Then both p-type contacts are annealed at the same time.

Then a dielectric layer is deposited, which can be a $Si_3N_4$ or $SiO_2$ layer for example. This layer acts as a hard mask for etching. Next, an optical resist is spun to define the top shape/size of the device. After development the hard mask is etched based on $CHF_3$ or $CF_4$ chemistry for example. The remaining resist is then removed, in resist remover solution for example. The semiconductor wafer is then etched down to a depth x. The depth x is below the top active area 254, and above the bottom of the n-DBR layer 248. In other words, the wafer is etched down to part way through the n-DBR layer 248. The etching may be based on $Cl_2$-chemistry. The dielectric mask is then removed by HF for example.

An optical resist is then spun, and an n-type contact area is defined and developed. Next the n-metal is deposited, lifted off and annealed. The n-contact 262 is on the etched surface of the n-DBR layer 248.

Next, another dielectric layer is deposited, which could be a $Si_3N_4$ or $SiO_2$ layer for example. The dielectric layer acts as a hard mask for etching. The optical resist is spun and the bottom level shape is defined. After development the dielectric mask is dry etched followed by a semiconductor etch down to partway through the bottom p-DBR 246. This is a depth y from the point x. The dielectric hard mask is then removed. This etch is performed to create a flat surface to make an n-contact to layer 248.

The sample is then wet oxidised. This process turns AlAs selective wet oxidation areas into dielectric layers which restrict current flow through the device. A wet furnace may be used in order to oxidise the sample. The AlAs layers are oxidised from the lateral sides progressively inwardly through the device. The process duration controls the size of the ring of oxidised material.

Figure 31B:
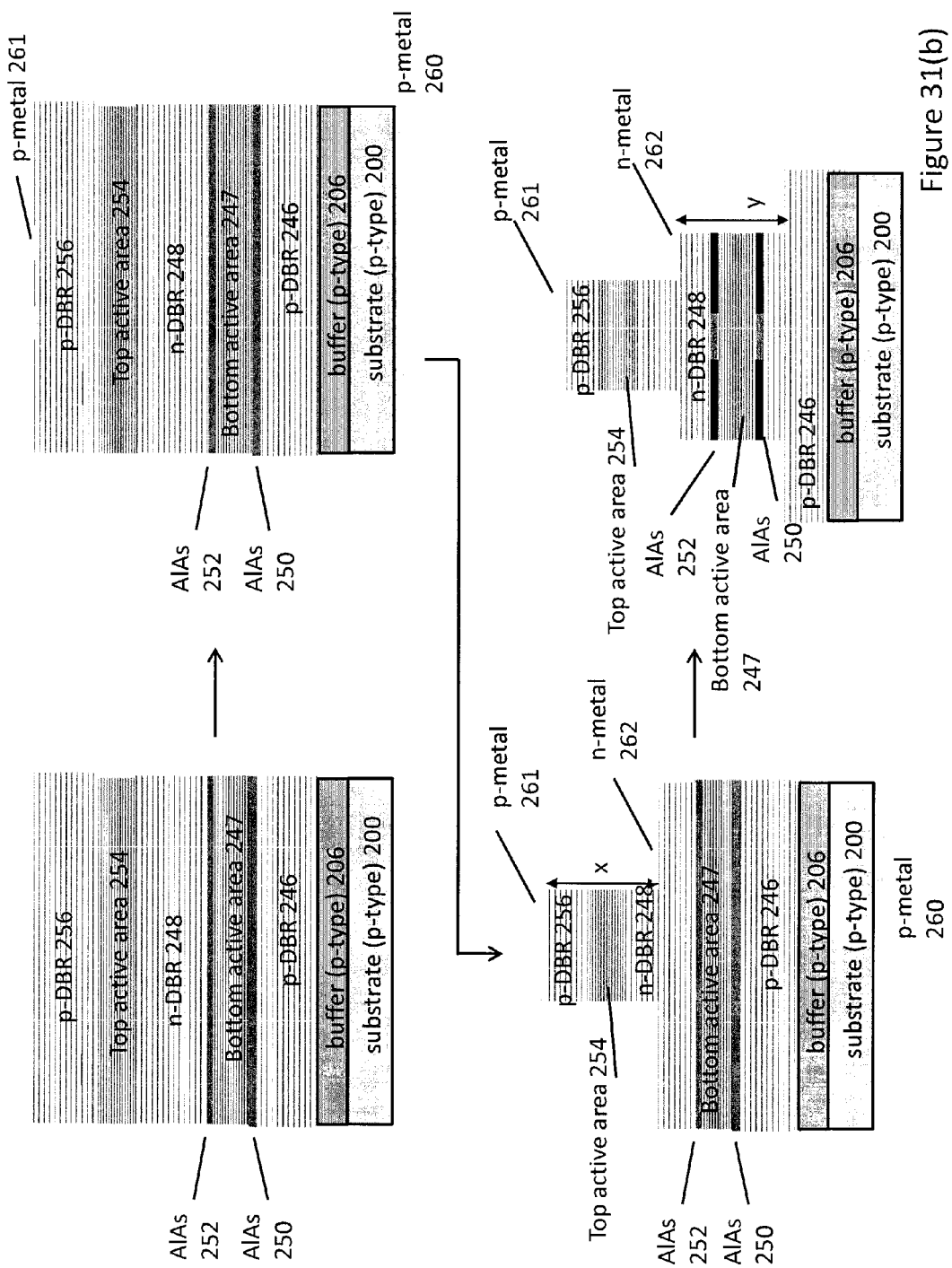
FIG. 31(b) shows the structure of the sample after selected steps of the method of FIG. 31(a), for an optical device having two VCSEL lasers.

FIG. 31(b) shows the structure of the sample after the steps of FIG. 31(a), for an optical device having two VCSEL lasers.

After step S501, the sample comprises a substrate 200, a buffer layer 206 overlying and in contact with the substrate 200, p-DBR 246 overlying and in contact with the buffer layer 206, an AlAs layer 250, overlying and in contact with the p-DBR 246, a bottom active layer 247 overlying and in contact with the AlAs layer 250, an AlAs layer 252 overlying and in contact with the bottom active layer 247, an n-DBR 248 overlying and in contact with the AlAs layer 252, a top active layer 254 overlying and in contact with the AlAs layer 252, and a p-DBR 256 overlying and in contact with the top active layer 254.

The next figure shows the device after the p-contacts 260 and 261 have been deposited. There is a p-metal contact 260 in contact with the opposite surface of the substrate 200 to the buffer layer 206, and two further p-metal contacts 261 overlying and in contact with the p-DBR 256.

The next figure shows the device after etching to the depth x and deposition of the n-contacts. There is a ridge formed by the p-DBR 256, top active area 254 and part of the n-DBR. Two n-metal contacts 262 are in contact with the surface of the n-DBR 248 either side of the ridge.

The next figure shows the device after etching to the depth y and oxidation of the AlAs layers 250 and 252. The device has a "stepped" shape, with the substrate 200, buffer layer 206 and part of the p-DBR layer 246 forming a first "step" of the device, the other part of the p-DBR layer 246, AlAs layer 250, bottom active layer 247 and part of the n-DBR layer 248 forming a second "step" of the device, and the other part of the n-DBR layer 248, top active area 254 and p-DBR 256 forming a third "step" of the device.

Figure 32:
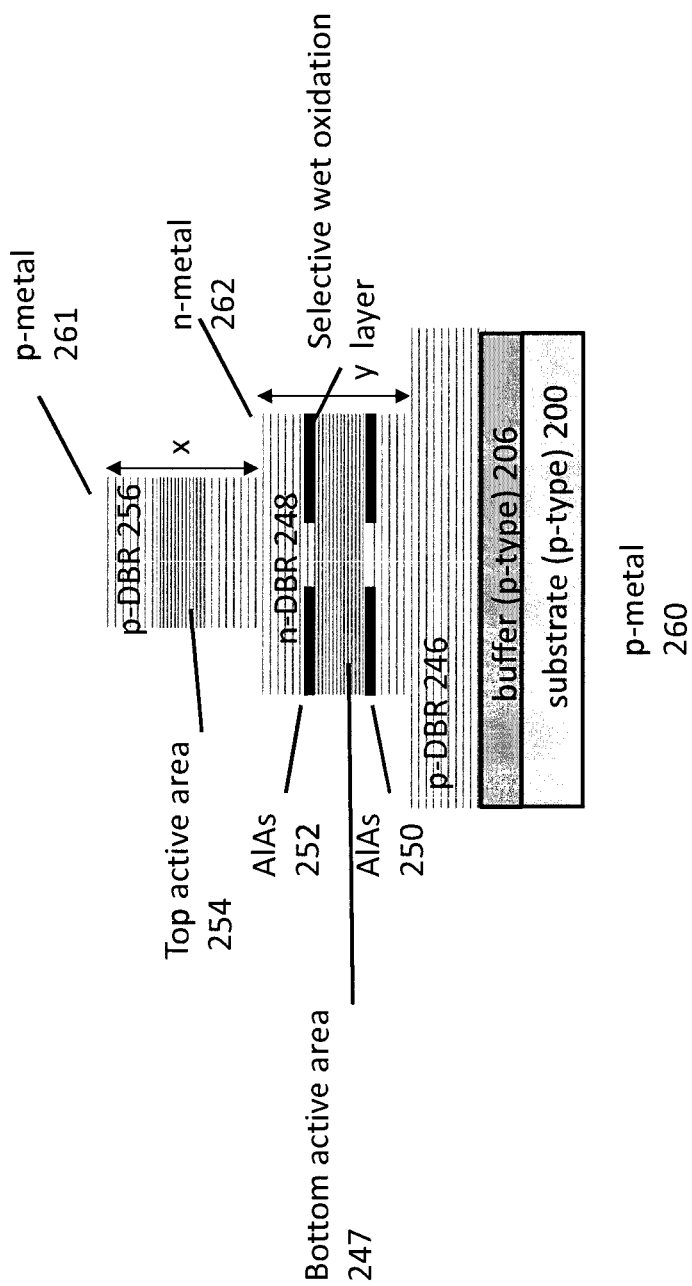
FIG. 32 shows a schematic illustration of an optical device in accordance with an embodiment, in which the coherent light source and the gain switched laser are both VCSELs, in a vertical junction and in a vertical combination.

FIG. 32 shows a schematic illustration of an optical device in accordance with an embodiment, in which the coherent light source 20 and the gain switched laser 24 are both VCSELs, in a vertical junction and in a vertical combination. The figure shows a cross-section through the layers.

The device comprises a substrate 200, a buffer layer 206 overlying and in contact with the substrate 200, p-DBR 246 overlying and in contact with the buffer layer 206, an AlAs layer 250, overlying and in contact with the p-DBR 246, a bottom active layer 247 overlying and in contact with the AlAs layer 250, an AlAs layer 252 overlying and in contact with the bottom active layer 247, an n-DBR 248 overlying and in contact with the AlAs layer 252, a top active layer 254 overlying and in contact with the AlAs layer 252, and a p-DBR 256 overlying and in contact with the top active layer 254.

There is a p-metal contact 260 in contact with the opposite surface of the substrate 200 to the buffer layer 206, and two further p-metal contacts 261 overlying and in contact with the p-DBR 256.

The device has a "stepped" shape, with the substrate 200, buffer layer 206 and part of the p-DBR layer 246 forming a first "step" of the device, the other part of the p-DBR layer 246. AlAs layer 250, bottom active layer 247 and part of the n-DBR layer 248 forming a second "step" of the device, and the other part of the n-DBR layer 248, top active area 254 and p-DBR 256 forming a third "step" of the device. Two n-metal contacts 262 are in contact with the surface of the n-DBR 248 either side of the third step.

A current is applied between the p-contact 260 and the n-contact 262 in order to generate light at the coherent light source 20. Light generated in the bottom active area 247 of the coherent light source 20 is emitted in the stacking direction of the layers, thorough the n-DBR layer 248. The light enters the top active area 254 of the gain-switched laser 24. A time varying current is applied between the p-contact 261 and the n-contact 262 of the gain switched laser 24. The light is laterally confined by the oxidised AlAs layers 250 and 252.

Figure 33:
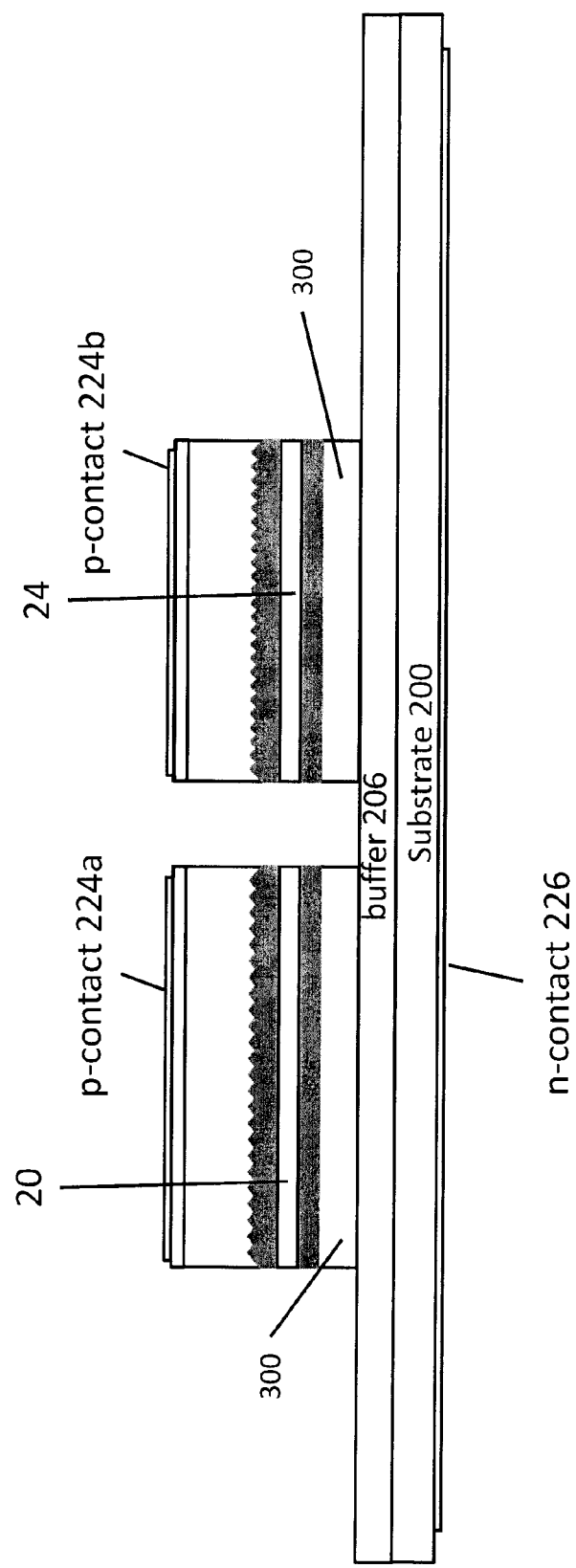
FIG. 33 shows a schematic illustration of an optical device in accordance with an embodiment, in which the coherent light source and the gain switched laser are in a lateral combination and are separate chips flip-chip bonded to a common substrate.

FIG. 33 shows a schematic illustration of an optical device in accordance with an embodiment, in which the coherent light source 20 and the gain switched laser 24 are in a lateral combination and are separate chips flip-chip bonded to a common substrate 200.

In this case, the coherent light source 20 and gain switched laser 24 are DFB lasers. However, one or more of the coherent light source 20 and gain switched laser 24 may be a stripe laser for example.

The coherent light source 20 is fabricated as described in relation to FIG. 19(a) above. The diffraction grating is configured such that a single DFB laser is formed, as opposed to two lasers. The coherent light source 20 may be formed on an InP substrate for example. The gain switched laser 24 is fabricated separately, again as described in relation to FIG. 19(a) above. The diffraction grating is again configured such that a single DFB laser is formed, as opposed to two lasers. The gain switched laser 24 may also be formed on an InP substrate for example. The result of these processes is two separate InP based DFB lasers.

Each DFB laser is then diced and flip chip mounted and aligned on a foreign platform. The foreign platform may be a Si substrate. Each DFB laser wafer is diced and each individual DFB laser is placed on a foreign substrate. The DFB lasers are aligned accurately. The devices are then thermally or pressure bonded to the platform. Adhesion can be provided by a metal layer for example, using metal to metal bonding.

The figure shows a side view along the length of the device, i.e. along the direction along which light is emitted.

The device comprises a substrate 200. On one surface of the substrate is an n-contact 226. Overlying and in contact with the opposite surface to the substrate 200 is the buffer layer 206. Overlying and in contact with the buffer layer 206 is the coherent light source 20 and the gain switched laser 24. The layers 300 at the surface of the coherent light source 20 and gain switched laser 24 overlying and in contact with the buffer layer 206 are InP.

As shown in the side view, there is a gap between the coherent light source 20 and the gain switched laser 24. The gap may extend across the entire device in the direction perpendicular to the direction in which light is emitted. The gap extends down to the buffer layer 206.

A current is applied between the p-contact 224a over the coherent light source 20 and the n-contact 226 in order to generate light. Light generated in the MQW strip of the coherent light source 20 is emitted along the MQW layer. The light is vertically confined by the waveguide layers 210a and b. Light travels between the coherent light source 20 and the gain switched laser 24 though free space in the gap. The light enters the MQW layer of the gain-switched laser 24. A time varying current is applied between the p-contact 224b gain-switched laser 24 and the n-contact 226.

An optical component configured to produce optical amplification and a component configured to intermittently supply coherent light to the optical component integrated onto a semiconductor substrate as described in relation to FIGS. 18 to 33 above can be used in a QKD system, for example as described in relation to FIGS. 13 to 17 above. It may also be used as an encoder for a photonic quantum information system.

An optical component configured to produce optical amplification and a component configured to intermittently supply coherent light to the optical component integrated onto a semiconductor substrate as described in relation to FIGS. 18 to 33 above is a compact device, which is low cost and quick to manufacture and assemble.

The optical device can produce phase encoded laser pulses from a single integrated chip, which is small, cheap, and suitable for mass manufacture using conventional semiconductor processes.

The optical device may comprise two optically coupled lasers that share a common substrate. One laser is used to seed coherence between pairs of pulses emitted by the second laser. The first laser can also be used to vary the phase difference from the pairs of pulses from the second laser.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. An optical device, comprising;
   an optical component, configured to produce optical amplification;
   a component configured to intermittently supply coherent light to said optical component; and
   a controller, configured to apply a time varying signal to said optical component such that a plurality of light pulses are emitted during each period of time that said coherent light is received, wherein the plurality of light pulses emitted during each period have a fixed phase relation.

2. The optical device of claim 1, wherein said component configured to intermittently supply coherent light is a coherent light source.

3. The optical device of claim 1, wherein said optical component is further configured to intermittently generate said coherent light and wherein said component configured to intermittently supply coherent light is a mirror, wherein said mirror is configured to reflect said generated coherent light back into said optical component.

4. The optical device of claim 1, wherein the phase difference between any two consecutive intra-period pulses is the same for all periods.

5. The optical device of claim 1, wherein the phase difference between inter-period pulses is random.

6. The optical device of claim 2, further comprising
   a second controller, configured to supply a second time varying signal to said coherent light source that controls the generation of said coherent light, wherein said time varying signal and said second time varying signal are synchronised.

7. The optical device of claim 1, wherein said optical component is a gain-switched laser.

8. The optical device of claim 1, wherein said optical component is an optical amplifier.

9. The optical device of claim 1, wherein said coherent light source is a gain-switched laser.

10. The optical device of claim 1, further comprising an encoder, configured to encode information in the emission time of said light pulses or in the phase difference between said light pulses.

11. The optical device of claim 1, further comprising an intensity control element, configured to modify said time varying signal or the intensity of said coherent light, such that the intensity of said plurality of light pulses is varied.

12. A sending unit for a quantum communication system, comprising the optical device of claim 1.

13. A quantum communication system, comprising the sending unit of claim 12, further comprising
a receiving unit, the receiving unit comprising an interferometer, wherein the interferometer comprises first and second optical paths with a difference in length between the first and second optical paths;
wherein said controller is configured to apply a time varying signal such that the delay between a pair of consecutive light pulses emitted from said optical component matches the delay caused by the difference in length between said first and second optical paths in the interferometer, such that light pulses combine when exiting the interferometer.

14. An optical device, comprising;
an optical component, configured to produce optical amplification;
a component configured to supply coherent light to said optical component;
a controller, configured to apply a time varying signal to said optical component such that a plurality of light pulses are emitted during each period of time that said coherent light is received, wherein the plurality of light pulses emitted during each period have a fixed phase relation; and
an encoder, configured to encode information in the emission time of said light pulses or in the phase difference between said light pulses.

15. A quantum communication method, comprising:
supplying coherent light to an optical component configured to produce optical amplification in a sending unit;
applying a time varying signal to said optical component such that a plurality of light pulses are emitted during each period of time that said coherent light is received, wherein the plurality of light pulses emitted during each period have a fixed phase relation;
encoding information in said light pulses;
sending encoded light pulses from the sending unit to a receiving unit comprising an interferometer, wherein the interferometer comprises first and second optical paths with a difference in length between the first and second optical paths; wherein the time varying signal is such that the delay between the emission times of said plurality of light pulses matches the delay caused by the difference in length between said first and second optical paths in the interferometer, such that said light pulses combine when exiting the interferometer.

* * * * *